US012137457B2

(12) United States Patent
Uchino et al.

(10) Patent No.: US 12,137,457 B2
(45) Date of Patent: Nov. 5, 2024

(54) TECHNIQUES FOR SECONDARY CELL ESTABLISHMENT FOR UPLINK CONTROL INFORMATION

(71) Applicant: QUALCOMM Incorporated, San Diego, CA (US)

(72) Inventors: Toru Uchino, Zushi (JP); Kazuki Takeda, Tokyo (JP); Changhwan Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 530 days.

(21) Appl. No.: 17/393,778

(22) Filed: Aug. 4, 2021

(65) Prior Publication Data

US 2023/0042828 A1    Feb. 9, 2023

(51) Int. Cl.
*H04W 72/21*       (2023.01)
*H04W 24/10*       (2009.01)
*H04W 74/0833*    (2024.01)

(52) U.S. Cl.
CPC ........... *H04W 72/21* (2023.01); *H04W 24/10* (2013.01); *H04W 74/0833* (2013.01)

(58) Field of Classification Search
None
See application file for complete search history.

(56) References Cited

U.S. PATENT DOCUMENTS

| 10,491,284 | B2  |   | 11/2019 | Dinan |                |
|------------|-----|---|---------|-------|----------------|
| 2015/0223270 | A1 | * | 8/2015  | Kim ..................... | H04W 74/006 370/329 |
| 2016/0374027 | A1 |   | 12/2016 | Dinan |                |
| 2016/0374072 | A1 | * | 12/2016 | Dinan ................. | H04W 52/146 |
| 2018/0359790 | A1 | * | 12/2018 | Ingale ................. | H04W 72/51 |
| 2019/0069250 | A1 | * | 2/2019  | Dinan ................. | H04W 52/242 |
| 2019/0253949 | A1 | * | 8/2019  | Park ................... | H04W 36/0077 |
| 2020/0029383 | A1 | * | 1/2020  | Venugopal ........... | H04W 76/19 |

(Continued)

OTHER PUBLICATIONS

Qualcomm Incorporated, Discussion on PUCCH SCell Activation, 3GPP TSG RAN WG4 Meeting # 99-e R4-2108970 Electronic Meeting, May 19-27, 2021, R4-2108970, 7 Pages. (Year: 2021).*

(Continued)

*Primary Examiner* — Liem H. Nguyen
(74) *Attorney, Agent, or Firm* — Holland & Hart LLP/Qualcomm Incorporated

(57) ABSTRACT

This disclosure provides systems, methods and apparatus for a signaling mechanism associated with activating a secondary cell (SCell) for uplink control information (UCI), including under circumstances in which the SCell is deactivated and belongs to a timing advance group (TAG) lacking a valid timing advance (TA) value. In one aspect, a user equipment (UE) and one or more components of a network entity may employ a signaling mechanism for establishing an SCell as a PUCCH-SCell in scenarios in which the PUCCH-SCell belongs to a secondary TAG (sTAG) lacking a valid TA value. The signaling mechanism may include signaling to directly provide the network entity with beam measurement information associated with one or more SCells of the sTAG or may include singling that the network entity may use to derive the beam measurement information associated with the one or more SCells of the sTAG.

28 Claims, 15 Drawing Sheets

(56) References Cited

U.S. PATENT DOCUMENTS

| | | | |
|---|---|---|---|
| 2021/0076442 A1* | 3/2021 | Matsumura | H04B 7/088 |
| 2021/0258062 A1* | 8/2021 | Koskela | H04W 74/02 |
| 2021/0297138 A1* | 9/2021 | Matsumura | H04B 7/088 |
| 2022/0078768 A1* | 3/2022 | El Hamss | H04L 5/0055 |
| 2022/0240224 A1* | 7/2022 | Xu | H04L 5/0051 |
| 2024/0163699 A1* | 5/2024 | Cui | H04W 72/21 |

OTHER PUBLICATIONS

Huawei, HiSilicon, Discussion on requirements for PUCCH SCell activation, 3GPP TSG RAN WG4 Meeting # 99e Electronic Meeting, May 19-27, 2021, R4-2110345, 7 pages. (Year: 2021).*
International Search Report and Written Opinion—PCT/US2022/036546—ISA/EPO—Nov. 14, 2022.
Qualcomm Incorporated: "Discussion on PUCCH SCell Activation", 3GPP TSG-RAN WG4 Meeting # 98-bis-e, R4-2107290, 3rd Generation Partnership Project, Mobile Competence Centre , 650, Route Deslucioles, F-06921 Sophia-Antipolis Cedex, France, vol. RAN WG4, No. Electronic Meeting, Apr. 12, 2021-Apr. 20, 2021, pp. 1-5, Apr. 2, 2021, XP052177615.

* cited by examiner

TECHNIQUES FOR SECONDARY CELL ESTABLISHMENT FOR UPLINK CONTROL INFORMATION

TECHNICAL FIELD

This disclosure relates to wireless communications, including techniques for secondary cell (SCell) establishment for uplink control information (UCI).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving configuration signaling associated with configuring the UE with a set of one or more secondary cells (SCells), receiving a message to activate an SCell of the set of one or more SCells for uplink control information (UCI) associated with the set of one or more SCells, and transmitting signaling associated with activating the SCell for the UCI.

Another innovative aspect of the subject matter described in this disclosure can be implemented in an apparatus for wireless communications at a UE. The apparatus may include a first interface, a second interface, and a processing system. The first interface may be configured to obtain configuration signaling associated with configuring the UE with a set of one or more SCells and obtain a message to activate an SCell of the set of one or more SCells for UCI associated with the set of one or more SCells. The first interface or the second interface may be configured to output signaling associated with activating the SCell for the UCI.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to receive configuration signaling associated with configuring the UE with a set of one or more SCells, receive a message to activate an SCell of the set of one or more SCells for UCI associated with the set of one or more SCells, and transmit signaling associated with activating the SCell for the UCI.

Another innovative aspect of the subject matter described in this disclosure can be implemented in another apparatus for wireless communications at a UE. The apparatus may include means for receiving configuration signaling associated with configuring the UE with a set of one or more SCells, means for receiving a message to activate an SCell of the set of one or more SCells for UCI associated with the set of one or more SCells, and means for transmitting signaling associated with activating the SCell for the UCI.

Another innovative aspect of the subject matter described in this disclosure can be implemented in a non-transitory computer-readable medium storing code for wireless communications at a UE. The code may include instructions executable by a processor to receive configuration signaling associated with configuring the UE with a set of one or more SCells, receive a message to activate an SCell of the set of one or more SCells for UCI associated with the set of one or more SCells, and transmit signaling associated with activating the SCell for the UCI.

Some implementations of the method, apparatuses, and non-transitory computer-readable medium described herein may further include operations, features, means, or instructions for receiving an indication of a set of physical random access channel (PRACH) resources associated with at least one serving cell, each PRACH resource of the set of PRACH resources associated with a respective reference signal, and transmitting the signaling associated with activating the SCell for the UCI may include transmitting a random access message over a PRACH resource of the set of PRACH resources associated with the respective reference signal of a serving cell of the at least one serving cell.

In some implementations of the method, apparatuses, and non-transitory computer-readable medium described herein, the signaling associated with activating the SCell for the UCI may be transmitted in accordance with an uplink time alignment associated with the set of one or more SCells.

In some implementations of the method, apparatuses, and non-transitory computer-readable medium described herein, the signaling associated with activating the SCell for the UCI may be transmitted over a serving cell different than the SCell.

Some implementations of the method, apparatuses, and non-transitory computer-readable medium described herein may further include operations, features, means, or instructions for receiving an indication of a beam failure recovery (BFR) configuration, where transmitting the signaling associated with activating the SCell for the UCI includes transmitting a report indicating one or more candidate reference signals for at least one SCell of the set of one or more SCells.

One innovative aspect of the subject matter described in this disclosure can be implemented in a method for wireless communications at a network entity. The method may include transmitting configuration signaling associated with configuring a UE with a set of one or more SCells, transmitting a message to activate an SCell of the set of one or more SCells for UCI associated with the set of one or more SCells, and receiving signaling associated with activating the SCell for the UCI.

Another innovative aspect of the subject matter described in this disclosure can be implemented in an apparatus for wireless communications at a network entity. The apparatus may include a first interface, a second interface, and a processing system. The first interface may be configured to output configuration signaling associated with configuring a UE with a set of one or more SCells and output a message to activate an SCell of the set of one or more SCells for UCI associated with the set of one or more SCells. The first interface or the second interface may be configured to obtain signaling associated with activating the SCell for the UCI.

Another innovative aspect of the subject matter described in this disclosure can be implemented in another apparatus for wireless communications at a network entity. The apparatus may include a processor, memory coupled with the processor, and instructions stored in the memory. The instructions may be executable by the processor to cause the apparatus to transmit configuration signaling associated with configuring a UE with a set of one or more SCells, transmit a message to activate an SCell of the set of one or more SCells for UCI associated with the set of one or more SCells, and receive signaling associated with activating the SCell for the UCI.

Another innovative aspect of the subject matter described in this disclosure can be implemented in another apparatus for wireless communications at a network entity. The apparatus may include means for transmitting configuration signaling associated with configuring a UE with a set of one or more SCells, means for transmitting a message to activate an SCell of the set of one or more SCells for UCI associated with the set of one or more SCells, and means for receiving signaling associated with activating the SCell for the UCI.

Another innovative aspect of the subject matter described in this disclosure can be implemented in a non-transitory computer-readable medium storing code for wireless communications at a network entity. The code may include instructions executable by a processor to transmit configuration signaling associated with configuring a UE with a set of one or more SCells, transmit a message to activate an SCell of the set of one or more SCells for UCI associated with the set of one or more SCells, and receive signaling associated with activating the SCell for the UCI.

Some implementations of the method, apparatuses, and non-transitory computer-readable medium described herein may further include operations, features, means, or instructions for transmitting an indication of a set of PRACH resources associated with at least one serving cell, each PRACH resource of the set of PRACH resources associated with a respective reference signal, where receiving the signaling associated with activating the SCell for the UCI includes receiving a random access message over a PRACH resource of the set of PRACH resources associated with the respective reference signal of a serving cell of the at least one serving cell.

In some implementations of the method, apparatuses, and non-transitory computer-readable medium described herein, the message to activate the SCell for the UCI may be associated with the UE transmitting the signaling associated with activating the SCell for the UCI in accordance with an uplink time alignment associated with the set of one or more SCells.

In some implementations of the method, apparatuses, and non-transitory computer-readable medium described herein, the signaling associated with activating the SCell for the UCI may be received over a serving cell different than the SCell.

Some implementations of the method, apparatuses, and non-transitory computer-readable medium described herein may further include operations, features, means, or instructions for transmitting an indication of a BFR configuration, where receiving the signaling associated with activating the SCell for the UCI includes receiving a report indicating one or more candidate reference signals for at least one SCell of the set of one or more SCells.

One innovative aspect of the subject matter described in this disclosure can be implemented in a method for wireless communications at a network entity. The method May include transmitting configuration signaling associated with configuring a UE with a set of one or more SCells, transmitting a message to activate an SCell of the set of one or more SCells for UCI associated with the set of one or more SCells, selecting a transmission configuration indicator (TCI) state for the SCell, and transmitting a command for the UE to transmit a random access message on the SCell using the TCI state.

Another innovative aspect of the subject matter described in this disclosure can be implemented in an apparatus for wireless communications at a network entity. The apparatus may include a first interface, a second interface, and a processing system. The first interface may be configured to output configuration signaling associated with configuring a UE with a set of one or more SCells and output a message to activate an SCell of the set of one or more SCells for UCI associated with the set of one or more SCells. The processing system may be configured to select a TCI state for the SCell. The first interface or the second interface may be configured to output a command for the UE to transmit a random access message on the SCell using the TCI state.

Another innovative aspect of the subject matter described in this disclosure can be implemented in another apparatus for wireless communications at a network entity. The apparatus may include a processor, memory coupled with the processor, and instructions stored in the memory. The instructions may be executable by the processor to cause the apparatus to transmit configuration signaling associated with configuring a UE with a set of one or more SCells, transmit a message to activate an SCell of the set of one or more SCells for UCI associated with the set of one or more SCells, select a TCI state for the SCell, and transmit a command for the UE to transmit a random access message on the SCell using the TCI state.

Another innovative aspect of the subject matter described in this disclosure can be implemented in another apparatus for wireless communications at a network entity. The apparatus may include means for transmitting configuration signaling associated with configuring a UE with a set of one or more SCells, means for transmitting a message to activate an SCell of the set of one or more SCells for UCI associated with the set of one or more SCells, means for selecting a TCI state for the SCell, and means for transmitting a command for the UE to transmit a random access message on the SCell using the TCI state.

Another innovative aspect of the subject matter described in this disclosure can be implemented in a non-transitory computer-readable medium storing code for wireless communications at a network entity. The code may include instructions executable by a processor to transmit configuration signaling associated with configuring a UE with a set of one or more SCells, transmit a message to activate an SCell of the set of one or more SCells for UCI associated with the set of one or more SCells, select a TCI state for the SCell, and transmit a command for the UE to transmit a random access message on the SCell using the TCI state.

Some implementations of the method, apparatuses, and non-transitory computer-readable medium described herein may further include operations, features, means, or instructions for selecting a second TCI state for the SCell as a result of failing to receive the random access message within a configured duration and transmitting a second command for the UE to transmit the random access message on the SCell.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
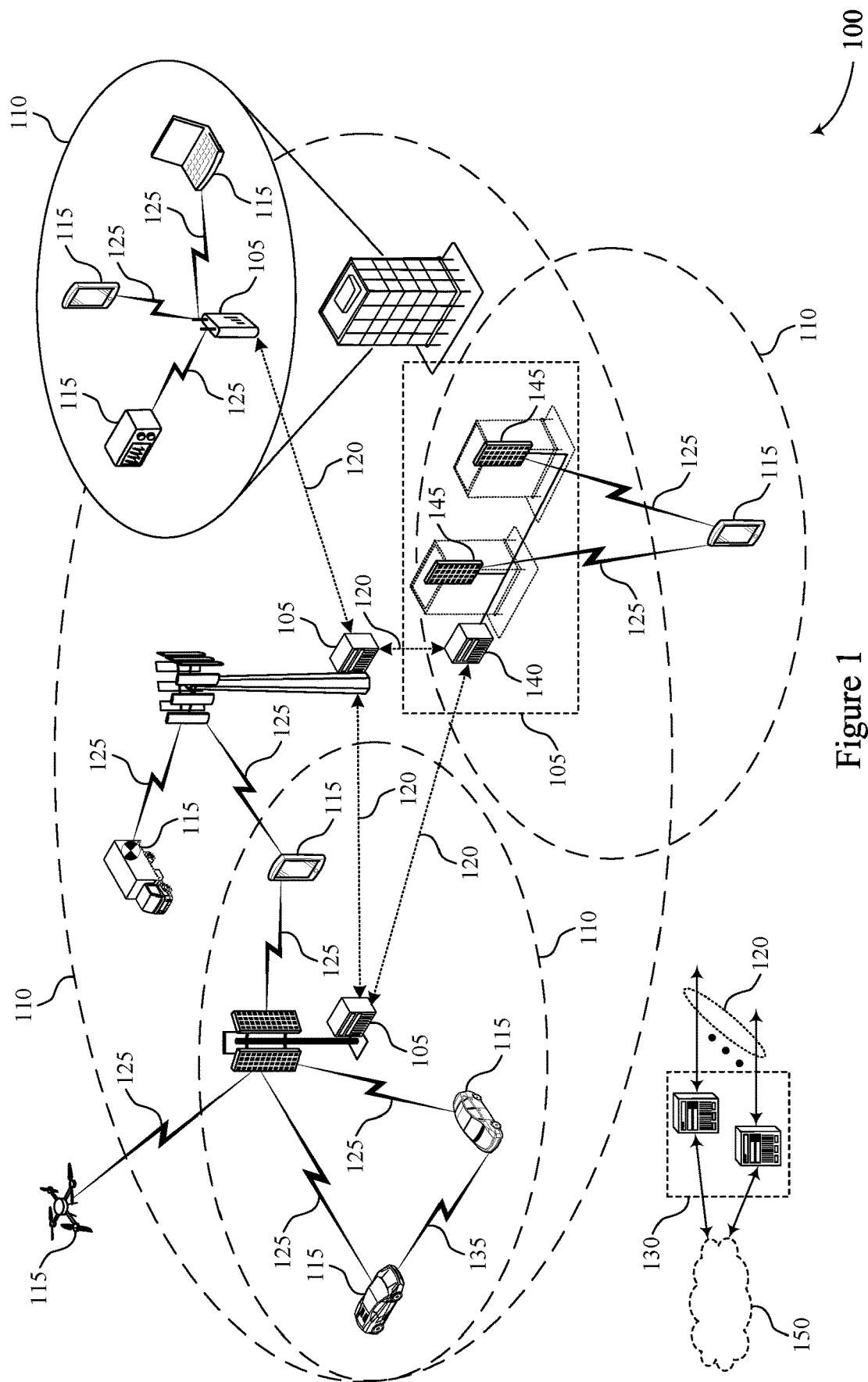
FIG. 1 illustrates an example wireless communications system that supports techniques for secondary cell (SCell) establishment for uplink control information (UCI).

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth R: standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), IxEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some systems, a user equipment (UE) and one or more components of a network entity (for example, one or more components of a base station (BS) or one or more components of multiple BSs) may communicate over one or more component carriers and on one or more serving cells, which may include a special cell (SpCell), one or more secondary cells (SCells), or a combination thereof. In some scenarios, the UE and one or more components of the network entity may configure an SCell to support uplink control signaling from the UE over a physical uplink control channel (PUCCH), and such an SCell may be referred to herein as a PUCCH-SCell. In such scenarios, the UE and one or more components of the network entity may group multiple serving cells into a primary PUCCH group associated with an SpCell and a secondary PUCCH group associated with the PUCCH-SCell. In some implementations, uplink control signaling associated with a serving cell of the primary PUCCH group may be sent on the SpCell and uplink control signaling associated with a serving cell of the secondary PUCCH group may be sent on the PUCCH-SCell. Further, in some scenarios, the UE and one or more components of the network entity may be configured with serving cells grouped in one or more timing advance groups (TAGs), and each TAG (such as serving cells of the TAG) may be associated with a respective timing advance (TA) value. For example, the UE and one or more components of the network entity may be configured with serving cells grouped in a primary TAG (pTAG) including an SpCell associated with a first TA value, and a secondary TAG (sTAG) including SCells (such as exclusively SCells) associated with a second TA value. In some implementations, the UE and one or more components of the network entity may establish a valid TA value for a TAG via a random access procedure or other responsive signaling and, if there is no valid TA for a TAG, the UE may be unable to transmit signaling outside of a random access message on a serving cell within that TAG.

Scenarios may arise in which a PUCCH-SCell is associated with an sTAG that lacks a valid TA value. In such scenarios, to activate the PUCCH-SCell, and support other SCells within the sTAG being schedulable, the UE may receive an activation command associated with activating the PUCCH-SCell, and the UE may expect to receive, from one or more components of the network entity, a physical downlink control channel (PDCCH) order for any of the SCells within the sTAG to establish a valid TA value for the sTAG. Such a PDCCH order may configure or schedule a random access message from the UE on an indicated SCell within the sTAG. The UE and one or more components of the network entity, however, may lack shared knowledge of a transmission configuration indicator (TCI) state associated with the PDCCH order, which may be associated with the lack of a valid TA for the sTAG (as the UE may be unable to report beam measurement information to one or more components of the network entity via the PUCCH-SCell due to the lack of a valid TA value). As such, the UE may be unable to successfully receive the PDCCH order for the random access message, which may result in the UE being unable to measure, select, or otherwise determine a valid TA value for the sTAG and, likewise, unable to make SCells within the sTAG schedulable for communication between the UE and one or more components of the network entity.

In some implementations, a UE and one or more components of a network entity may support a signaling mechanism to facilitate common knowledge of a suitable TCI state for the PDCCH order, which may support configuration establishment for scenarios in which the PUCCH-SCell is deactivated in an sTAG that lacks a valid TA value. In some implementations, such a signaling mechanism may provide for direct beam measurement reporting by the UE or indirect beam measurement reporting (such that one or more components of the network may measure, calculate, ascertain, infer, or otherwise determine beam measurement information using the signaling from the UE). In some implementations, the UE may receive an indication of a set of physical random access channel (PRACH) resources associated with at least one serving cell (such as at least one serving cell within the sTAG), and each PRACH resource may be associated with a different downlink reference signal (such as a synchronization signal block (SSB) or a channel state information (CSI) reference signal (CSI-RS)), or a different beam or otherwise different directional transmission. In such implementations, the UE may transmit a random access message over an associated PRACH resource of the set of PRACH resources to convey an associated downlink reference signal or other directional transmission to one or more components of the network entity.

In some implementations, a UE may select a TA value for an sTAG (for example, without or prior to performing a random access procedure) and may transmit beam measurement information via the PUCCH-SCell using the selected TA value for the sTAG. In some other implementations, the UE may transmit beam measurement information (such as CSI) on an available serving cell that is different than the PUCCH-SCell (such as the SpCell), which may include one or more transmissions under temporary conditions. For example, the UE may transmit the beam measurement information on the available serving cell (the SpCell) until the UE receives a TCI state modification message or until expiration of a configured timer. In some implementations, the UE may receive an indication of a beam failure recovery (BFR) configuration for an SCell of the sTAG and, in accordance with one or more aspects of the BFR configuration, may transmit a report indicating one or more candidate reference signals. In some implementations, the one or more components of the network entity and the UE may support cross-PUCCH group scheduling, which refers to cross carrier scheduling across serving cells belonging to different PUCCH groups. In such implementations, the UE may receive, on an available serving cell (such as the SpCell) that is associated with a different PUCCH group than a PUCCH group that the PUCCH-SCell is associated with, a PDCCH transmission triggering CSI (such as beam measurement information) associated with a serving cell within a same TAG as the PUCCH-SCell and the UE may transmit the CSI on the available serving cell. Additionally, or alternatively, the UE may receive, on an available serving cell (such as the SpCell) that is associated with a different PUCCH group than a PUCCH group that the PUCCH-SCell is associated with, a PDCCH transmission triggering a PRACH transmission on a serving cell within a same TAG as the PUCCH-SCell and the UE may perform the PRACH transmission on the serving cell within the same TAG as the PUCCH-SCell accordingly. One or more components of the network entity may receive the signaling from the UE, may understand a suitable beam (for example, via a TCI state), and may transmit a TCI state modification command to the UE to facilitate a common understanding of the TCI state used for the PDCCH order.

Particular implementations of the subject matter described in this disclosure can be implemented to realize one or more of the following potential advantages. For example, as a result of such a signaling mechanism, one or more components of the network entity may obtain knowledge of a suitable beam to use for the PDDCH order for the SCell of the sTAG and may transmit an indication of the beam to the UE (for example, via a TCI state modification command) to support common knowledge of the beam at both the UE and one or more components of the network entity. As such, the UE may experience a greater likelihood for successful reception of the PDCCH order, which may support a greater likelihood for successful establishment of a valid TA for the sTAG. As a result of establishing the valid TA for the sTAG, SCells of the sTAG, including the PUCCH-SCell, may become schedulable for communications between the UE and one or more components of the network entity. Such establishment of a valid TA for the sTAG, even in scenarios in which the PUCCH-SCell belongs to the sTAG and is initially deactivated, may provide for greater system capacity and throughput, greater spectral efficiency, and higher data rates, among other benefits.

FIG. 1 illustrates an example wireless communications system 100 that supports techniques for SCell establishment for UCI. The wireless communications system 100 may include one or more BSs 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (for example, mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a geographic coverage area 110 over which the UEs 115 and the BS 105 may establish one or more communication links 125. The geographic coverage area 110 may be an example of a geographic area over which a BS 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or another interface). The BSs 105 may communicate with one another over the backhaul links 120 (for example, via an X2, Xn, or another interface) either directly (for example, directly between BSs 105), or indirectly (for example, via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation (CA) or multi-carrier operation. A UE 115 may be configured with multiple downlink component carriers and one or more uplink component carriers according to a CA configuration. Carrier aggregation may be used with both frequency division duplexing (FDD) and time division duplexing (TDD) component carriers.

In some implementations (for example, in a CA configuration), a carrier also may have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a BS 105, or downlink transmissions from a BS 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some implementations the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the BSs 105, the UEs 115, or both) may have hardware configurations that support communications over a particular carrier bandwidth or may be configurable to support communications over one of a set of carrier bandwidths. In some implementations, the wireless communications system 100 may include BSs 105 or UEs 115 that support simultaneous communications via carriers associated with multiple carrier bandwidths. In some implementations, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (for example, a duration of one modulation symbol) and one subcarrier, where the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some implementations, a UE 115 may be configured with multiple BWPs. In some implementations, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some implementations, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some implementations, the TTI duration (for example, the number of symbol periods in a TTI) may be variable. Additionally, or alternatively, the smallest scheduling unit of the wireless communications system 100 may be dynamically selected (for example, in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (for example, over a carrier) and may be associated with an identifier for distinguishing neighboring cells (for example, a physical cell identifier (PCID), a virtual cell identifier (VCID), or others). In some implementations, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the BS 105. For example, a cell may be or include a building, a subset of a building, or exterior spaces between or overlapping with geographic coverage areas 110, among other implementations.

A macro cell generally covers a relatively large geographic area (for example, several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A BS 105 may support one or multiple cells and also may support communications over the one or more cells using one or multiple component carriers.

In some implementations, a carrier may support multiple cells, and different cells may be configured according to different protocol types (for example, MTC, narrow band IoT (NB-IoT), enhanced mobile broadband (eMBB)) that may provide access for different types of devices.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may support synchronous or asynchronous operation. For synchronous operation, the BSs 105 may have similar frame timings, and transmissions from different BSs 105 may be approximately aligned in time. For asynchronous operation, the BSs 105 may have different frame timings, and transmissions from different BSs 105 may, in some implementations, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1-M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105). In various implementations, a BS 105, or an access network entity 140, or a core network 130, or some subcomponent thereof, may be referred to as a network entity.

As described herein, a BS 105 may include components that are located at a single physical location or components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 or a BS 105 including components that are located at various physical locations. In some implementations, such a BS 105 including components that are located at various physical locations may be referred to as or may be associated with a disaggregated radio access network (RAN) architecture, such as an Open RAN (O-RAN) or Virtualized RAN (VRAN) architecture. In some examples, such components of a BS 105 may include or refer to one or more of a central unit (CU), a distributed unit (DU), or a radio unit (RU).

The wireless communications system 100 may operate using one or more frequency bands, sometimes in the range of 300 megahertz. (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below: 300 MHZ.

The wireless communications system 100 also may operate in a super high frequency (SHF) region using frequency bands from 3 GHZ to 30 GHZ, also known as the centimeter band, or in an extremely high frequency (EHF) region of the spectrum (for example, from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be based on a CA configuration in conjunction with component carriers operating in a licensed band (for example, LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (for example, a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (for example, by a transmitting device, such as a BS 105, or by a receiving device, such as a UE 115) a beam direction for later transmission or reception by the BS 105.

Some signals, such as data signals associated with a particular receiving device, may be transmitted by a BS 105 in a single beam direction (for example, a direction associated with the receiving device, such as a UE 115). In some implementations, the beam direction associated with transmissions along a single beam direction may be determined based on a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some implementations, transmissions by a device (for example, by a BS 105 or a UE 115) may be performed using multiple beam directions, and the device may use a combination of digital precoding or radio frequency beamforming to generate a combined beam for transmission (for example, from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (for example, a cell-specific reference signal (CRS), a CSI-RS), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some implementations, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

In some systems, such as the wireless communications system 100, a UE 115 and one or more components of a network entity (for example, one or more components of a BS 105 or of multiple BSs 105) may communicate on one or more serving cells. For example, a UE 115 and one or more components of a BS 105 may employ a CA communication scheme according to which the UE 115 and one or more components of the BS 105 may communicate on multiple serving cells, each serving cell associated with a different component carrier. As part of the CA communication scheme, the UE 115 and one or more components of the BS 105 may configure an SpCell, which may be an example of a primary cell (PCell) for a master cell group (MCG) or a primary-secondary cell (PSCell) for a secondary cell group (SCG), and configure one or more SCells. In some examples, the UE 115 and one or more components of the BS 105 may configure an SCell for uplink control signaling, such as uplink control information (UCI), from the UE 115 and such an SCell may be referred to herein as a PUCCH-SCell. In such examples, the UE 115 and one or more components of the BS 105 may group the multiple serving cells into a primary PUCCH group associated with the SpCell and a secondary PUCCH group associated with the PUCCH-SCell such that uplink control signaling associated with a serving cell of the primary PUCCH group is sent on the SpCell and uplink control signaling associated with a serving cell of the secondary PUCCH group is sent on the PUCCH-SCell.

In some scenarios, the PUCCH-SCell may be in a deactivated state and belong to a TAG, such as an sTAG, that lacks a valid TA value. In such scenarios, the UE 115 may be unable to report beam measurement information to one or more components of the BS 105, which may result in ambiguity between the UE 115 and one or more components of the BS 105 in terms of how one or more components of the BS 105 transmits a PDCCH order (such as a PDCCH order sent to initiate a procedure for establishing a valid TA value of the TAG) and how the UE 115 expects to receive the PDCCH order. For example, the UE 115 may be unable (for example, prohibited by a 3GPP standard specification) to report beam measurement information for SCells of the sTAG on the PUCCH-SCell as a result of the PUCCH-SCell lacking a valid TA value or on the SpCell (as may be done in deployments without a configured PUCCH-SCell) as a result of the UE 115 being unable (for example, prohibited by a specification) to perform cross-carrier scheduling across PUCCH groups.

Accordingly, in some implementations, a UE 115 and one or more components of a BS 105 may support a signaling mechanism by which one or more components of the BS 105 may select a directional beam (via a reference signal or a TCI state association) and convey the selected directional beam to the UE 115 (via a TCI state modification command). As such, the UE 115 and one or more components of the BS 105 may share a common understanding of the directional beam that one or more components of the BS 105 uses to transmit the PDCCH order, which may increase the likelihood for successful reception of the PDCCH order at the UE 115 and establishment of the SCells of the sTAG as schedulable (for example, based on a valid TA value). The signaling mechanism supported by the UE 115 and one or more components of the BS 105 may vary across different implementations, and may include messaging designs that enable the transmission of beam measurement information from the UE 115 or messaging designs that enable the transmission of signaling from the UE 115 that one or more components of the BS 105 may use for measuring, calculating, or otherwise determining the beam measurement information from the UE 115.

Figure 2:
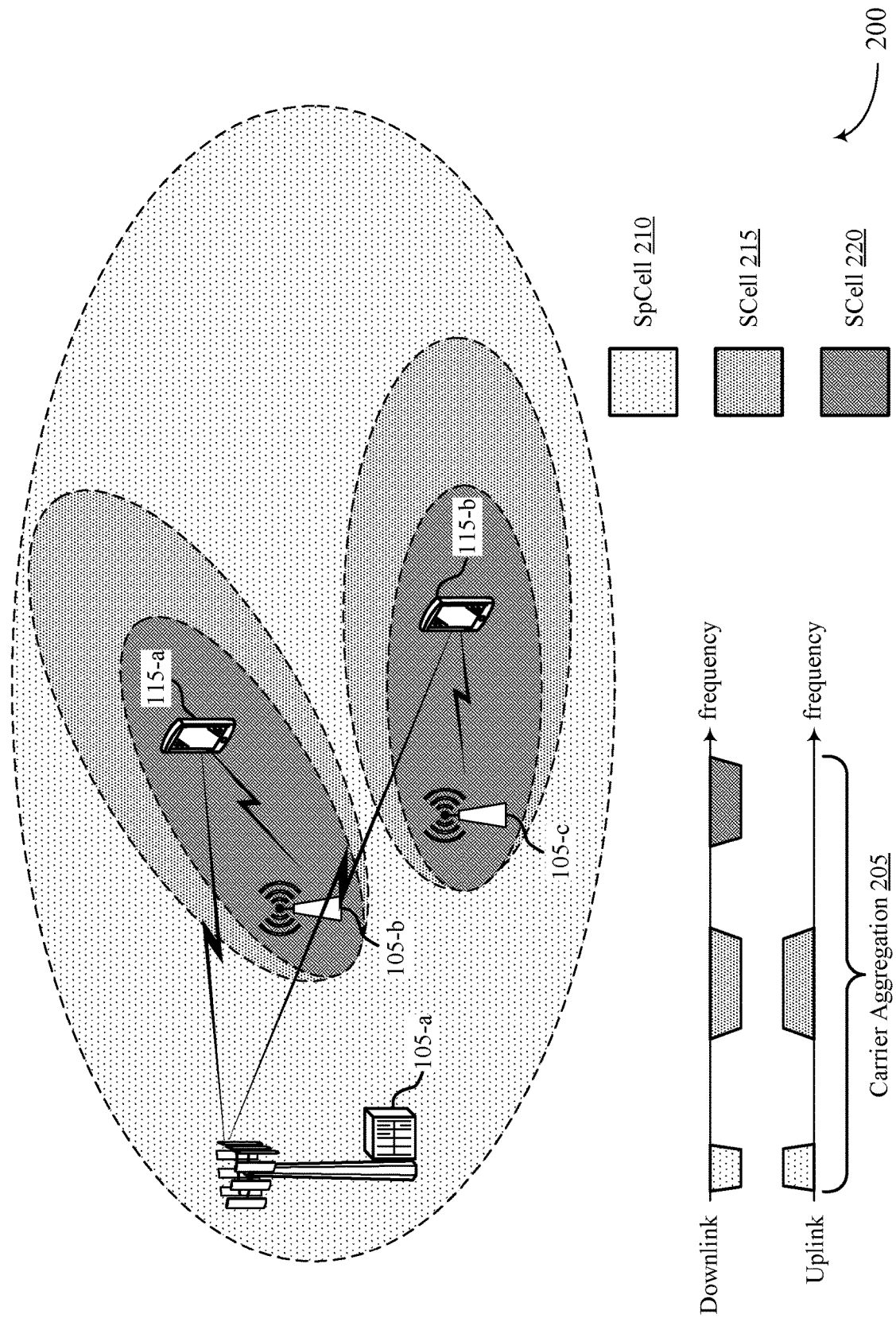
FIG. 2 illustrates an example carrier aggregation (CA) deployment that supports techniques for SCell establishment for UCI.

FIG. 2 illustrates an example CA deployment 200 that supports techniques for SCell establishment for UCI. The CA deployment 200 may implement or be implemented to realize aspects of the wireless communications system 100. For example, the CA deployment 200 may include a UE 115-a and a UE 115-b, a BS 105-a, a BS 105-b, and a BS 105-c. In some implementations, the UEs 115-a and 115-b each may be an example of one or more aspects of a UE 115 as described herein, including with reference to FIG. 1. In some implementations, the BSs 105-a, 105-b, and 105-c each may be an example of one or more aspects of a BS 105 as described herein, including with reference to FIG. 1. In various implementations, each of the BSs 105-a, 105-b, and 105-c may operate as a respective network entity, or some combination of the BSs 105-a, 105-b, and 105-c may collectively operate as a network entity. For example, in some disaggregated RAN (D-RAN) implementations, the BS 105-a may be an example of a CU of a network entity and the BSs 105-b and 105-c each may be an example of a DU or RU of the network entity, or each of the BSs 105-a, 105-b, and 105-c may be an example of a DU or RU of a network entity. In various implementations, such network entities may or may not include one or more components of a core network 130 or other central entity, which may or may not be associated with a CU of a network entity. A UE 115 (such as one or both of the UE 115-a or the UE 115-b) may communicate with a network entity (such as one or more of the BS 105-a, the BS 105-b, or the BS 105-c) on multiple cells in accordance with a CA 205 scheme.

In some implementations, a UE 115 and one or more of the BSs 105-a, 105-b, or 105-c may support a signaling mechanism to support an establishment or activation of a PUCCH-SCell and of one or more SCells of an sTAG, such as under circumstances in which an sTAG lacks a valid TA value. For example, the UEs 115 may support the CA 205 scheme with one or more BSs 105 on one or more serving cells. The one or more serving cells may include one or more macro cells, one or more small cells, or any combination of macro cells and small cells.

As shown in FIG. 2, the BS 105-a may support a macro cell (for example, associated with a relatively larger coverage area) while each of the BS 105-b and the BS 105-c may support small cells (for example, associated with relatively smaller coverage areas). In some examples, the macro cell supported by the BS 105-a may be an example of an SpCell 210, which may be an example of a PCell for an MCG or a PSCell for an SCG. In such examples in which the macro cell is used as an SpCell 210, the BS 105-a may support mobility performance (as compared to scenarios in which a UE 115 exclusively communicates on a macro cell) by avoiding handover between the macro cell and the small cells (such as the small cells supported by the BS 105-b and the BS 105-c). The small cells supported by the BS 105-b and the BS 105-c may be examples of SCells, such as an SCell 215 and an SCell 220. As shown in FIG. 2, the BS 105-b and the BS 105-c each may support a respective SCell 215, a respective SCell 220, or both, which may serve UEs 115 within coverage areas associated with the respective SCell 215 or SCell 220.

A UE 115 (such as the UE 115-a or the UE 115-b) that is located within respective coverage areas associated with each of an SpCell 210, an SCell 215, and an SCell 220 may employ the CA 205 scheme, which may be associated with communicating with the network (such as a network entity) via downlink signaling on one or more serving cells and via uplink signaling on one or more serving cells. For example, in accordance with the CA 205 scheme, the UE 115-a or the UE 115-b may receive downlink signaling on the SpCell 210, an SCell 215, and an SCell 220 and may transmit uplink signaling on the SpCell 210 and the SCell 215. In some aspects, the CA deployment 200 may support the CA 205 scheme in a heterogeneous network (HetNet) scenario.

In some deployment scenarios in which the CA deployment 200 supports the CA 205 scheme, devices within the CA deployment 200 may configure one or more serving cells to support uplink control signaling, such as UCI messages or transmissions, or may configure different TA values for different sets of one or more serving cells (for example, in accordance with a TAG). For example, the devices within the CA deployment 200 may configure the SpCell 210 to support UCI transmissions and, in some implementations, may additionally configure one of an SCell 215 or an SCell 220 to support UCI transmissions. In such implementations, the one of the SCell 215 or the SCell 220 that is configured to support UCI transmissions may be referred to herein as a PUCCH-SCell. Additionally, or alternatively, the devices within the CA deployment 200 may support multiple TA values such that different groups of serving cells (for example, different TAGs) are associated with different TA values. For example, the SpCell 210 may be associated with a first TA value and both an SCell 215 and an SCell 220 may be associated with a second TA value.

In some implementations, the CA deployment 200 may support directional communication and beam controlling (for example, to provide for more reliable communication). For example, the devices within the CA deployment 200 may perform beamforming or other selective configuration of transmission direction, reception direction, or both to orient or focus communications along a specific direction. In other words, the devices within the CA deployment 200 may directionally transmit to each other, directionally receive from each other, or both. The directional signaling of the devices of the CA deployment 200 may be controlled or configured by a TCI state setting. For example, a directional beam, such as a transmit beam, may be associated with a reference signal transmitted using the directional beam, such as an SSB or a CSI-RS, and a device may indicate a directional beam to use by indicating a TCI state associated with the directional beam and the reference signal. A BS 105, for example, may receive, from a UE 115, beam-related feedback (such as reference signal receive power (RSRP) feedback) or a random access message over a PRACH resource that is associated with a beam (such as a transmit beam) or reference signal, and detect or infer a suitable beam using the beam-related feedback or the random access message. In various implementations, based on such a detection or inference, the BS 105 may modify or select a directional beam for transmission or reception by the BS 105, or may signal a directional beam for transmission or reception by the UE 115. In some implementations, such signaling to the UE 115 may be associated with the BS 105 indicating a TCI state to the UE 115 (for example, via RRC signaling or MAC control element (MAC-CE) signaling).

In some examples, a UE 115 may attempt establish one or more SCells, such as one or both of an SCell 215 or an SCell 220, for communications between the UE 115 and a the network and, if the one or more SCells belong to an sTAG which does not have a valid TA value, the UE 115 and the network (for example, a network entity or a BS 105) may experience difficulty in establishing a valid TA value for the sTAG. For example, if a deactivated PUCCH-SCell belongs to the sTAG, the UE 115 may be unable to report beam measurement information to a network entity and, accordingly, the network or network entity may be unaware of a suitable beam to use for transmissions to the UE 115. As such, a BS 105 may use a directional beam (for example, a TCI state) for the transmissions to the UE 115 that the UE 115 is unable to receive, which may result in a failure for signaling exchanges that would otherwise enable the UE 115 to measure, select, or otherwise determine a valid TA value for the sTAG.

In some implementations, a UE 115 and the network (for example, a network entity) may support a signaling mechanism that facilitates a selection of an appropriate or suitable beam by the network and a transmission of an indication of the appropriate or suitable beam from the network entity (for example, a BS 105) to the UE 115. The signaling mechanism may include messaging designs and triggering conditions according to which the UE 115 transmits an indication of beam measurement information for beams (for example, reference signals) associated with one or more SCells (for example, of a TAG or sTAG, or of a PUCCH group) or according to which the UE 115 transmits signaling from which the network entity (for example, a BS 105) may derive the beam measurement information for the beams (for example, for the reference signals) associated with the one or more SCells.

Although the BS 105-a, the BS 105-b, and the BS 105-c are illustrated as distinct BSs 105, in some implementations of the described techniques, the BS 105-a, the BS 105-b, and the BS 105-c may represent components of a same BS 105 or other network entity. Moreover, in various implementations of the described techniques, the BS 105-a, the BS 105-b, and the BS 105-c may be located at various geographic locations (as shown) or may be located at a same (or approximately the same) geographic location. In some implementations, the described techniques for beam controlling (via TCI state), PUCCH-SCell configuration, and support for multiple TA values may be examples of features that devices within the CA deployment 200 are capable of, and may be independent features. For example, a device may perform beam management functions, PUCCH-SCell functions, and multi-TA value functions independently of each other.

Figure 3:
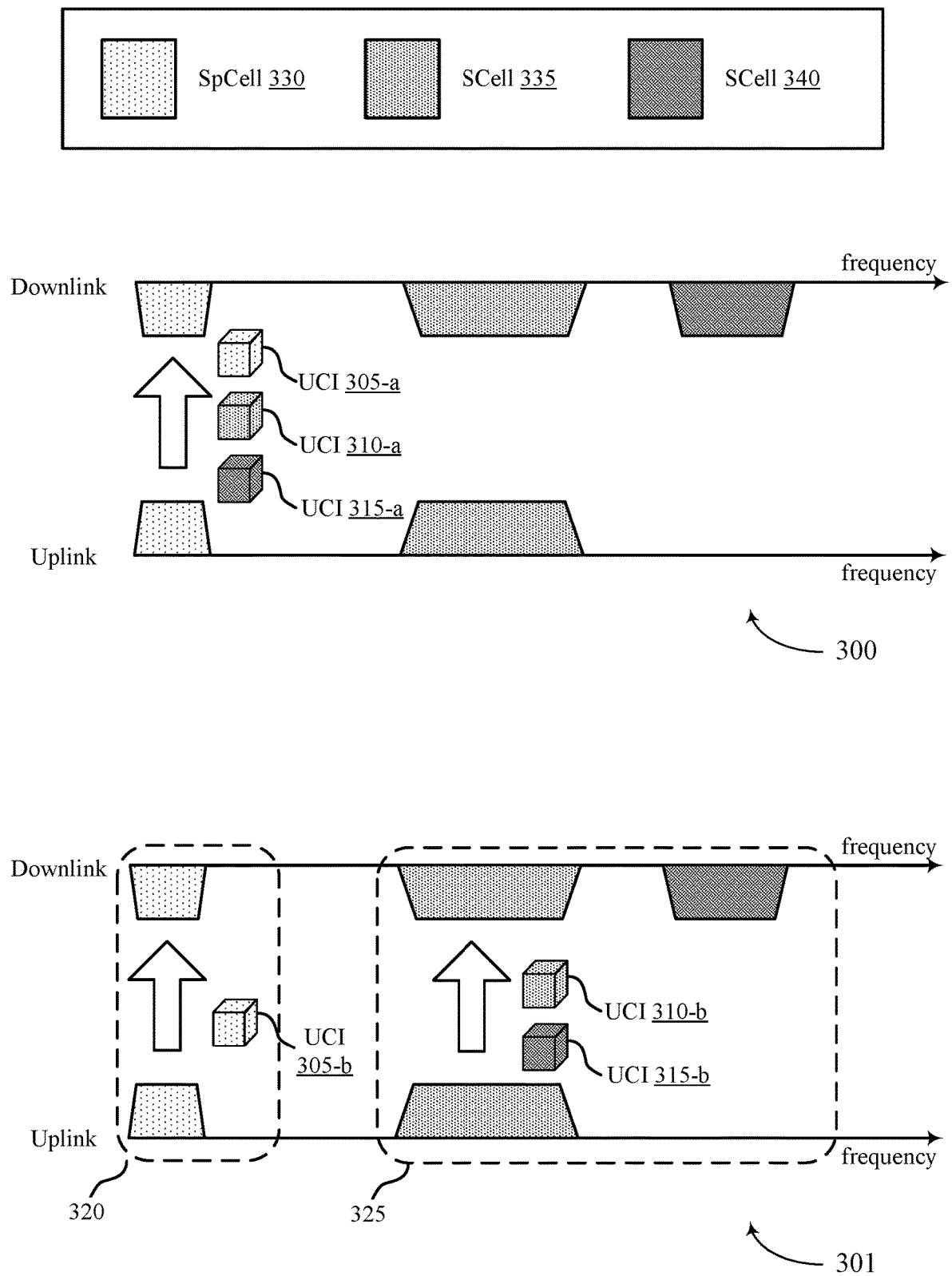
FIGS. 3 and 4 illustrate example CA techniques that support techniques for SCell establishment for UCI.

FIG. 3 illustrates example CA techniques 300 and 301 that support techniques for SCell establishment for UCI. The CA techniques 300 and 301 may implement or be implemented to realize aspects of the wireless communications system 100 or the CA deployment 200. For example, a UE 115 may communicate with a network entity (for example, or one or more components of one or more BSs 105) in accordance with the CA techniques 300 or 301. In some implementations, such a UE 115 may be an example of one or more aspects of a UE 115 as described herein, including with reference to FIGS. 1 and 2. In some implementations, such a network entity may be an example of one or more aspects of a BS 105 as described herein, including with reference to FIGS. 1 and 2. In some examples, the UE 115 and the network entity may support a signaling mechanism to support an establishment or activation of a PUCCH-SCell and of one or more SCells of an sTAG, such as under circumstances in which the sTAG lacks a valid TA value.

The UE 115 and the network entity may communicate on multiple serving cells, including an SpCell 330, an SCell 335, and an SCell 340, using a CA technique. In some examples, and in accordance with the CA technique 300, the UE 115 and the network entity may support communication of UCI using a PUCCH of the SpCell 330 (for example, the macro cell) and may refrain from using either of the SCell 335 or the SCell 340 for UCI. For example, the UE 115 may transmit UCI 305-a associated with the SpCell 330, UCI 310-a associated with the SCell 335, and UCI 315-a associated with the SCell 340 on the SpCell 330 (and may refrain from transmitting UCI on either of the SCell 335 or the SCell 340). In such examples, an amount of available uplink resources on the SpCell 330 (for example, the macro cell) may limit a number of small cells that may be deployed as SCells (such as the SCell 335 and the SCell 340). In other words, the amount of available uplink resources on the SpCell 330 may act as a bottleneck (for example, a limiting condition or constraint) on the number of small cells that may be deployed as SCells in a HetNet scenario.

To reduce the limitation or constraint associated with exclusively transmitting UCI on the SpCell 330, the UE 115 and the network entity may configure a PUCCH-SCell to offload the uplink resource usage to report UCI from the SpCell 330 to an SCell (for example, within a HetNet scenario). For example, and in accordance with the CA technique 301, the UE 115 and the network entity may configure one SCell with a PUCCH. As shown in the CA technique 301, the UE 115 and the network entity may configure the SCell 335 as the PUCCH-SCell and the UE 115 may transmit UCI on both the SpCell 330 and the SCell 335 (the PUCCH-SCell). Further, the UE 115 and the network entity may group serving cells to be associated with one of the SpCell 330 or the PUCCH-SCell for UCI transmission. The group of serving cells associated with the SpCell 330 may be referred to herein as a primary PUCCH group 320, and the group of serving cells associated with the PUCCH-SCell may be referred to herein as a secondary PUCCH group 325.

In some implementations, the UE 115 may transmit over a PUCCH resource on both the SpCell 330 and the PUCCH-SCell, which may include transmitting UCI of a serving cell on one of the SpCell 330 or the PUCCH-SCell depending on whether the serving cell belongs to the primary PUCCH group 320 or the secondary PUCCH group 325. As shown in the CA technique 301, the SpCell 330 may belong to the primary PUCCH group 320 and both the SCell 335 (the PUCCH-SCell) and the SCell 340 may belong to the secondary PUCCH group 325. As such, the UE 115 may transmit UCI 305-b associated with the SpCell 330 on the SpCell 330 and may transmit UCI 310-b associated with the SCell 335 and UCI 315-b associated with the SCell 340 on the SCell 335 (the PUCCH-SCell). In other words, the UE 115 may transmit UCI of a serving cell on an associated PUCCH (such as a PUCCH of one of the SpCell 330 or the PUCCH-SCell depending on to which of the SpCell 330 or the PUCCH-SCell the serving cell is associated). As a result of using the SpCell 330 and the PUCCH-SCell for UCI, an amount of available uplink resources on the SpCell 330 (for example, the macro cell) may be relaxed, which may be associated with less deployment restrictions or constraints.

Figure 4:
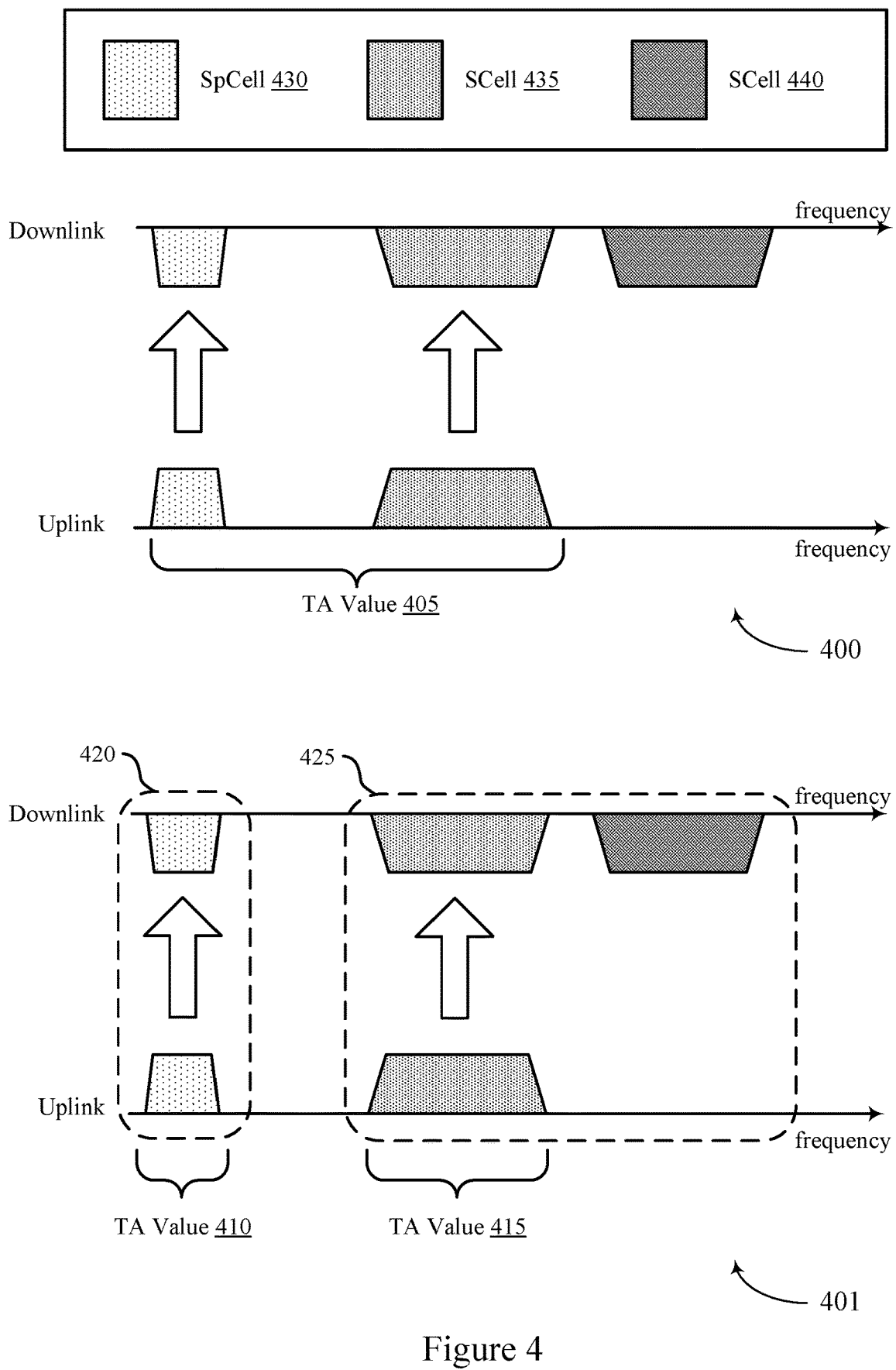

FIG. 4 illustrates example CA techniques 400 and 401 that support techniques for SCell establishment for UCI. The CA techniques 400 and 401 may implement or be implemented to realize aspects of the wireless communications system 100 or the CA deployment 200. For example, a UE 115 may communicate with a network entity (or one or more components of one or more BSs 105) in accordance with the CA techniques 400 or 401. In some implementations, such a UE 115 may be an example of one or more aspects of a UE 115 as described herein, including with reference to FIGS. 1-3. In some implementations, such a network entity may be an example of one or more aspects of a BS 105 as described herein, including with reference to FIGS. 1-3. In some examples, the UE 115 and the network entity may support a signaling mechanism to support an establishment or activation of a PUCCH-SCell and of one or more SCells of an sTAG in scenarios in which the sTAG lacks a valid TA value.

The UE 115 and the network entity may communicate on multiple serving cells, including an SpCell 430, an SCell 435, and an SCell 440, using a CA technique. In some implementations, and in accordance with the CA technique 400, the UE 115 and the network entity may support a TA value 405 (for example, a single TA value) that is shared between uplink transmissions on various serving cells. For example, an uplink transmission timing for the SpCell 430 (for example, a macro cell) may apply to uplink transmissions on the SCell 435 or the SCell 440 (for example, small cells). In such examples in which the UE 115 uses a single TA value 405 for uplink transmissions across various or diversely located serving cells, and in which the UE 115 or the network entity configures the TA value 405 for the SpCell 430, the uplink transmission timings that the UE 115 uses for uplink transmissions on the SCell 435 or the SCell 440 may be less suitable for the respective cell size (for example, when the SCell 435 and the SCell 440 are associated with different cell sizes than the SpCell 430).

To improve the implementation of TA values with respect to cell size, the UE 115 and the network entity may, in some examples, use multiple TA values and maintain separate TA values for different groups of cells in CA (for example, in HetNet scenarios). In such examples in which the UE 115 and the network entity supports multiple TA values that are maintained separately, and in accordance with the CA technique 401, the UE 115 and the network entity may group serving cells into multiple TAGs, such as a TAG 420 and a TAG 425. The group of serving cells including the SpCell 430 (for example, the TAG 420) may be referred to as or understood as a pTAG and the group of serving cells including SCells (for example, the TAG 425, which may exclusively include SCells) may be referred to as or understood as an sTAG.

For uplink transmission on a given serving cell, the UE 115 may use a TA value associated with the TAG into which that serving cell is grouped. For example, and as shown in the CA technique 401, the UE 115 may use a TA value 410 of the TAG 420 (the pTAG) for uplink transmissions on any serving cell within the TAG 420 and the UE 115 may use a TA value 415 of the TAG 425 (the sTAG) for uplink transmissions on any serving cell associated with the TAG 425. As a result of separately maintaining the TA value 410 for the TAG 420 and the TA value 415 for the TAG 425, uplink transmission timing on an SCell (for example, a small cell) may be more suitable for a cell size associated with the SCell.

In some implementations, the UE 115 may establish the TA value for the TAG 425 (the sTAG) through a random access procedure triggered for an SCell of the TAG 425 via a PDCCH order. In some circumstances, however, if there is no valid TA value for a TAG (for example, if a TA value timer is not running for the TAG), the UE 115 may be unable to transmit signaling except for random access messages (such as PRACH transmissions) on the uplinks of the TAG.

Figure 5:
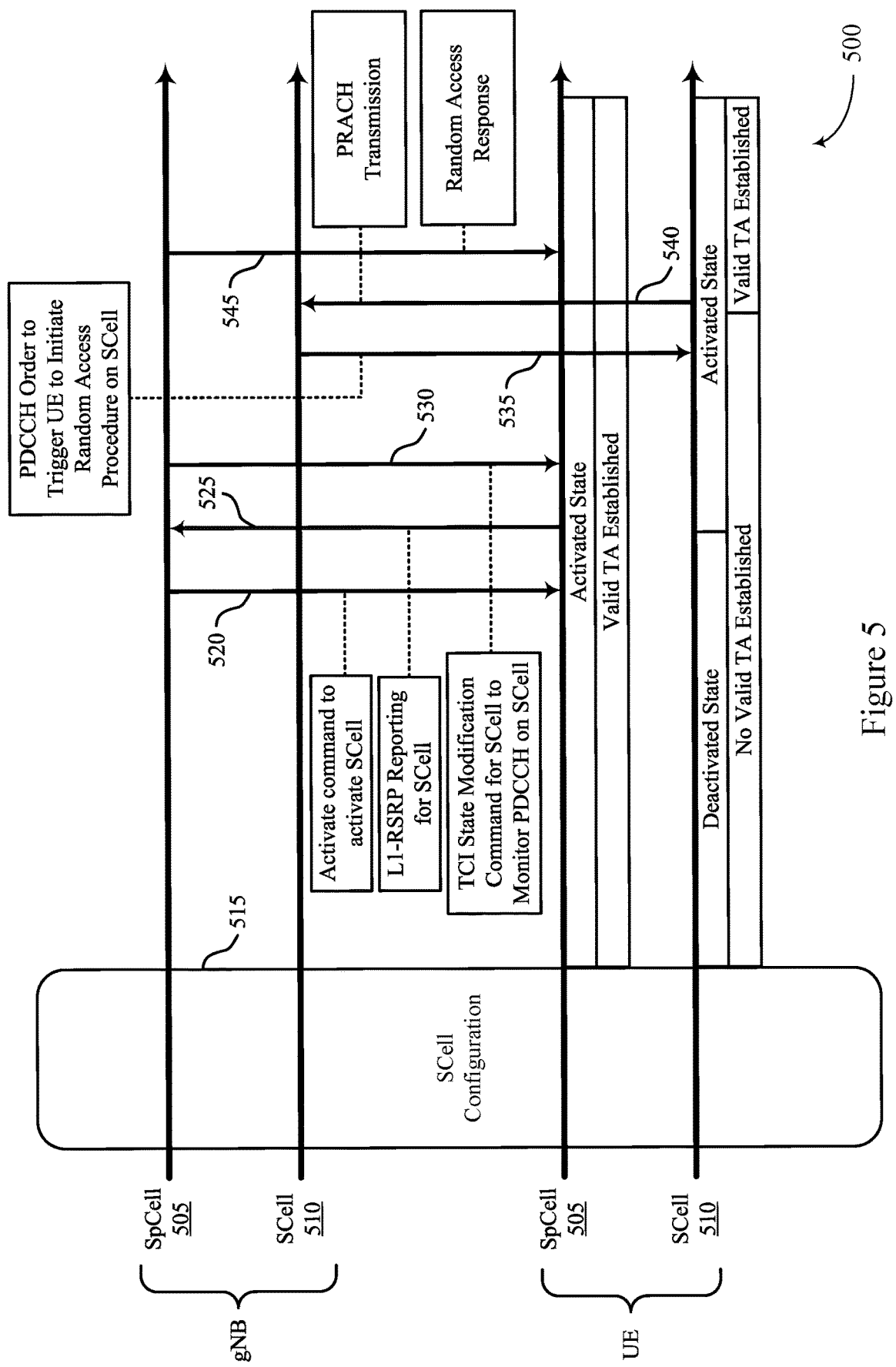
FIGS. 5 and 6 illustrate example communication timelines that support techniques for SCell establishment for UCI.

FIG. 5 illustrates an example communication timeline 500 that supports techniques for SCell establishment for UCI. The communication timeline 500 may implement or be implemented to realize aspects of the wireless communications system 100 or the CA deployment 200. For example, a UE 115 may communicate with a network entity (for example, or one or more components of one or more BSs 105, a gNB) in accordance with the communication timeline 500. In some implementations, such a UE 115 may be an example of one or more aspects of a UE 115 as described herein, including with reference to FIGS. 1-4. In some implementations, such a network entity may be an example of one or more aspects of a BS 105 as described herein, including with reference to FIGS. 1-4. In some examples, the UE 115 and the network entity may support a signaling mechanism to support an establishment or activation of an SCell 510 of an sTAG in scenarios in which the sTAG lacks a valid TA value. The communication timeline 500 may be an example of a procedure that may be supported in a MAC layer protocol or specification for activation of an SCell 510 in an sTAG.

In some implementations, the UE 115 and the network entity (shown in FIG. 5 as a gNB for purpose of example) may support CA on at least an SpCell 505 and the SCell 510 and, in some scenarios, the SpCell 505 may belong to a pTAG associated with a valid TA value and the SCell 510 may belong to an sTAG lacking a valid TA value (for example, for a duration during activation of the SCell 510 there may be no valid TA value established for the sTAG). The network entity may configure the SCell 510 in accordance with an SCell configuration 515, which may be associated with various establishment procedures and signaling, and may be associated with an RRC-level configuration. In some implementations, the SCell 510 may initially be in a deactivated state and the sTAG to which the SCell 510 belongs may lack a valid TA value. In some implementations, the SpCell 505 may initially be in an activated state and the pTAG to which the SpCell 505 belongs may be associated with a valid TA value.

To support establishment of the SCell 510 as schedulable, at 520, the network entity may transmit, to the UE 115 on the SpCell 505, an activation command to activate the SCell 510. The UE 115 may receive the activation command to activate the SCell 510 and, at 525, the UE 115 may transmit, to the network entity on the SpCell 505 (and responsive to the activation command), a beam report for the SCell 510. For example, the UE 115 may transmit Layer 1 RSRP (L1-RSRP) reporting signaling for the SCell 510 to indicate, to the network entity, beam evaluation or beam measurement information associated with one or more reference signals (such as downlink reference signals) measured by the UE 115 on the SCell 510.

The network entity may receive the L1-RSRP reporting and may select a TCI state for communications with the UE 115 in accordance with the L1-RSRP reporting. For example, the network may select an appropriate or suitable beam direction (for example, a transmission direction, via a TCI state selection) in accordance with which one or more downlink reference signals were measured by the UE 115 as having a greatest signal strength or quality (such as a greatest L1-RSRP metric). At 530, the network entity may transmit, to the UE 115 on the SpCell 505, a TCI state modification command for the SCell 510 that the UE 115 may use to monitor a PDCCH on the SCell 510 for a PDCCH order. For example, the network entity may indicate, via the TCI state modification command, a TCI state (which may correspond to or otherwise be associated with a beam direction) that the UE 115 may use to receive a PDCCH order from the network entity.

As a result of transmitting the TCI state modification command to the UE 115 on the SpCell 505 at 530, the network entity may transmit, to the UE 115 on the SCell 510, the PDCCH order to trigger the UE 115 to initiate a random access procedure on the SCell 510. The network entity may transmit the PDCCH order at 535 and via a directional beam corresponding to or associated with the TCI state indicated by the TCI state modification command sent at 530. The UE 115 may receive the PDCCH order on the SCell 510 as a result of using the TCI state indicated by the TCI state modification command and may initiate a random access procedure on the SCell 510 to measure, calculate, or otherwise determine a valid TA for the SCell 510 (and for the sTAG to which the SCell 510 belongs).

As part of the random access procedure, at 540, the UE 115 may perform, to the network on the SCell 510, a PRACH transmission (for example, a random access message, such as a Msg1 or a MsgB random access message). The network entity may receive the PRACH and may transmit, responsive to the PRACH transmission, a random access response on the SpCell 505 to be processed for the SCell 510. For example, the UE 115 may receive the random access response on the SpCell 505 and, using timing information associated with the PRACH transmission and the reception of the random access response, may derive a TA value for the SCell 510 (and for the sTAG to which the SCell 510 belongs). As such, the SCell 510 may be an activated SCell 510 and may have a valid TA value established, which may satisfy a criteria for establishing the SCell 510 as schedulable.

Figure 6:
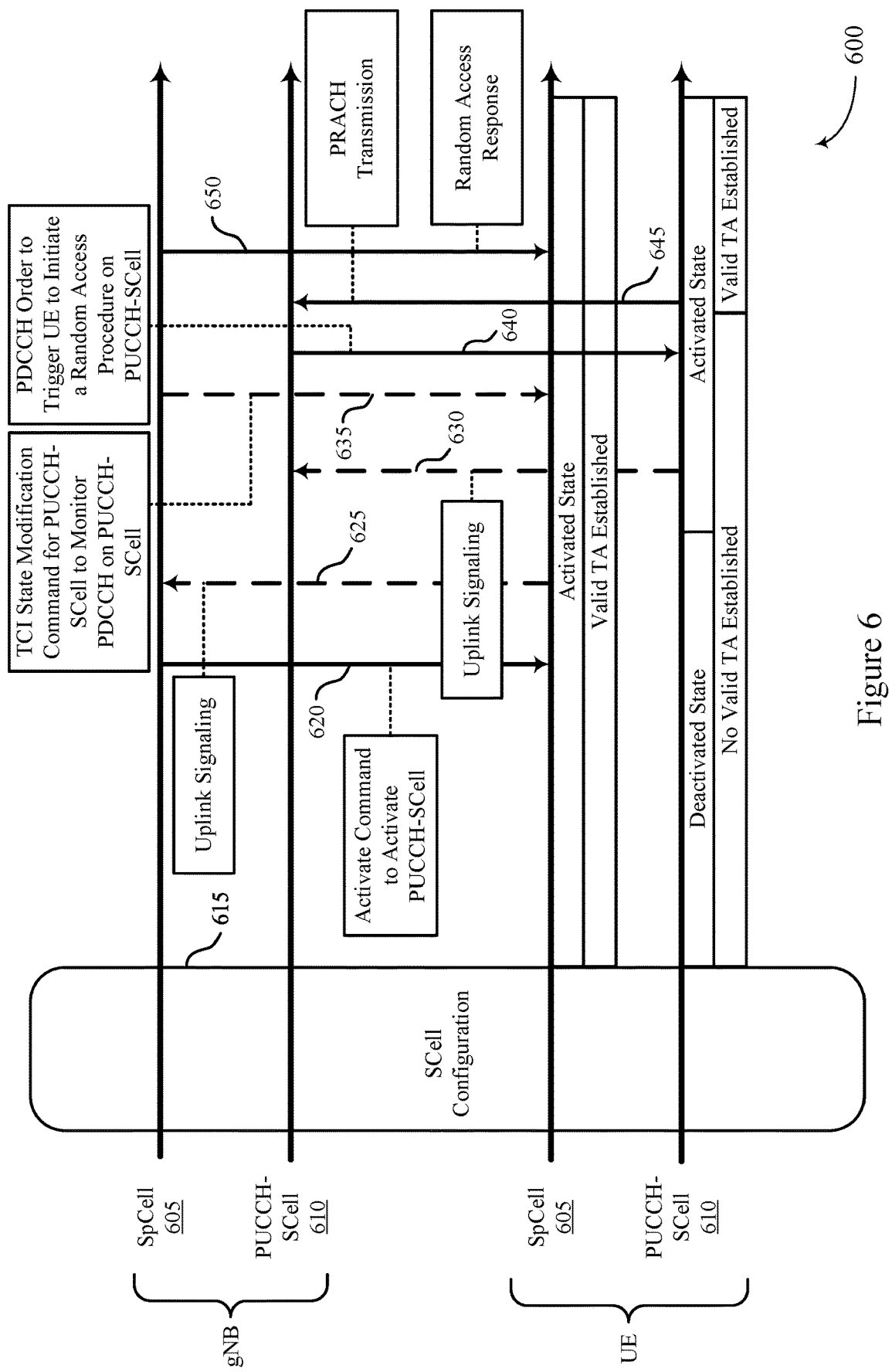

FIG. 6 illustrates an example communication timeline 600 that supports techniques for SCell establishment for UCI. The communication timeline 600 may implement or be implemented to realize aspects of the wireless communications system 100 or the CA deployment 200. For example, a UE 115 may communicate with a network entity (or one or more components of one or more BSs 105) in accordance with the communication timeline 600. In some implementations, such a UE 115 may be an example of one or more aspects of a UE 115 as described herein, including with reference to FIGS. 1-5. In some implementations, such a network entity may be an example of one or more aspects of a BS 105 as described herein, including with reference to FIGS. 1-5. In some examples, the UE 115 and the network entity may support a signaling mechanism to support an establishment or activation of a PUCCH-SCell 610 and of one or more SCells of an sTAG, including scenarios in which the sTAG lacks a valid TA value. The communication timeline 600 may be an example of a procedure that may be supported in a MAC layer protocol or specification for activation of a PUCCH-SCell 610 in an sTAG.

In some implementations, the UE 115 and the network entity (shown in FIG. 6 as a gNB for purpose of example)

may support CA on at least an SpCell 605 and the PUCCH-SCell 610 and, in some scenarios, the SpCell 605 may belong to a pTAG associated with a valid TA value and the PUCCH-SCell 610 may belong to an sTAG lacking a valid TA value (for example, for a duration during activation of the PUCCH-SCell 610 there may be no valid TA value established for the sTAG). The network entity may configure the PUCCH-SCell 610 in accordance with an SCell configuration 615 (for example, a PUCCH SCell configuration), which may be associated with various establishment procedures and signaling, and may be associated with an RRC-level configuration. In some implementations, the PUCCH-SCell 610 may initially be in a deactivated state and the sTAG to which the PUCCH-SCell 610 belongs may lack a valid TA value. In some implementations, the SpCell 605 may initially be in an activated state and the pTAG to which the SpCell 605 belongs may be associated with a valid TA value.

To support establishment of the PUCCH-SCell 610 as schedulable, at 620, the network entity may transmit, to the UE 115 on the SpCell 605, an activation command to activate the PUCCH-SCell 610. The UE 115 may receive the activation command to activate the PUCCH-SCell 610 but may be unable to report any beam evaluation or measurement information to the network entity. For example, in some systems, the UE 115 may be unable to report beam evaluation or measurement information for the PUCCH-SCell 610 because such information, which the UE 115 may transmit via UCI, may be configured for signaling on the PUCCH-SCell 610 (as a result of the UCI being associated to the secondary PUCCH group corresponding to the PUCCH-SCell 610) and because the PUCCH-SCell 610 lacks a valid TA value (such that transmissions, outside of PRACH transmissions, on the PUCCH-SCell 610 are restricted). In some implementations, as a result of the PUCCH-SCell 610 being configured for UCI, the UE 115 may be unable (per a specification) to report the beam evaluation or measurement information on another already available serving cell and, as a result of the PUCCH-SCell 610 belonging to an sTAG that does not have a valid TA value, the UE 115 also may be unable to transmit the beam evaluation or measurement information on the PUCCH-SCell 610.

Likewise, the network entity may be unable to receive the beam evaluation or measurement information (because the UE 115 is unable to transmit such information) and, accordingly, may be unable to provide a TCI state modification command to the UE 115. In such examples in which the network entity is unable to receive the beam evaluation or measurement information and unable to provide a TCI state modification command to the UE 115, the TCI state that the UE 115 uses to receive a PDCCH order on the PUCCH-SCell 610 may be different from the TCI state that the network entity uses to transmit the PDCCH order on the PUCCH-SCell 610, which may result in the UE 115 being unable to successfully receive the PDCCH order. For example, the network entity may transmit the PDCCH order to trigger the UE 115 to initiate a random access procedure on the PUCCH-SCell 610 at 640.

In scenarios in which the network entity is unable to provide a TCI state modification command, however, the UE 115 may be unable to receive the PDCCH order as a result of the TCI states not yet being identical at the UE 115 and the network entity. Accordingly, in such scenarios, the UE 115 may be unable to transmit a PRACH transmission on the PUCCH-SCell 610 at 645 and likewise may be unable to derive a TA value using a responsive random access response. Further, although illustrated and described in the context of receiving the PDCCH order for the PUCCH-SCell, the PDCCH order may be for a PRACH transmission on any SCell in the sTAG, and the UE 115 may be unable to receive such a PDCCH order for any other SCell for similar reasons.

In accordance with implementations disclosed herein, the UE 115 and the network entity may support a signaling mechanism to support common knowledge of beam evaluation and measurement information between the UE 115 and the network entity such that the network entity is able to select an appropriate or suitable TCI state for the reception of the PDCCH order on the PUCCH-SCell 610. Various signaling mechanisms are described, and the UE 115 and the network entity may support or perform any one or more of the various signaling mechanisms. In some implementations, the UE 115 may transmit a PRACH transmission on a serving cell in accordance with a PRACH configuration (such that reception of the PDCCH order may be avoided or less relied upon). In some implementations, the UE 115 may obtain a TA value for the sTAG without performing a random access procedure on a serving cell (for example, by using a signaled or configured TA value). In some implementations, the UE 115 may report beam information for the PUCCH-SCell 610 on an already-available serving cell (for example, in accordance with a temporary condition). In some implementations, the UE 115 may report beam information for the PUCCH-SCell using a BFR mechanism such that the UE 115 reports candidate beams (with may be associated with candidate reference signals) via a BFR MAC-CE. In some implementations, the network entity may blindly (without input from the UE 115) set a TCI state for a PDCCH order and cycle through TCI states until the UE 115 successfully receives the PDCCH order.

In implementations in which the UE 115 transmits a PRACH transmission on a serving cell to inform the network entity of the beam information of the serving cell, the network entity may detect or infer beam information from the UE 115 using the PRACH transmitted by the UE 115 (for example, utilizing a similar concept of beam management on the SpCell 605 in accordance with a random access procedure). In such implementations, the UE 115 may receive an indication or configuration associated with a set of PRACH resources for at least one serving cell (such as for at least one SCell in the sTAG) and each PRACH resource of the set of PRACH resources may be associated with a reference signal (such as an SSB or a CSI-RS). If a condition is met or satisfied, the UE 115 may trigger PRACH transmission on the serving cell configured with the set of PRACH resources. In some implementations, each reference signal may correspond to or be otherwise associated with a beam or other directional communication of the network entity, such that transmitting a PRACH transmission over a resource corresponding to a particular reference signal may inform the network entity of the beam information associated with the serving cell. For example, the UE 115 may transmit over a PRACH resource corresponding to a downlink beam (for example, corresponding to an associated downlink reference signal) that the UE 115 considers as a suitable (for example, if a corresponding reference signal is received at or above a configured signal quality), such that the network entity may be able to infer a suitable beam for communication with the UE 115 based on which PRACH resource is used by the UE 115 for the PRACH.

In some examples, a condition according to which the UE 115 performs the PRACH transmission may include a command (such as an explicit command) to trigger PRACH transmission. Such a command may include a PDCCH order, an RRC message, or a MAC-CE. In such examples, the UE 115 may receive the command on an already available serving cell, such as the SpCell 605. Additionally, or alternatively, the UE 115 may be triggered to transmit the PRACH transmission in response to receiving or detecting the activation command (a MAC-CE or a physical downlink shared channel (PDSCH) message including the MAC-CE), or based on the UE 115 transmitting HARQ feedback for the activation command, or based on the UE 115 starting an activation process for the PUCCH-SCell 610. In various implementations, such a condition may trigger the PRACH transmission directly (for example, the condition may be a dedicated trigger for the PRACH transmission) or indirectly. In examples in which the condition triggers the PRACH transmission indirectly, the UE 115 may utilize an existing procedure or trigger for the PRACH transmission (such as a buffer status report (BSR)).

The serving cell for which the network entity configures the PRACH resources and on which the UE 115 transmits the PRACH transmission may include various serving cells. For example, the serving cell may be the PUCCH-SCell 610, or a serving cell indicated by the network entity (such that the UE 115 may receive an indication of the serving cell), or an SCell which belongs to a same TAG as the PUCCH-SCell 610 (such as the sTAG). The PRACH resources that the network entity configures for the serving cell and the associated random access procedure may be of any type of random access procedure, including a contention-based random access procedure, a contention-free random access procedure, a 4-step random access procedure, or a 2-step random access procedure, among other configurations of random access procedures.

In some implementations in which the UE 115 transmits a PRACH transmission over a PRACH resource of the set of PRACH resources, the UE 115 may transmit the PRACH transmission via uplink signaling sent at 630. As such, the network entity may be able to understand a suitable beam (which may be associated with a suitable TCI state) using the received PRACH resource and may select the suitable TCI state for the PDCCH reception on the serving cell (such as on the PUCCH-SCell 610). Accordingly, in such implementations, the network entity may transmit a TCI state modification command at 635 indicating the suitable TCI state for the PUCCH-SCell 610 to use for monitoring for the PDCCH order over a PDCCH on the PUCCH-SCell. The UE 115 may monitor for the PDCCH order using the indicated TCI state and, in some examples, at 640, may successfully receive the PDCCH order using the indicated TCI state. At 645, the UE 115 may perform a PRACH transmission in accordance with the PDCCH order and, at 650, may receive a random access response on the SpCell 605, which the UE 115 may process to derive a TA value for the PUCCH-SCell 610 and for the sTAG.

In implementations in which the UE 115 obtains a TA value for the sTAG without performing a random access procedure on an SCell, the UE 115 may consider or assume that there is a valid TA value (for example, that uplink is in-sync) for the sTAG as a result of a specific event. The specific event may include various options, including the UE 115 completing activation of an SCell (with uplink) in the TAG or completing activation for the PUCCH-SCell 610 or receiving a specific message, such as an activate command for the PUCCH-SCell, a TA command MAC-CE, an absolute TA command MAC-CE, a random access response, or a MsgB, among others. In some examples, a specific message that triggers the consideration or assumption of the valid TA value may include other information, such as power control command information, uplink grant information, or listen-before-talk (LBT) information, among other examples.

The TA value that the UE 115 considers or assumes to be valid may be a TA value that is signaled by the network entity (such that the UE 115 receives an indication of the TA value from the network entity) or may be a specific or configured value (such as zero). The UE 115 may manage a TA timer in various ways. In some examples, the UE 115 may start a TA timer for the TAG as a result of considering or assuming that there is a valid TA for the TAG. In such examples, the UE 115 may receive an indication of a duration of the TA timer from the network entity or the duration of the TA timer may be a specific or configured value (such as 100 ms). In some other examples, the UE 115 may refrain from starting a TA timer as a result of considering or assuming that there is a valid TA for the TAG and may instead start the TA timer as a result of receiving a next TA command thereafter.

The UE 115, using the considered or assumed valid TA value, may report beam information for one or more serving cells in the secondary PUCCH group and in the sTAG via a serving cell of the sTAG, such as the PUCCH-SCell 610. The beam information may include one or more CSI metrics, one or more L1-RSRP metrics, one or more reference signal receive quality (RSRQ) metrics, one or more signal-to-interference-plus-noise ratio (SINR) metrics, or any combination thereof. In such implementations in which the UE 115 considers the valid TA value for the sTAG and transmits the beam information to the network entity (on the PUCCH-SCell 610), the UE 115 may transmit the beam information via uplink signaling sent at 630.

In such implementations, the network entity may be able to understand a suitable beam (such as a suitable TCI state) using the received beam information and may select the suitable TCI state for the PDCCH reception on the serving cell (such as on the PUCCH-SCell 610). Accordingly, in such implementations, the network entity may transmit a TCI state modification command at 635 indicating the suitable TCI state for the PUCCH-SCell 610 to use for monitoring for the PDCCH order over a PDCCH on the PUCCH-SCell. The UE 115 may monitor for the PDCCH order using the indicated TCI state and, in some examples, at 640, may successfully receive the PDCCH order using the indicated TCI state. At 645, the UE 115 may transmit a PRACH transmission in accordance with the PDCCH order and, at 650, may receive a random access response on the SpCell 605 (which the UE 115 may process to derive a TA value for the PUCCH-SCell 610 and for the sTAG).

In implementations in which the UE 115 reports CSI for one or more SCells in the sTAG on an uplink of an already available serving cell temporarily, the UE 115 may report CSI on the other available serving cell until an uplink for the PUCCH-SCell 610 is available. In such implementations, for example, the UE 115 may start reporting CSI for the PUCCH-SCell 610 on the already available serving cell (such as the SpCell 605) temporarily as a result of receiving the activation command for the PUCCH-SCell 610 at 620. For example, at 625, the UE 115 may transmit, to the BS 105 on the SpCell 605, the CSI. The UE 115 may stop or disable the temporary reporting on the already available serving cell (such as the SpCell 605) as a result of receiving a TCI state modification command or an expiration of a timer.

In such implementations, the network entity may be able to understand a suitable beam (such as a suitable TCI state) using the received CSI and may select the suitable TCI state for the PDCCH reception on the serving cell (such as on the PUCCH-SCell 610). Accordingly, in such implementations, the network entity may transmit the TCI state modification command at 635 indicating the suitable TCI state for the PUCCH-SCell 610 to use for monitoring for the PDCCH order over a PDCCH on the PUCCH-SCell. The UE 115 may monitor for the PDCCH order using the indicated TCI state and, in some examples, at 640, may successfully receive the PDCCH order using the indicated TCI state. At 645, the UE 115 may transmit a PRACH transmission in accordance with the PDCCH order and, at 650, may receive a random access response on the SpCell 605 (which the UE 115 may process to derive a TA value for the PUCCH-SCell 610 and for the sTAG).

In implementations in which the UE 115 reports beam information for an SCell (such as the PUCCH-SCell 610) using a BFR mechanism, the UE 115 may receive a BFR configuration for the SCell, and may trigger a reporting of beam information in accordance with one or more aspects of the BFR mechanism for the SCell if a condition is met or satisfied. For example, when a quality of a serving beam is low (such as at or below a threshold quality), the UE 115 may inform the network entity of an event and information associated with candidate new beams. In such implementations, the UE 115 may report the beam information to the network entity via an indication of one or more candidate reference signals, each of which may correspond to or be otherwise associated with a TCI state and a beam direction.

In some examples, a condition according to which the UE 115 transmits the report may include a command (such as an explicit command) to trigger the report. Such a command may include a PDCCH order, an RRC message, or a MAC-CE. In such examples, the UE 115 may receive the command on an already available serving cell, such as the SpCell 605. Additionally, or alternatively, the condition may refer to the UE 115 receiving or detecting the activation command (a MAC-CE or a PDSCH message including the MAC-CE), the UE 115 transmitting HARQ feedback for the activation command, or the UE 115 starting an activation process for the PUCCH-SCell 610. In various implementations, such a condition may trigger the report directly (for example, the condition may be a dedicated trigger for the report) or indirectly. In examples in which the condition triggers the report indirectly, the UE 115 may utilize an existing procedure or trigger for the report (such as a BSR).

Additionally, or alternatively, the condition may refer to a periodic transmission schedule for the report (such that the UE 115 may periodically report candidate reference signals for the PUCCH-SCell 610, even in scenarios in which the PUCCH-SCell 610 has a valid TA). Additionally, or alternatively, the UE 115 may trigger the BFR procedure by measuring that a serving cell beam quality is lower than a threshold quality. Such a threshold quality may have a fixed value (such as a fixed, relatively high value) or the BS 105 may configure the threshold quality. In some implementations, the threshold quality associated with PUCCH-SCell activation operations may be configured with a separate value (for example, a different value) than a value used in other BFR procedures.

In some implementations, the UE 115 may consider that a beam failure is detected or may trigger the BFR procedure. The UE 115 may perform such a detecting or triggering directly (via a dedicated trigger) or indirectly. In implementations in which the UE 115 performs the detecting or triggering indirectly, the UE 115 may utilize beam failure detection procedures such that the UE 115 considers a relatively low threshold to easily detect a beam failure. For example, BFR may be supported in both the SpCell 605 and an SCell, such as the PUCCH-SCell 610, and, as part of a BFR procedure, the UE 115 may inform the network entity of when a quality of a serving beam is low and of information associated with new candidate beams or reference signals. Additionally, or alternatively, the UE 115 may trigger a transmission of a BFR MAC-CE (for example, without detecting a beam failure). In some implementations, the UE 115 may support a cause or trigger reporting, which may include the UE 115 transmitting, to one or more components of the network entity, an indication of a cause or trigger associated with transmitting the report. For example, the UE 115 may transmit a report indicating that the cause or trigger associated with transmitting the report is a result of a downlink quality of a serving beam or reference signal being below a threshold, or a result of an SCell activation, among other examples. The UE 115 may transmit the indication of the cause or trigger in UCI, a BFR MAC-CE, or in a separate MAC-CE. If new beam information for more than one serving cell is included in the MAC-CE, the UE 115 may consider a priority of beams or serving cells. For example, candidate reference signals or beam information for the PUCCH-SCell 610 may be associated with a relatively higher priority than other serving cells.

For the transmission of the report (for example, the BFR MAC-CE, which may be referred to as an SCell BFR MAC-CE) and in examples in which the report is triggered, the UE 115 may select resources for the transmission of the report in various ways. In some implementations, the UE 115 may receive an uplink grant from the network entity, and may transmit the report using an uplink shared channel in accordance with the uplink grant on any (available) serving cell. In some implementations (such as in examples in which the UE 115 does not receive an uplink grant), the UE 115 may trigger a scheduling request transmission to the network entity requesting resources for the transmission of the report. Such a scheduling request transmission may refer to a PUCCH-scheduling request (PUCCH-SR) or a random access channel (RACH) procedure on any of the available serving cells.

In some implementations, and in examples in which the UE 115 performs a scheduling request transmission (for example, transmits a PUCCH-SR or PRACH), the UE 115 may perform the scheduling request transmission on a specific serving cell (in accordance with a configuration or rule). As such, the UE 115 may avoid sending the scheduling request on an undesirable serving cell (a serving cell on which the scheduling request is unlikely to be successfully received, such as the serving cell on which the beam failure is detected). Such a specific serving cell may refer to or include the SpCell 605, any serving cells other than those on which the UE 115 detects beam failure, any serving cells on which a downlink quality (such as an RSRP value) satisfies a level (such as any serving cells on which a downlink quality is greater than a threshold), or any serving cells indicated by the network entity.

The serving cell for which the network entity configures the BFR configuration may include various serving cells. For example, the serving cell may be the PUCCH-SCell 610, any serving cell indicated by the network entity (such that the UE 115 may receive an indication of the serving cell), an SCell which belongs to the sTAG or an SCell which belongs to the TAG to which the PUCCH-SCell 610 belongs, or any SCell being activated.

In some implementations in which the UE 115 transmits a report in accordance with the BFR mechanism, the UE 115 may transmit the report via uplink signaling sent at 625 or at 630. As such, the network entity may be able to understand a suitable beam (such as a suitable TCI state) using the received report (the MAC-CE) and may select the suitable TCI state for the PDCCH reception on the serving cell (such as on the PUCCH-SCell 610). Accordingly, in such implementations, the network entity may transmit a TCI state modification command at 635 indicating the suitable TCI state for the PUCCH-SCell 610 to use for monitoring for the PDCCH order over a PDCCH on the PUCCH-SCell. The UE 115 may monitor for the PDCCH order using the indicated TCI state and, in some examples, at 640, may successfully receive the PDCCH order using the indicated TCI state. At 645, the UE 115 may transmit a PRACH transmission in accordance with the PDCCH order and, at 650, may receive a random access response on the SpCell 605 (which the UE 115 may process to derive a TA value for the PUCCH-SCell 610 and for the sTAG).

In implementations in which the network entity sets a TCI state for the PDCCH order without input from the UE 115 and cycles through different TCI states until the UE 115 successfully receives the PDCCH order, the UE 115 may refrain from transmitting the uplink signaling at 625 and at 630, and the network entity may refrain from transmitting the TCI state modification command at 635. Instead, the network entity may set a TCI state for the PDCCH order and may transmit, to the UE 115 on the PUCCH-SCell 610, the PDCCH order at 640 using the set TCI state. In some examples, the network entity may set the TCI state for the PDCCH order in accordance with a latest or most recent Layer 3 RSRP (L3-RSRP) value received from the UE 115. In such examples, the network entity may receive the L3-RSRP value prior to configuring the PUCCH-SCell 610 (for example, prior to establishing the SCell configuration 615).

The network entity may transmit the PDCCH order on the PUCCH-SCell 610 and may check if a PRACH transmission is received for a configured or threshold duration. For example, the network entity may monitor PRACH resources indicated by the PDCCH order 30) for the configured or threshold duration and, if the network entity receives a PRACH transmission from the UE 115 responsive to the PDCCH order, the network entity may process the PRACH transmission and transmit a random access response to the UE 115 on the SpCell 605. Otherwise, if the network entity fails to receive a PRACH transmission from the UE 115 responsive to the PDCCH order, the network entity may set another TCI state value and transmit the PDCCH order again.

In any of such implementations, the timing to take the described actions or perform the described signaling may be immediately after a condition is met or satisfied or after a specific or configured time period. For example, the configured time period may be a specific amount of symbols, slots, subframes, or radio frames or a processing time at the UE 115 (which may depend on UE capability). Such a processing time at the UE 115 may include or consider, for example, an activation processing time or a waiting period for a next reference signal reception or measurement opportunity, or both. Further, the UE 115 may report a UE capability associated with which implementations are supported by the UE 115. In examples in which the UE 115 reports such a UE capability, the network entity may configure the UE 115 or perform various processing operations or tasks in accordance with the UE capability. Further, although described herein in the context of the PUCCH-SCell 610 in an sTAG, such implementations may be applicable to deriving TA values and establishing any type of serving cell as schedulable in various scenarios.

Figure 7:
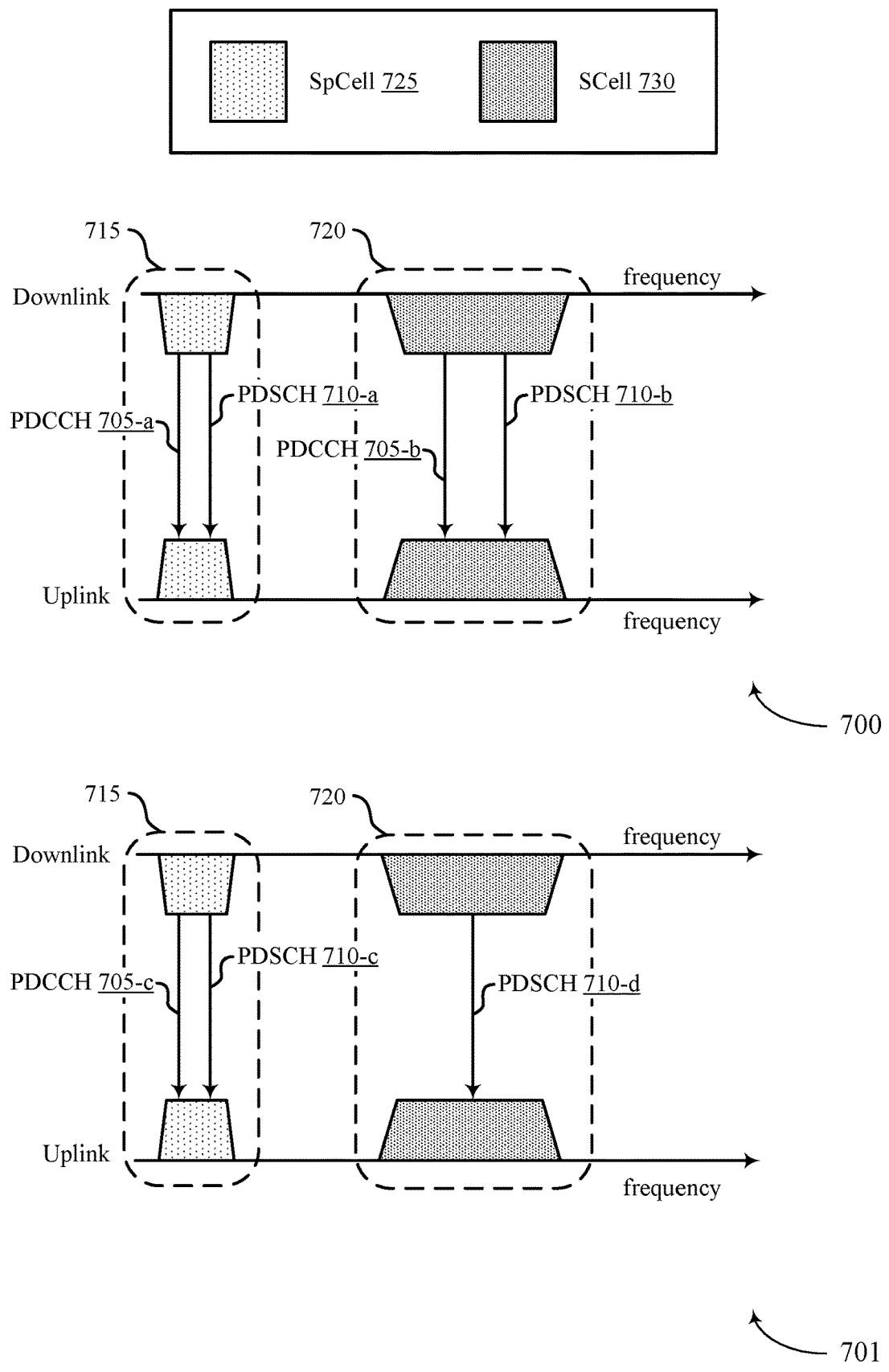
FIGS. 7 and 8 illustrate example scheduling techniques that support techniques for SCell establishment for UCI.

FIG. 7 illustrates example scheduling techniques 700 and 701 that support techniques for SCell establishment for UCI. The scheduling techniques 700 and 701 may implement or be implemented to realize aspects of the wireless communications system 100 or the CA deployment 200. For example, a UE 115 may communicate with a network entity (or one or more components of one or more BSs 105) in accordance with the scheduling techniques 700 or 701. In some implementations, such a UE 115 may be an example of one or more aspects of a UE 115 as described herein, including with reference to FIGS. 1-6. In some implementations, such a network entity may be an example of one or more aspects of a BS 105 as described herein, including with reference to FIGS. 1-6. In some implementations, the network entity may perform downlink scheduling in accordance with one or both of the scheduling techniques 700 or 701.

The UE 115 and the network entity may communicate on multiple serving cells, including an SpCell 725 and an SCell 730, using a CA technique, and may support multiple PUCCH groups, such as a PUCCH group 715 (a primary PUCCH group) including the SpCell 725 and a PUCCH group 720 (a secondary PUCCH group) including the SCell 730. In some implementations, the SCell 730 may be an example of or otherwise function as a PUCCH-SCell. In some implementations, and in accordance with the scheduling technique 700, the UE 115 and the network entity may not support cross PUCCH group scheduling. For example, cross PUCCH group scheduling may refer to or otherwise be understood as a scheduling method according to which scheduling information (such as PDCCH 705 or DCI) for a first serving cell associated with a first PUCCH group is received on a second serving cell associated with a second PUCCH group. In accordance with the scheduling technique 700, the UE 115 and the network entity may instead constrain scheduling information for a serving cell to be received within a same PUCCH group the first serving cell. For example, and in the scenario of downlink scheduling shown by the scheduling technique 700, the UE 115 may receive, on the SpCell 725, a PDCCH 705-*a* including scheduling information (such as DCI) for a PDSCH 710-*a* and may receive the PDSCH 710-*a* on the SpCell 725. Similarly, the UE 115 may receive, on the SCell 730, a PDCCH 710-*b* including scheduling information (such as DCI) for a PDSCH 710-*b* and may receive the PDSCH 710-*b* on the SCell 730. Further, although shown and described in the context of downlink scheduling, the UE 115 and the network entity may similarly constrain uplink scheduling information for a first serving cell to be communicated on a serving cell associated with the same PUCCH group as the first serving cell.

In some implementations, and in accordance with the scheduling technique 701, the UE 115 and the network entity may support cross PUCCH group scheduling. In such implementations, the UE 115 and the network entity may support a scheduling method according to which scheduling information (such as PDCCH 705 or DCI) for a first serving cell associated with a first PUCCH group is received on a second serving cell associated with a second PUCCH group. For example, and in the scenario of downlink scheduling shown by the scheduling technique 701, the UE 115 may receive, on the SpCell 725, a PDCCH 705-*c* including scheduling information (such as DCI) for either or both of a PDSCH 710-*c* on the SpCell 725 or a PDSCH 710-*d* on the SCell 730. In other words, a PDCCH 705-c on the SpCell 725 may include first DCI for the PDSCH 710-c that schedules the PDSCH 710-c on the SpCell 725, or may include second DCI for the PDSCH 710-d that schedules the PDSCH 710-d on the SCell 730, or may include both (within one or more instances of DCI). Accordingly, in such examples in which the UE 115 receives the PDCCH 705-c that schedules one or both (depending on which cells are scheduled) of the PDSCH 710-c or the PDSCH 710-d, the UE 115 may receive or process the PDSCH 710-d on the SCell 730) without also receiving a PDCCH 705 on the SCell 730.

Further, although shown and described in the context of downlink scheduling, the UE 115 and the network entity may similarly communicate uplink scheduling information for an uplink transmission on a first serving cell on a serving cell associated with a different PUCCH group than the first serving cell. Various implementations for such cross PUCCH group scheduling include transmission of a PDCCH message that triggers CSI reporting associated with a serving cell of a different PUCCH group or transmission of a PDCCH message that triggers a PRACH transmission on a serving cell of a different PUCCH group, or both.

Figure 8:
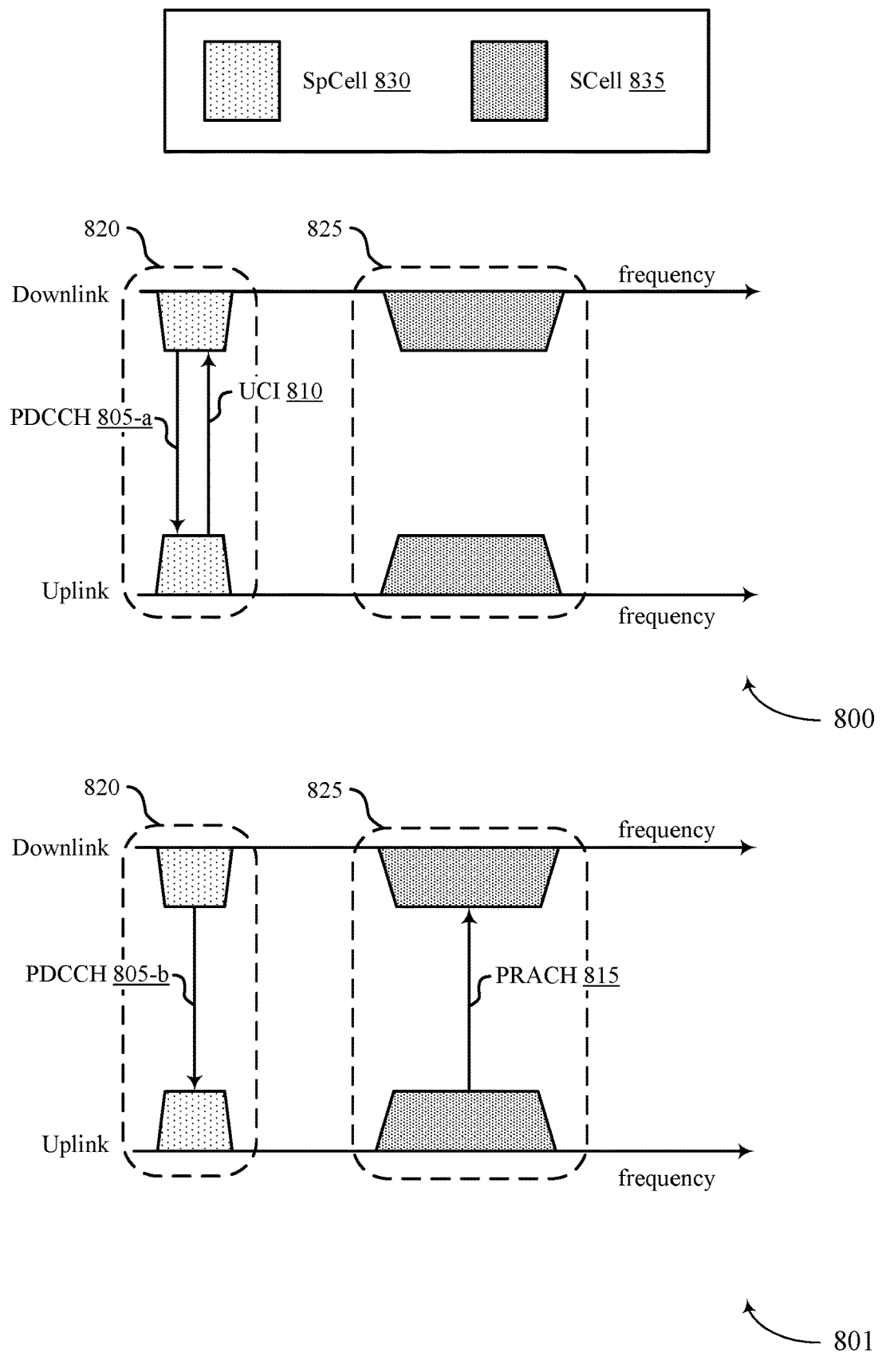

FIG. 8 illustrates example scheduling techniques 800 and 801 that support techniques for SCell establishment for UCI. The scheduling techniques 800 and 801 may implement or be implemented to realize aspects of the wireless communications system 100 or the CA deployment 200. For example, a UE 115 may communicate with a network entity (or one or more components of one or more BSs 105) in accordance with the scheduling techniques 800 or 801. In some implementations, such a UE 115 may be an example of one or more aspects of a UE 115 as described herein, including with reference to FIGS. 1-7. In some implementations, such a network entity may be an example of one or more aspects of a BS 105 as described herein, including with reference to FIGS. 1-7. In some examples, the network entity may perform uplink scheduling in accordance with one or both of the scheduling techniques 800 or 801 to support an activation of a PUCCH-SCell.

The UE 115 and the network entity may communicate on multiple serving cells, including an SpCell 830 and an SCell 835, using a CA technique and may support multiple PUCCH groups, such as a PUCCH group 820 (a primary PUCCH group) including the SpCell 830 and a PUCCH group 825 (a secondary PUCCH group) including the SCell 835. In some examples, the SCell 835 may be an example of or otherwise function as a PUCCH-SCell. For example, the SCell 835 may be activated as a PUCCH-SCell, which may be supported by signaling via the SpCell 830. In some implementations, and in accordance with the scheduling technique 800, the UE 115 and the network entity may support a transmission (of DCI) over a PDCCH 805-a to trigger CSI reporting from the UE 115 in a manner associated with cross PUCCH group scheduling. For example, the UE 115 may receive the PDCCH 805-a on the SpCell 830 (or on any serving cell associated with the PUCCH group 820) and the PDCCH 805-a may include a request or a trigger for CSI associated with a first serving cell in a TAG to which the SCell 835 (the PUCCH-SCell) belongs and, in some implementations, the SpCell 830 may be associated with a different PUCCH group than the SCell 835 or the first serving cell. Accordingly, the UE 115 may transmit the CSI associated with the first serving cell (the SCell 835) and, in some implementations, may transmit the CSI on the SpCell 830 via UCI 810-a. In some aspects, the first serving cell for which the UE 115 transmits the CSI may be an example of any one or more SCells of an sTAG to which the PUCCH-SCell belongs.

The request or trigger for the CSI may be associated with aperiodic CSI or semi-persistent CSI. The network entity, using the provided CSI, may understand or select a beam or reference signal associated with a relatively higher (or highest) quality and may change a TCI state of the first serving cell to match or correspond to the selected beam or reference signal (for example, via a TCI state modification command). As such, the network entity may transmit a PDCCH order to the UE 115 on the first serving cell requesting or triggering a PRACH transmission by the UE 115 on that first serving cell.

The serving cell on which the UE 115 transmits the CSI may include the SpCell 830, any serving cells other than those on which the UE 115 detects a beam failure, any serving cells on which a downlink quality (such as an RSRP value) satisfies a level (such as any serving cells on which a downlink quality is greater than a threshold), or any serving cells indicated by the network entity. Further, the UE 115 and the network entity may assume that the serving cell on which the UE 115 transmits the CSI has a valid TA value. As such, in examples in which the serving cell is the SpCell 830 (as shown in the scheduling technique 800), the UE 115 and the network entity may use the SpCell 830 to both trigger the CSI report and report the CSI for the first serving cell (such as the PUCCH-SCell or another serving cell in the same TAG as the PUCCH-SCell). Although shown as using the SpCell 830 for both triggering and reporting of the CSI, the UE 115 and the network entity may similarly trigger and report CSI on different serving cells.

In implementations in which the UE 115 reports CSI for the first serving cell on an uplink of a second serving cell (such as the SpCell 830), the UE 115 may report CSI on the second serving cell until an uplink for the SCell 835 (the PUCCH-SCell) is available. For example, the UE 115 may transmit the UCI 810-a including the CSI for the first serving cell temporarily and may stop or disable the temporary reporting on the second serving cell as a result of receiving a TCI state modification command or an expiration of a timer.

In some implementations, and in accordance with the scheduling technique 801, the UE 115 and the network entity may support a transmission (of DCI) over a PDCCH 805-b on the SpCell 830 to trigger a transmission of a PRACH 815 on the SCell 835. For example, the UE 115 may receive the PDCCH 805-b on the SpCell 830 (or any serving cell associated with the PUCCH group 820) and, responsive to the PDCCH 805-b, the UE 115 may transmit the PRACH 815 on a serving cell (such as the SCell 835) in a TAG (such as an sTAG) to which the PUCCH-SCell belongs.

In some implementations, the UE 115 may use, for the PRACH transmission, one or more PRACH resources associated with a downlink beam on which a downlink quality satisfies (for example, is greater than) a threshold. In such implementations, the network entity may be able to understand and select a suitable downlink beam using the association between the received PRACH resource and the downlink beam. In some implementations, the UE 115 may receive (such as via DCI), from the network entity, an indication of one or more PRACH resources and may use the one or more PRACH resources for the PRACH transmission. In such implementations, the UE 115 may obtain a valid TA value through a random access procedure. The UE 115 may use the valid TA value to report CSI for the SCell 835 (such as the PUCCH-SCell) and, because the valid TA value is obtained, the network entity may perform PDSCH or PUSCH scheduling on the SCell 835 (the serving cell being activated as the PUCCH-SCell).

Further, in some implementations, the manner according to which the UE 115 selects PRACH resources for the PRACH transmission may be switched based on a DCI content. For example, the network entity may include a PRACH index in DCI and may use the PRACH index to indicate how the UE 115 is to select PRACH resources or to indicate to the UE 115 to switch to a different manner of selection. In some examples, a PRACH index of 0 may indicate that a first manner (such as UE-driven selection according to beam quality) is to be used and a different value of the PRACH index may indicate that a second manner (such as network-driven selection and indication to the UE 115) is to be used.

The serving cell on which the UE 115 transmits the PRACH 815 may include the SpCell 830, any serving cells other than those on which the UE 115 detects a beam failure, any serving cells on which a downlink quality (such as an RSRP value) satisfies a level (such as any serving cells on which a downlink quality is greater than a threshold), or any serving cells indicated by the network entity. Further, the UE 115 and the network entity may assume that the serving cell on which the UE 115 transmits the PRACH 815 has a valid TA value. In implementations in which the UE 115 transmits the PRACH 815 on the SCell 835 in response to the PDCCH 805-*b* received on the SpCell 830, the UE 115 and the network entity may support such cross PUCCH scheduling temporarily. For example, in some implementations, the UE 115 and the network entity may stop or disable cross PUCCH group-scheduled PRACH transmissions as a result of receiving a TCI state modification command or an expiration of a timer.

Figure 9:
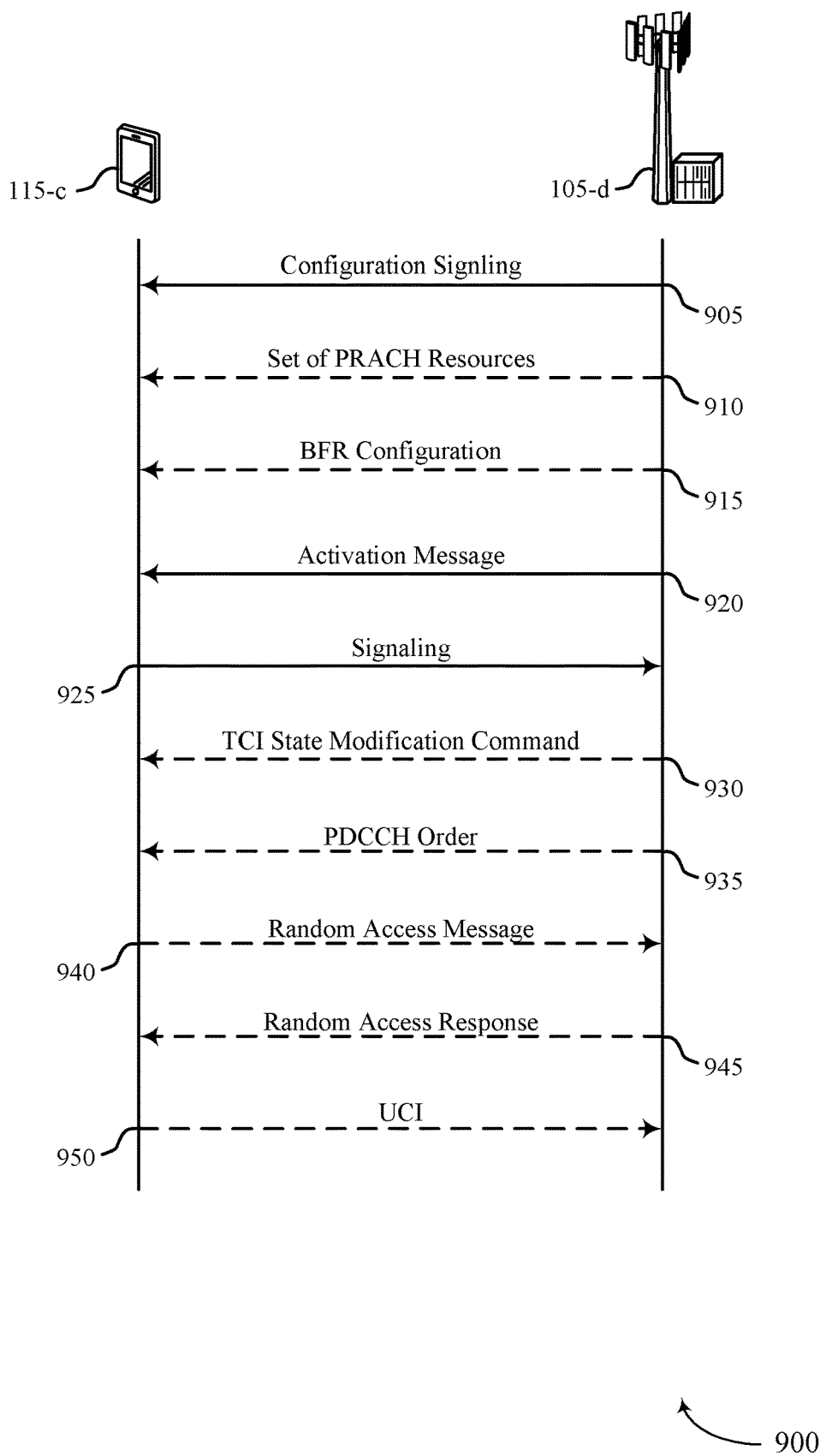
FIGS. 9 and 10 illustrate example process flows that support techniques for SCell establishment for UCI.

FIG. 9 illustrates an example process flow 900 that supports techniques for SCell establishment for UCI. The process flow 900 may implement or be implemented to realize aspects of the wireless communications system 100 or the CA deployment 200. For example, the process flow 900 illustrates communication between a UE 115-*c* and one or more components of a BS 105-*d* (for example, a network entity). In some implementations, the UE 115-*c* may be an example of one or more aspects of a UE 115 as described herein, including with reference to FIGS. 1-8. In some implementations, the BS 105-*d* may be an example of one or more aspects of a BS 105 as described herein, including with reference to FIGS. 1-8. In some implementations, the BS 105-*d* may include a CU, one or more DUs, or one or more RUs, or any combination thereof. In some implementations, the UE 115-*c* and the BS 105-*d* may support a signaling mechanism to support an establishment or activation of a PUCCH-SCell and of one or more SCells of an sTAG, including under scenarios in which the sTAG lacks a valid TA value.

In the following description of the process flow 900, the operations may be performed (such as reported or provided) in a different order than the order shown, or the operations performed by the example devices may be performed in different orders or at different times. Some operations also may be omitted from the process flow 900, or other operations may be added to the process flow 900. Further, although some operations or signaling may be shown to occur at different times for discussion purposes, these operations may actually occur at the same time or otherwise concurrently.

At 905, the UE 115-*c* may receive, from the BS 105-*d*, configuration signaling associated with configuring the UE 115-*c* with a set of one or more SCells (for example, a TAG, a PUCCH group). In some implementations, the UE 115-*c* may receive the configuration signaling via RRC signaling. In some implementations, the BS 105-*d* may transmit the configuration signaling via a DU or RU entity or functionality of the BS 105-*d*, which may or may not include or be associated with a transmission from a CU.

At 910, the UE 115-*c* may, in some implementations, receive an indication of a set of PRACH resources associated with at least one serving cell from the BS 105-*d*. In some implementations, each PRACH resource of the set of PRACH resources may be associated with a respective reference signal. For example, each PRACH resource of the set of PRACH resources may be associated with an SSB or a CSI-RS and the reference signal may correspond to or be otherwise associated with a beam direction (for example, a transmission beam or transmission direction) for directional communication between the UE 115-*c* and the BS 105-*d*. In some implementations, the BS 105-*d* may transmit the indication of the set of PRACH resources via a DU or RU entity or functionality of the BS 105-*d*, which may or may not include or be associated with a transmission from a CU.

At 915, the UE 115-*c* may, in some implementations, receive an indication of a BFR configuration from the BS 105-*d*. The UE 115-*c* may receive the BFR configuration for at least one serving cell, such as a PUCCH-SCell, and the UE 115-*c* may use a BFR mechanism for initiating or otherwise performing a reporting of beam information associated with the at least one serving cell. In some implementations, the BS 105-*d* may transmit the indication of the BFR configuration via a DU or RU entity or functionality of the BS 105-*d*, which may or may not include or be associated with a transmission from a CU.

At 920, the UE 115-*c* may receive, from the BS 105-*d*, a message to activate an SCell of the set of one or more SCells for UCI associated with the set of one or more SCells. In some implementations, the SCell of the set of one or more SCells that is activated for transmitting UCI may be referred to herein as a PUCCH-SCell. In some implementations, the message to activate the SCell may be referred to herein as an activation command or an activate command. In some implementations, the BS 105-*d* may transmit the message via a DU or RU entity or functionality of the BS 105-*d*, which may or may not include or be associated with a transmission from a CU.

At 925, the UE 115-*c* may transmit, to the BS 105-*d*, signaling associated with activating the SCell for the UCI. Such signaling associated with the activating of the SCell for the UCI (for example, the signaling associated with activating the SCell as a PUCCH-SCell) may include signaling to assist the BS 105-*d* in selecting an appropriate or suitable TCI state or other configuration for a PDCCH reception. In some implementations, transmitting the signaling may including transmitting a random access message (such as a PRACH transmission) over a PRACH resource of an indicated set of PRACH resources. In some implementations, transmitting the signaling may include transmitting beam evaluation or beam measurement information on the PUCCH-SCell using an uplink time alignment associated with the set of one or more SCells. For example, the UE 115-*c* may use a TA value signaled by the BS 105-*d* or a default (for example, configured) TA value. In some implementations, transmitting the signaling may include transmitting beam measurement or beam evaluation information on an already available serving cell, such as an SpCell. In some implementations, transmitting the signaling may include transmitting a report indicating one or more candidate reference signals or beams for the set of one or more SCells (in accordance with one or more aspects of an indicated BFR mechanism). In some implementations, transmitting the signaling may include transmitting a CSI report or performing a PRACH transmission in accordance with a cross PUCCH group scheduling technique. In some implementations, the BS 105-*d* may receive the signaling via a DU or RU entity or functionality of the BS 105-*d*, which may or may not include or be associated with a transmission to a CU.

At 930, in some implementations, the UE 115-*c* may receive, from the BS 105-*d*, a TCI state modification command indicating a TCI state for the SCell (for the PUCCH-SCell). In some implementations, the TCI state may be associated with (for example, responsive to or otherwise initiated based on) the signaling associated with activating the SCell for the UCI. In some implementations, the BS 105-*d* may transmit the TCI state modification command via a DU or RU entity or functionality of the BS 105-*d*, which may or may not include or be associated with a transmission from a CU.

At 935, in some implementations, the UE 115-*c* may receive, from the BS 105-*d*, a PDCCH order including a command for the UE 115-*c* to transmit a random access message (such as a PRACH transmission). In some implementations, the UE 115-*c* may receive the PDCCH order using the TCI state indicated by the TCI state modification command received at 930. In some implementations, the BS 105-*d* may transmit the PDCCH order via a DU or RU entity or functionality of the BS 105-*d*, which may or may not include or be associated with a transmission from a CU.

At 940, in some implementations, the UE 115-*c* may transmit, to the BS 105-*d*, the random access message on at least one SCell. In some implementations, the UE 115-*c* may transmit the random access message responsive to receiving the PDCCH order at 935. In some implementations, the BS 105-*d* may receive the random access message via a DU or RU entity or functionality of the BS 105-*d*, which may or may not include or be associated with a transmission to a CU.

At 945, the UE 115-*c* may receive, from the BS 105-*d*, a random access response on an available cell (such as the SpCell) as a result of transmitting the random access message. In some implementations, the UE 115-*c* may derive a TA value for an sTAG and for the SCell (the PUCCH-SCell) using timing information associated with transmitting the random access message and receiving the random access response. In some implementations, the BS 105-*d* may transmit the random access response via a DU or RU entity or functionality of the BS 105-*d*, which may or may not include or be associated with a transmission from a CU.

At 950, the UE 115-*c* may transmit, to the BS 105-*d*, UCI on the SCell (the PUCCH-SCell) in accordance with a TA value, which may have been derived from transmitting a random access message and receiving a random access response. As such, the UE 115-*c* may establish the SCell for transmitting UCI even in scenarios in which the SCell is initially in a deactivated state and associated with an sTAG lacking a valid TA value, which may provide more efficient and robust SCell establishment for UCI. In some implementations, the BS 105-*d* may receive the UCI via a DU or RU entity or functionality of the BS 105-*d*, which may or may not include or be associated with a transmission to a CU.

Figure 10:
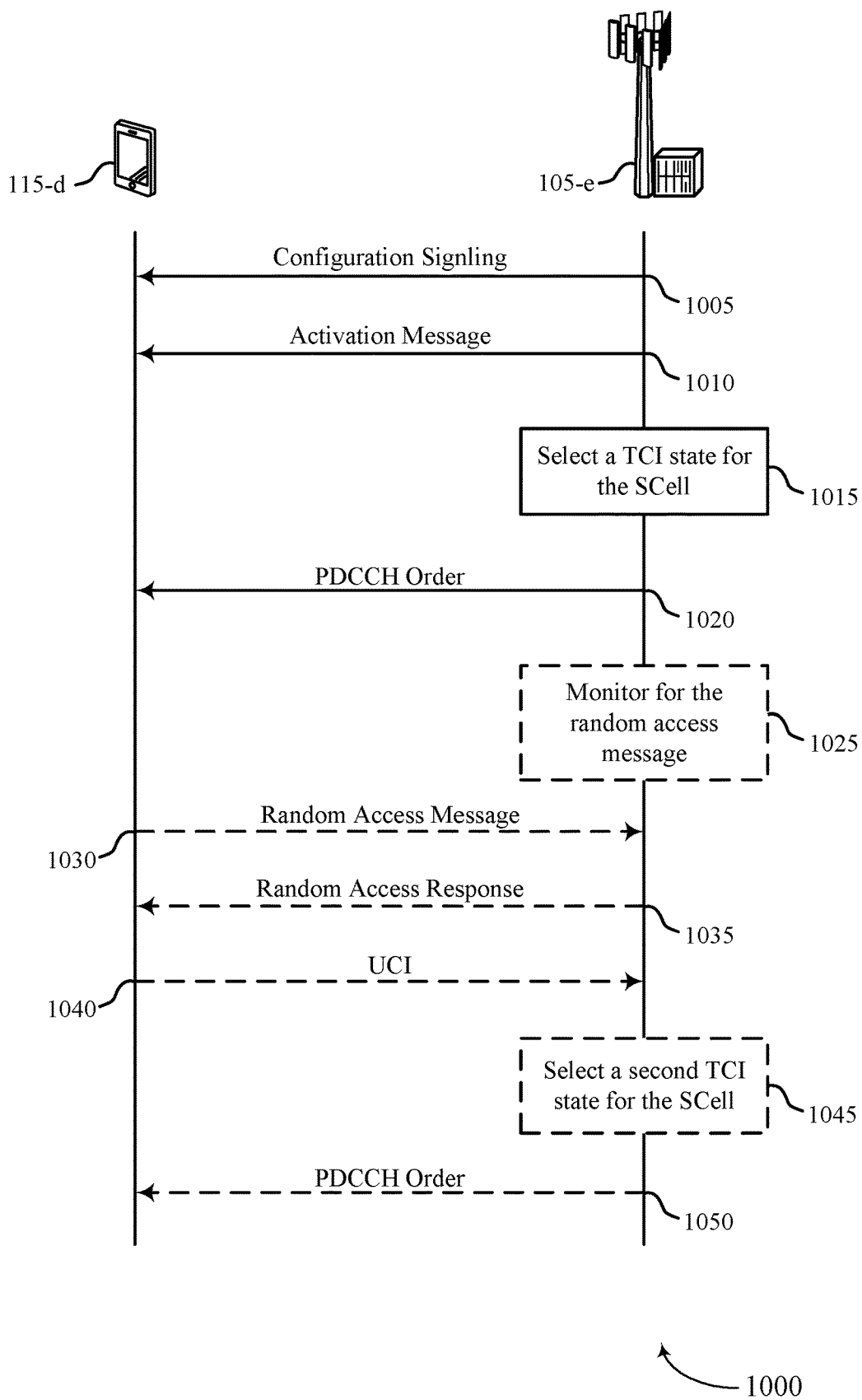

FIG. 10 illustrates an example process flow 1000 that supports techniques for SCell establishment for UCI. The process flow 1000 may implement or be implemented to realize aspects of the wireless communications system 100 or the CA deployment 200. For example, the process flow 1000 illustrates communication between a UE 115-*d* and one or more components of a BS 105-*e* (for example, a network entity). In some implementations, the UE 115-*d* may be an example of one or more aspects of a UE 115 as described herein, including with reference to FIGS. 1-9. In some implementations, the BS 105-*e* may be an example of one or more aspects of a BS 105 as described herein, including with reference to FIGS. 1-9. In some implementations, the BS 105-*e* may include a CU, one or more DUs, or one or more RUs, or any combination thereof. In some examples, the UE 115-*d* and the BS 105-*e* may support a BS-based implementation effort to support an establishment or activation of a PUCCH-SCell and of one or more SCells of an sTAG, including under scenarios in which the sTAG lacks a valid TA value.

In the following description of the process flow: 1000, the operations may be performed (such as reported or provided) in a different order than the order shown, or the operations performed by the example devices may be performed in different orders or at different times. Some operations also may be omitted from the process flow 1000, or other operations may be added to the process flow 1000. Further, although some operations or signaling may be shown to occur at different times for discussion purposes, these operations may actually occur at the same time or otherwise concurrently.

At 1005, the UE 115-*d* may receive, from the BS 105-*e*, configuration signaling associated with configuring the UE 115-*d* with a set of one or more SCells. In some examples, the BS 105-*e* may transmit the configuration signaling via RRC signaling. In some examples, the BS 105-*e* may transmit the configuration signaling via a DU or RU entity or functionality of the BS 105-*e*, which may or may not be associated with a transmission from a CU.

At 1010, the UE 115-*d* may receive, from the BS 105-*e*, a message to activate an SCell of the set of one or more SCells for UCI associated with the set of one or more SCells. In some examples, the SCell of the set of one or more SCells that is activated for transmitting UCI may be referred to herein as a PUCCH-SCell. Further, the message to activate the SCell may be referred to herein as an activation command or an activate command. In some examples, the BS 105-*e* may transmit the message via a DU or RU entity or functionality of the BS 105-*e*, which may or may not be associated with a transmission from a CU.

At 1015, the BS 105-*e* may select a TCI state for the SCell (for the PUCCH-SCell). In some examples, the BS 105-*d* may select the TCI state using a CU entity or functionality of the BS 105-*e* or using a DU entity or functionality of the BS 105-*e*.

At 1020, the BS 105-*e* may transmit, to the UE 115-*d*, a PDCCH order including a command for the UE 115-*d* to transmit a random access message on the SCell (the PUCCH-SCell) using the TCI state (for example, the TCI state selected at 1015). In some examples, the BS 105-*e* may transmit the PDCCH order via a DU or RU entity or functionality of the BS 105-*e*, which may or may not be associated with a transmission from a CU.

At 1025, the BS 105-*e* may, in some implementations, monitor for the random access message over one or more PRACH resources on the SCell (the PUCCH-SCell). For example, the command to transmit the random access message may include an indication of the one or more PRACH resources, and the BS 105-*e* may monitor for the random access message over the one or more PRACH resources. In some examples, the BS 105-*e* may monitor over the one or more PRACH resources using a CU entity or functionality of the BS 105-*e* or using a DU or RU entity or functionality of the BS 105-*e*.

At 1030, the BS 105-*e* may, in some implementations, receive the random access message from the UE 115-*d* on the SCell (the PUCCH-SCell) as a result of monitoring over the one or more PRACH resources. In some examples, the BS 105-*e* may receive the random access message via a DU or RU entity or functionality of the BS 105-*e*, which may or may not be associated with a transmission to a CU.

At 1035, the BS 105-*e* may, in some implementations, transmit a random access response to the UE 115-*d* (on an available cell, such as an SpCell, or on the PUCCH-SCell). In some examples, the BS 105-*e* may transmit the random access response to the UE 115-*d* responsive to receiving the random access message at 1030. In some examples, the BS 105-*e* may transmit the random access response via a DU or RU entity or functionality of the BS 105-*e*, which may or may not be associated with a transmission from a CU.

At 1040, the BS 105-*e* may, in some implementations, receive the UCI on the SCell as a result of transmitting the message to activate the SCell for the UCI and transmitting the random access response on the SCell (an SpCell or the PUCCH-SCell). In some examples, the BS 105-*e* may receive the UCI via a DU or RU entity or functionality of the BS 105-*e*, which may or may not be associated with a transmission to a CU.

At 1045, the BS 105-*e* may, in some implementations, select a second TCI state for the SCell, which may be a result of failing to receive a random access message within a configured or threshold duration. For example, if the BS 105-*e* fails to receive a random access message at 1030) and continues to fail to detect the random access message from the UE 115-*d* for the configured or threshold duration, the BS 105-*e* may select the second TCI state for a second attempt at transmitting the PDCCH order to the UE 115-*d*. In some examples, the BS 105-*e* may select the second TCI state using a CU entity or functionality of the BS 105-*e* or using a DU entity or functionality of the BS 105-*e*.

At 1050, the BS 105-*e* may, in some implementations, transmit a second PDCCH order including a second command for the UE 115-*d* to transmit the random access message on the SCell (such as the PUCCH-SCell). In this manner, the BS 105-*e* may cycle through different TCI states for the PDCCH order until the BS 105-*e* receives a PRACH transmission responsive to the PDCCH order, which may enable the BS 105-*e* (which may have less power constraints relative to the UE 115-*d*) to carry a primary processing load for establishing one or more SCells of an sTAG, including the PUCCH-SCell, as schedulable for communications between the UE 115-*d* and the BS 105-*e*. In some examples, the BS 105-*e* may transmit the second PDCCH order via a DU or RU entity or functionality of the BS 105-*e*, which may or may not be associated with a transmission from a CU.

Figure 11:
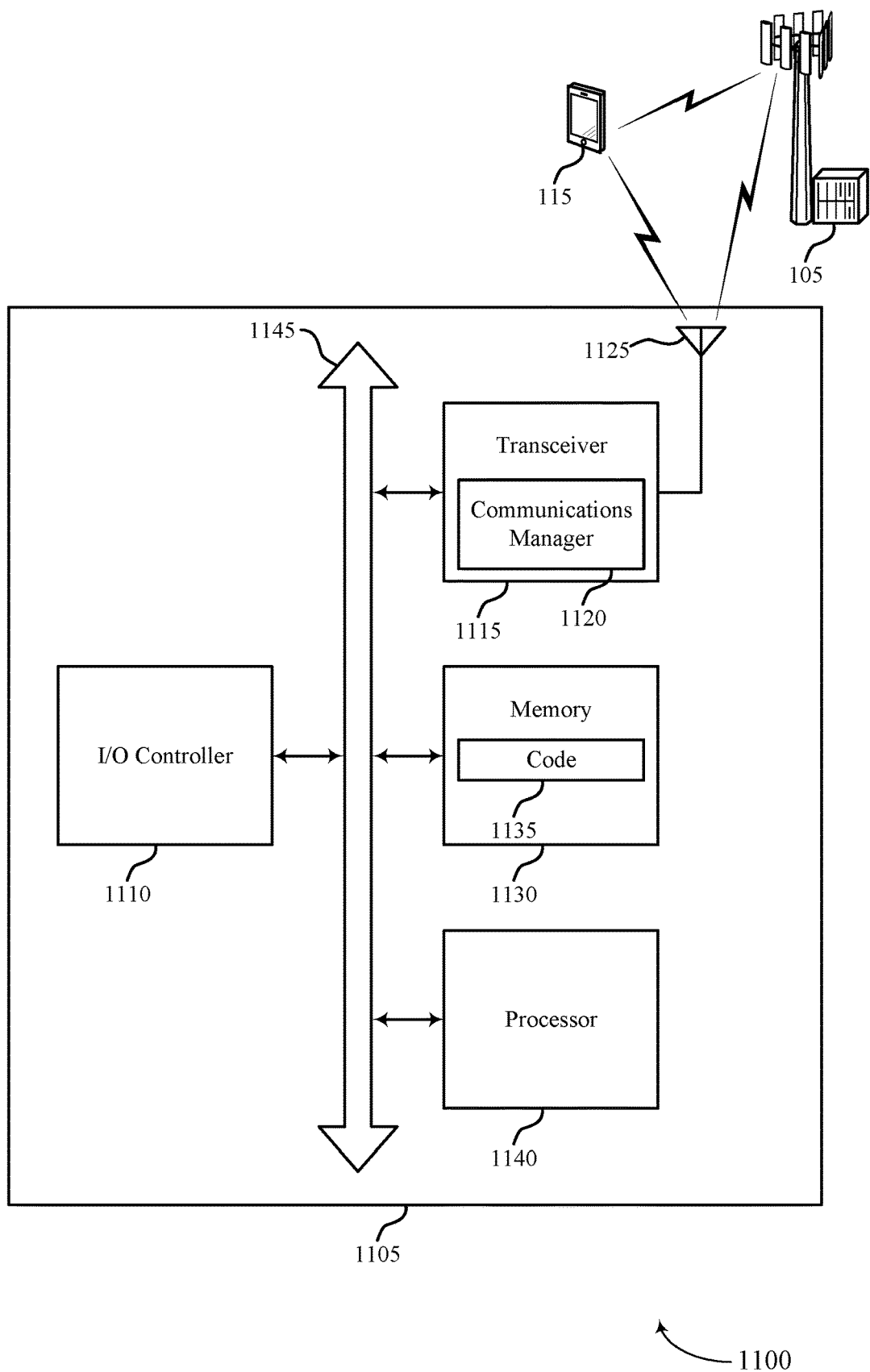
FIG. 11 shows a block diagram of an example device that supports techniques for SCell establishment for UCI.

FIG. 11 shows a block diagram 1100 of an example device 1105 that supports techniques for SCell establishment for UCI. The device 1105 may communicate wirelessly with one or more BSs 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (for example, operatively, communicatively, functionally, electronically, electrically) via one or more buses (such as a bus 1145).

The I/O controller 1110 may manage input and output signals for the device 1105. The I/O controller 1110 also may manage peripherals not integrated into the device 1105. In some implementations, the I/O controller 1110 may represent a physical connection or port to an external peripheral. In some implementations, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some implementations, the I/O controller 1110 may be implemented as part of a processor or processing system, such as the processor 1140. In some implementations, a user may interact with the device 1105 via the I/O controller 1110 or via hardware components controlled by the I/O controller 1110.

In some implementations, the device 1105 may include a single antenna 1125. However, in some other implementations, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 also may include a modem to modulate the packets, to provide the modulated packets to one or more antennas 1125 for transmission, and to demodulate packets received from the one or more antennas 1125. In some implementations, the transceiver 1115 may include one or more interfaces, such as one or more interfaces coupled with the one or more antennas 1125 that are configured to support various receiving or obtaining operations, or one or more interfaces coupled with the one or more antennas 1125 that are configured to support various transmitting or outputting operations, or a combination thereof. In some implementations, the transceiver 1115 may include or be configured for coupling with one or more processors or memory components that are operable to perform or support operations based on received or obtained information or signals, or to generate information or other signals for transmission or other outputting, or any combination thereof. In some implementations, the transceiver 1115, or the transceiver 1115 and the one or more antennas 1125, or the transceiver 1115 and the one or more antennas 1125 and one or more processors or memory components (for example, the processor 1140, or the memory 1130, or both), may be included in a chip or chip assembly that is installed in the device 1105.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some implementations, the code 1135 may not be directly executable by the processor 1140 but may cause a computer (for example, when compiled and executed) to perform functions described herein. In some implementations, the memory 1130 may contain, among other things, a basic I/O system (BIOS) which may control basic hardware or software operation such as the interaction with peripheral components or devices.

The processor 1140 may be any one or more suitable processors capable of executing scripts or instructions of one or more software programs stored in the device 1105 (such as within the memory 1130). In some implementations, the processor 1140 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1140, or the transceiver 1115, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system, a first interface to output information, and a second interface to obtain information. In some implementations, the first interface may refer to an interface between the processing system of the chip or modem and a transmitter, such that the device 1105 may transmit information output from the chip or modem. In some implementations, the second interface may refer to an interface between the processing system of the chip or modem and a receiver, such that the device 1105 may obtain information or signal inputs, and the information may be passed to the processing system. A person having ordinary skill in the art will readily recognize that the first interface also may obtain information or signal inputs, and the second interface also may output information or signal outputs.

The communications manager 1120 may support wireless communication at a UE in accordance with examples as disclosed herein. For example, the communications manager 1120 may be configured as or otherwise support a means for receiving configuration signaling associated with configuring the UE with a set of one or more SCells. The communications manager 1120 may be configured as or otherwise support a means for receiving a message to activate an SCell of the set of one or more SCells for UCI associated with the set of one or more SCells. The communications manager 1120 may be configured as or otherwise support a means for transmitting signaling associated with activating the SCell for the UCI.

In some examples, the communications manager 1120 may be configured as or otherwise support a means for receiving an indication of a set of PRACH resources associated with at least one serving cell, each PRACH resource of the set of PRACH resources associated with a respective reference signal, and transmitting the signaling associated with activating the SCell for the UCI may include transmitting a random access message over a PRACH resource of the set of PRACH resources associated with the respective reference signal of a serving cell of the at least one serving cell.

In some examples, transmitting the random access message may be associated with receiving the message to activate the SCell for the UCI or receiving a command to transmit the random access message. In some examples, the signaling associated with activating the SCell for the UCI is transmitted in accordance with an uplink time alignment associated with the set of one or more SCells.

In some examples, the signaling associated with activating the SCell for the UCI may be transmitted on the SCell in accordance with a timing advance value signaled by a network entity or in accordance with a default timing advance value. In some examples, the signaling associated with activating the SCell for the UCI may be transmitted over a serving cell different than the SCell.

In some examples, the communications manager 1120 may be configured as or otherwise support a means for disabling the transmitting of the signaling associated with activating the SCell for the UCI on the serving cell different than the SCell, and the disabling may be associated with receiving the message to activate the SCell for the UCI or an expiration of a timer.

In some examples, the communications manager 1120 may be configured as or otherwise support a means for receiving an indication of a BFR configuration, and transmitting the signaling associated with activating the SCell for the UCI may include transmitting a report indicating one or more candidate reference signals for at least one SCell of the set of one or more SCells.

In some examples, transmitting the report may be associated with receiving the message to activate the SCell for the UCI, or receiving a command to transmit the report, or detecting that a quality of the one or more candidate reference signals being below a quality threshold, or a periodic transmission schedule for the report.

In some examples, the communications manager 1120 may be configured as or otherwise support a means for transmitting an indication of a trigger associated with the transmitting of the report, where the trigger includes one of receiving the message to activate the SCell for the UCI or detecting that a quality of the one or more candidate reference signals is below the quality threshold.

In some examples, the communications manager 1120 may be configured as or otherwise support a means for transmitting, on a serving cell different than an SCell of the set of one or more SCells that is associated with a beam failure, signaling associated with a scheduling request for the report.

In some examples, the communications manager 1120 may be configured as or otherwise support a means for receiving, on a serving cell associated with a different PUCCH group than a PUCCH group that the SCell is associated with, a request for CSI, where transmitting the signaling associated with activating the SCell for the UCI includes transmitting the CSI on the serving cell in accordance with the request for the CSI.

In some examples, the communications manager 1120 may be configured as or otherwise support a means for receiving, on a serving cell associated with a different PUCCH group than a PUCCH group that the SCell is associated with, a command to transmit a random access message on at least one SCell of the set of one or more SCells, where transmitting the signaling associated with activating the SCell for the UCI includes transmitting the random access message on the at least one SCell.

In some examples, the communications manager 1120 may be configured as or otherwise support a means for receiving a TCI state modification command indicating a TCI state for the SCell, and the TCI state may be associated with the signaling associated with activating the SCell for the UCI.

In some examples, the communications manager 1120 may be configured as or otherwise support a means for receiving, on the SCell and in accordance with the TCI state, a command to transmit a random access message. In some examples, the communications manager 1120 may be configured as or otherwise support a means for transmitting the random access message on at least one SCell, and transmitting the random access message may be associated with receiving the command to transmit the random access message. In some examples, the communications manager 1120 may be configured as or otherwise support a means for receiving a random access response on an available cell as a result of transmitting the random access message. In some examples, the communications manager 1120 may be configured as or otherwise support a means for transmitting the UCI on the SCell in accordance with a timing advance value derived from transmitting the random access message and receiving the random access response.

In some examples, the configuration signaling may be associated with configuring the set of one or more SCells in a timing advance group. In some examples, the message to activate the SCell for the UCI may be associated with activating the SCell as a PUCCH-SCell.

In some implementations, the communications manager 1120 may be configured to perform various operations (for example, receiving, monitoring, transmitting) using or otherwise in cooperation with the transceiver 1115, the one or more antennas 1125, or any combination thereof. Although the communications manager 1120 is illustrated as a separate component, in some implementations, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for secondary cell establishment and beam control as described herein, or the processor 1140 and the memory 1130 may be otherwise configured to perform or support such operations.

Figure 12:
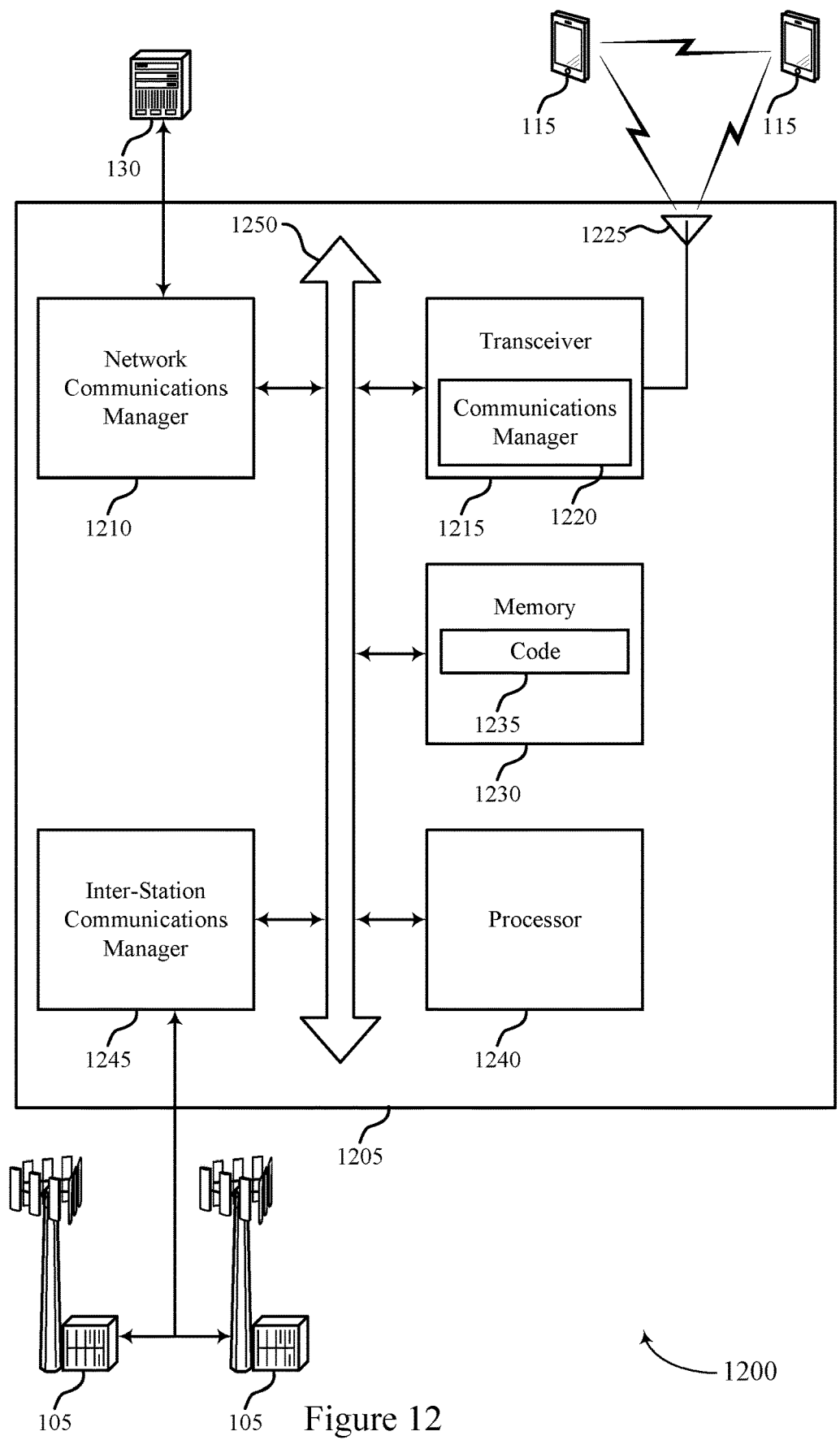
FIG. 12 shows a block diagram of an example device that supports techniques for secondary cell establishment for UCI.

FIG. 12 shows a block diagram 1200 of an example device 1205 that supports techniques for SCell establishment for UCI. The device 1205 may communicate wirelessly with one or more BSs 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (for example, operatively, communicatively, functionally, electronically, electrically) via one or more buses (such as a bus 1250). In some examples, the device 1205 may be illustrative of one or more aspects of a network entity.

The network communications manager 1210 may manage communications with a core network 130 (for example, via one or more wired backhaul links). For example, the network communications manager 1210 may manage the transfer of data communications for client devices, such as one or more UEs 115.

In some implementations, the device 1205 may include a single antenna 1225. However, in some other implementations, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 also may include a modem to modulate the packets, to provide the modulated packets to one or more antennas 1225 for transmission, and to demodulate packets received from the one or more antennas 1225. In some implementations, the transceiver 1215 may include one or more interfaces, such as one or more interfaces coupled with the one or more antennas 1225 that are configured to support various receiving or obtaining operations, or one or more interfaces coupled with the one or more antennas 1225 that are configured to support various transmitting or outputting operations, or a combination thereof. In some implementations, the transceiver 1215 may include or be configured for coupling with one or more processors or memory components that are operable to perform or support operations based on received or obtained information or signals, or to generate information or other signals for transmission or other outputting, or any combination thereof. In some implementations, the transceiver 1215, or the transceiver 1215 and the one or more antennas 1225, or the transceiver 1215 and the one or more antennas 1225 and one or more processors or memory components (for example, the processor 1240, or the memory 1230, or both), may be included in a chip or chip assembly that is installed in the device 1205.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some implementations, the code 1235 may not be directly executable by the processor 1240 but may cause a computer (for example, when compiled and executed) to perform functions described herein. In some implementations, the memory 1230) may contain, among other things, a BIOS which may control basic hardware or software operation such as the interaction with peripheral components or devices.

The processor 1240 may be any one or more suitable processors capable of executing scripts or instructions of one or more software programs stored in the device 1205 (such as within the memory 1230). In some implementations, the processor 1240 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1240, or the transceiver 1215, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system, a first interface to output information, and a second interface to obtain information. In some implementations, the first interface may refer to an interface between the processing system of the chip or modem and a transmitter, such that the device 1205 may transmit information output from the chip or modem. In some implementations, the second interface may refer to an interface between the processing system of the chip or modem and a receiver, such that the device 1205 may obtain information or signal inputs, and the information may be passed to the processing system. A person having ordinary skill in the art will readily recognize that the first interface also may obtain information or signal inputs, and the second interface also may output information or signal outputs.

The inter-station communications manager 1245 may manage communications with other BSs 105, and may include a controller or scheduler for controlling communications with UEs 115 in cooperation with other BSs 105. For example, the inter-station communications manager 1245 may coordinate scheduling for transmissions to UEs 115 for various interference mitigation techniques such as beamforming or joint transmission. In some implementations, the inter-station communications manager 1245 may provide an X2 interface within an LTE/LTE-A wireless communications network technology to provide communication between BSs 105.

The communications manager 1220 may support wireless communication at a network entity in accordance with examples as disclosed herein. For example, the communications manager 1220 may be configured as or otherwise support a means for transmitting configuration signaling associated with configuring a UE with a set of one or more SCells. The communications manager 1220 may be configured as or otherwise support a means for transmitting a message to activate an SCell of the set of one or more SCells for UCI associated with the set of one or more SCells. The communications manager 1220 may be configured as or otherwise support a means for receiving signaling associated with activating the SCell for the UCI.

In some examples, the communications manager 1220 may be configured as or otherwise support a means for transmitting an indication of a set of PRACH resources associated with at least one serving cell, each PRACH resource of the set of PRACH resources associated with a respective reference signal, and receiving the signaling associated with activating the SCell for the UCI may include receiving a random access message over a PRACH resource of the set of PRACH resources associated with the respective reference signal of a serving cell of the at least one serving cell.

In some examples, receiving the random access message may be associated with transmitting the message to activate the SCell for the UCI or the network entity transmitting a command for the UE to transmit the random access message. In some examples, the message to activate the SCell for the UCI may be associated with the UE transmitting the signaling associated with activating the SCell for the UCI in accordance with an uplink time alignment associated with the set of one or more SCells.

In some examples, the message to activate the SCell for the UCI may be associated with the UE transmitting the signaling associated with activating the SCell for the UCI on the SCell in accordance with a timing advance value signaled by the network entity or in accordance with a default timing advance value. In some examples, the signaling associated with activating the SCell for the UCI may be received over a serving cell different than the SCell.

In some examples, the communications manager 1220 may be configured as or otherwise support a means for transmitting an indication of a BFR configuration, and receiving the signaling associated with activating the SCell for the UCI may include receiving a report indicating one or more candidate reference signals for at least one SCell of the set of one or more SCells.

In some examples, receiving the report may be associated with transmitting the message to activate the SCell for the UCI, or the network entity transmitting a command to the UE to transmit the report, or a quality of the one or more candidate reference signals being below a quality threshold, or a periodic transmission schedule for the report.

In some examples, the communications manager 1220 may be configured as or otherwise support a means for receiving an indication of a trigger associated with the receiving of the report, where the trigger includes one of transmitting the message to activate the SCell for the UCI or a quality of the one or more candidate reference signals being below the quality threshold.

In some examples, the communications manager 1220 may be configured as or otherwise support a means for receiving, on a serving cell different than an SCell of the set of one or more SCells that is associated with a beam failure, signaling associated with a scheduling request for the report.

In some examples, the communications manager 1220 may be configured as or otherwise support a means for transmitting, on a serving cell associated with a different PUCCH group than a PUCCH group that the SCell is associated with, a request for CSI, where receiving the signaling associated with activating the SCell for the UCI includes receiving the CSI on the serving cell in accordance with the request for the CSI.

In some examples, the communications manager 1220 may be configured as or otherwise support a means for transmitting, on a serving cell associated with a different PUCCH group than a PUCCH group that the SCell is associated with, a command for the UE to output a random access message on at least one SCell of the set of one or more SCells, where receiving the signaling associated with activating the SCell for the UCI includes receiving the random access message on the at least one SCell.

In some examples, the communications manager 1220 may be configured as or otherwise support a means for transmitting a TCI state modification command indicating a TCI state for the SCell, and the TCI state may be associated with the signaling associated with activating the SCell for the UCI.

In some examples, the communications manager 1220 may be configured as or otherwise support a means for transmitting, on the SCell in accordance with the TCI state, a command for the UE to transmit a random access message. In some examples, the communications manager 1220 may be configured as or otherwise support a means for receiving the random access message on at least one SCell, and receiving the random access message may be associated with transmitting the command to transmit the random access message. In some examples, the communications manager 1220 may be configured as or otherwise support a means for transmitting a random access response on an available cell as a result of receiving the random access message. In some examples, the communications manager 1220 may be configured as or otherwise support a means for receiving the UCI on the SCell in accordance with a timing advance value derived by the UE from the transmission of the random access message and reception of the random access response.

Additionally, or alternatively, the communications manager 1220 may support wireless communication at a network entity in accordance with examples as disclosed herein. For example, the communications manager 1220 may be configured as or otherwise support a means for transmitting configuration signaling associated with configuring a UE with a set of one or more SCells. The communications manager 1220 may be configured as or otherwise support a means for transmitting a message to activate an SCell of the set of one or more SCells for UCI associated with the set of one or more SCells. The communications manager 1220 may be configured as or otherwise support a means for selecting a TCI state for the SCell. The communications manager 1220 may be configured as or otherwise support a means for transmitting a command for the UE to transmit a random access message on the SCell using the TCI state.

In some examples, the command to transmit the random access message may include an indication of one or more PRACH resources, and the communications manager 1220 may be configured as or otherwise support a means for monitoring for the random access message over the one or more PRACH resources on the SCell.

In some examples, the communications manager 1220 may be configured as or otherwise support a means for receiving the random access message as a result of monitoring over the one or more PRACH resources on the SCell. In some examples, the communications manager 1220 may be configured as or otherwise support a means for transmitting a random access response, and transmitting the random access response may be associated with receiving the random access message. In some examples, the communications manager 1220 may be configured as or otherwise support a means for receiving the UCI on the SCell as a result of transmitting the message to activate the SCell for the UCI and transmitting the random access response on the SCell.

In some examples, the communications manager 1220 may be configured as or otherwise support a means for selecting a second TCI state for the SCell as a result of failing to receive the random access message within a configured duration. In some examples, the communications manager 1220 may be configured as or otherwise support a means for transmitting a second command for the UE to transmit the random access message on the SCell.

In some implementations, the communications manager 1220 may be configured to perform various operations (for example, receiving, monitoring, transmitting) using or otherwise in cooperation with the transceiver 1215, the one or more antennas 1225, or any combination thereof. Although the communications manager 1220 is illustrated as a separate component, in some implementations, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for secondary cell establishment and beam control as described herein, or the processor 1240 and the memory 1230 may be otherwise configured to perform or support such operations.

Figure 13:
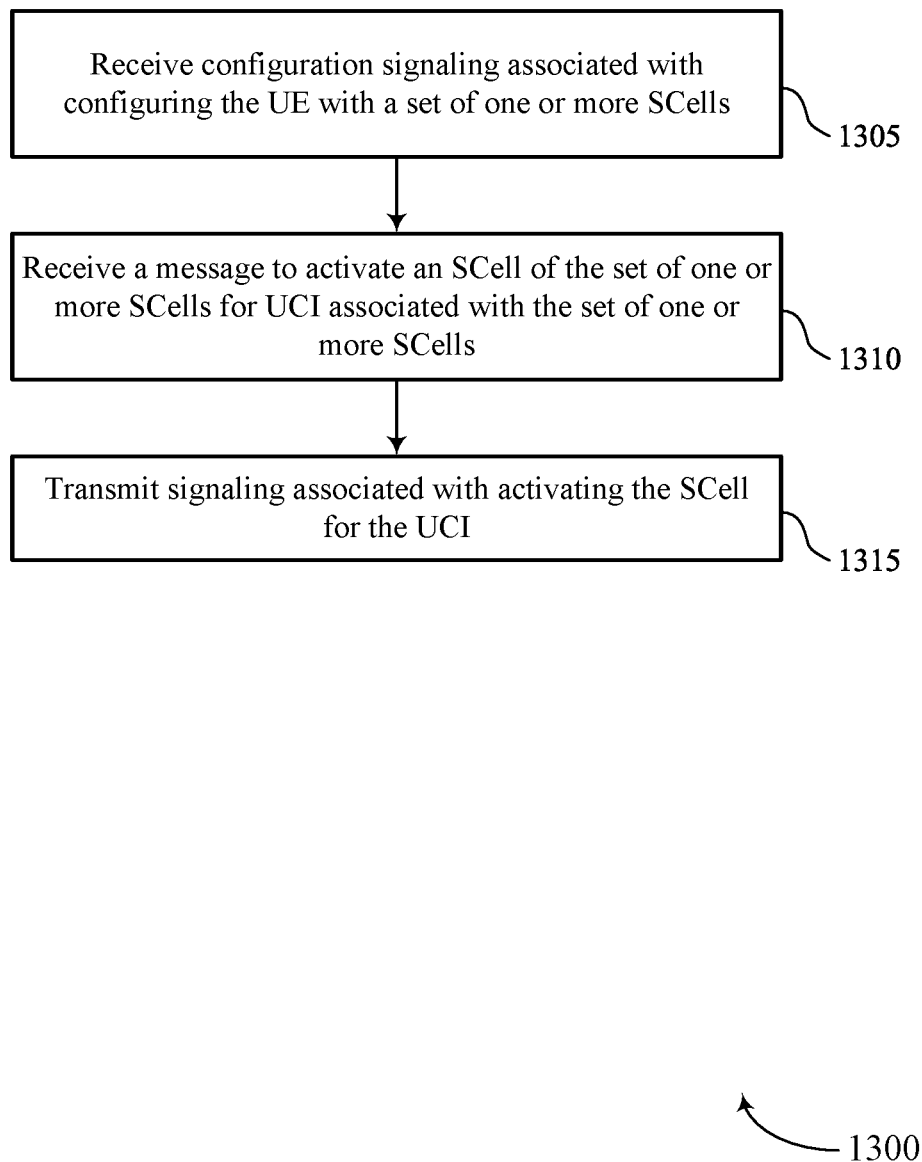
FIGS. 13-15 show flowcharts illustrating methods that support techniques for secondary cell establishment for UCI.

FIG. 13 shows a flowchart illustrating an example method 1300 that supports techniques for SCell establishment for UCI. The operations of the method 1300 may be implemented by a UE or its components as described herein. For example, the operations of the method 1300 may be performed by a UE 115 as described with reference to FIGS. 1-11. In some examples, a UE may execute a set of instructions to control the functional elements of the UE to perform the described functions. Additionally, or alternatively, the UE may perform aspects of the described functions using special-purpose hardware.

At 1305, the method may include receiving configuration signaling associated with configuring the UE with a set of one or more SCells. The operations of 1305 may be performed in accordance with examples as disclosed herein. In some examples, aspects of the operations of 1305 may be performed by a communications manager 920 as described with reference to FIG. 11.

At 1310, the method may include receiving a message to activate an SCell of the set of one or more SCells for UCI associated with the set of one or more SCells. The operations of 1310 may be performed in accordance with examples as disclosed herein. In some examples, aspects of the operations of 1310 may be performed by a communications manager 920 as described with reference to FIG. 11.

At 1315, the method may include transmitting signaling associated with activating the SCell for the UCI. The operations of 1315 may be performed in accordance with examples as disclosed herein. In some examples, aspects of the operations of 1315 may be performed by a communications manager 920 as described with reference to FIG. 11.

Figure 14:
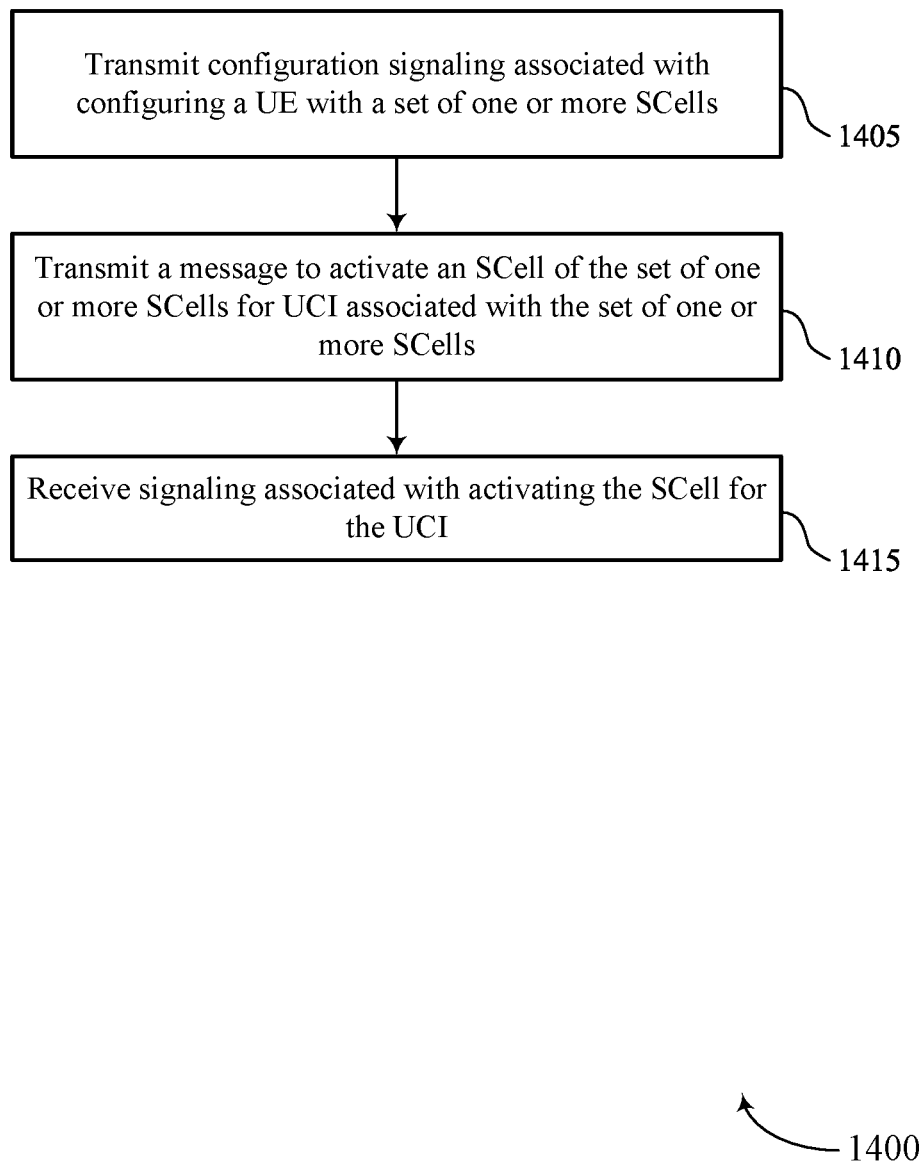

FIG. 14 shows a flowchart illustrating an example method 1400 that supports techniques for SCell establishment for UCI. The operations of the method 1400 may be implemented by a network entity, such as a BS, or its components as described herein. For example, the operations of the method 1400 may be performed by a BS 105 as described with reference to FIGS. 1-10 and 12. In some examples, a network entity may execute a set of instructions to control the functional elements of the network entity to perform the described functions. Additionally, or alternatively, the network entity may perform aspects of the described functions using special-purpose hardware.

At 1405, the method may include transmitting configuration signaling associated with configuring a UE with a set of one or more SCells. The operations of 1405 may be performed in accordance with examples as disclosed herein. In some examples, aspects of the operations of 1405 may be performed by a communications manager communications manager 1020 as described with reference to FIG. 12.

At 1410, the method may include transmitting a message to activate an SCell of the set of one or more SCells for UCI associated with the set of one or more SCells. The operations of 1410 may be performed in accordance with examples as disclosed herein. In some examples, aspects of the operations of 1410 may be performed by a communications manager communications manager 1020 as described with reference to FIG. 12.

At 1415, the method may include receiving signaling associated with activating the SCell for the UCI. The operations of 1415 may be performed in accordance with examples as disclosed herein. In some examples, aspects of the operations of 1415 may be performed by a communications manager communications manager 1020 as described with reference to FIG. 12.

Figure 15:
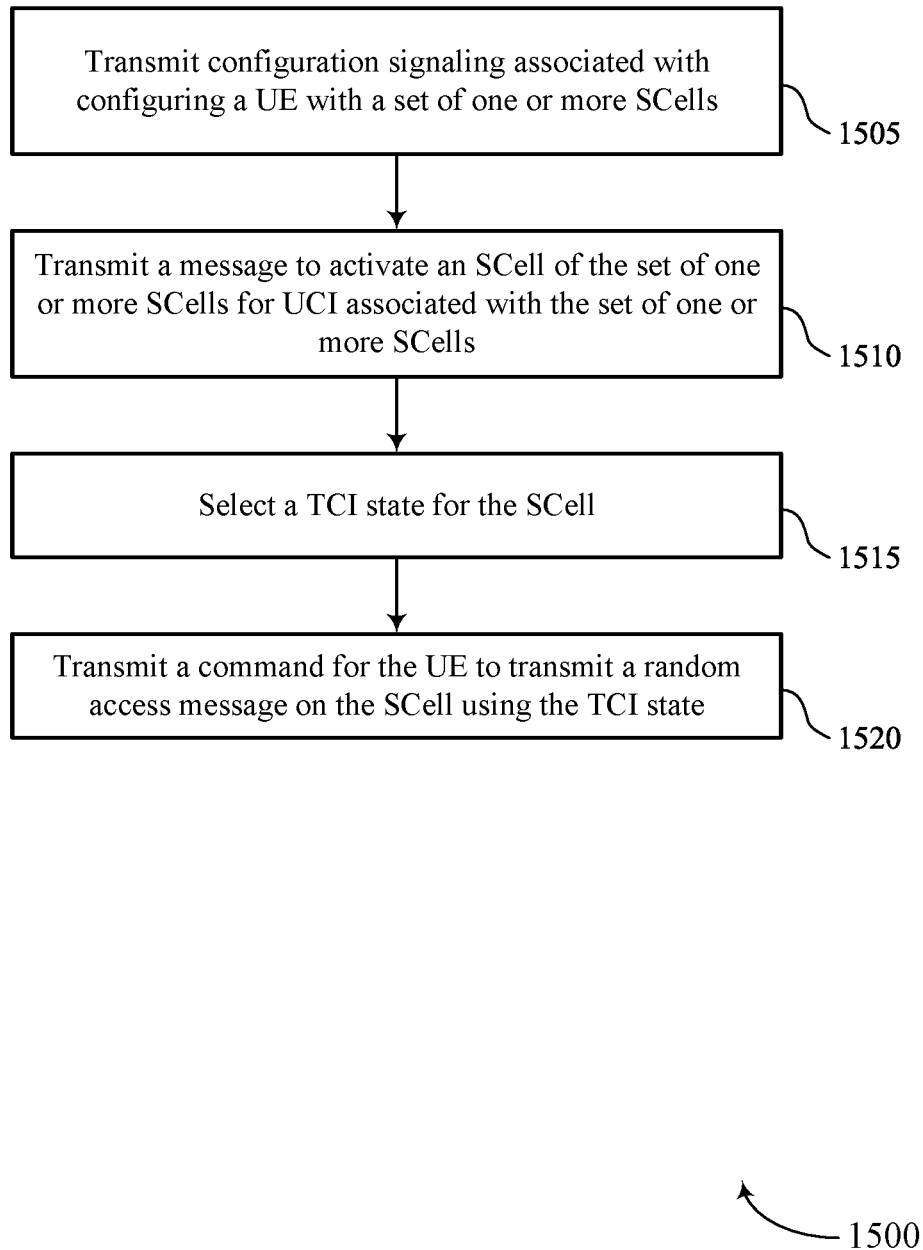

FIG. 15 shows a flowchart illustrating an example method 1500 that supports techniques for SCell establishment for UCI. The operations of the method 1500 may be implemented by a network entity, such as BS, or its components as described herein. For example, the operations of the method 1500 may be performed by a BS 105 as described with reference to FIGS. 1-10 and 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting configuration signaling associated with configuring a UE with a set of one or more SCells. The operations of 1505 may be performed in accordance with examples as disclosed herein. In some examples, aspects of the operations of 1505 may be performed by a communications manager communications manager 1020 as described with reference to FIG. 12.

At 1510, the method may include transmitting a message to activate an SCell of the set of one or more SCells for UCI associated with the set of one or more SCells. The operations of 1510 may be performed in accordance with examples as disclosed herein. In some examples, aspects of the operations of 1510 may be performed by a communications manager communications manager 1020 as described with reference to FIG. 12.

At 1515, the method may include selecting a TCI state for the SCell. The operations of 1515 may be performed in accordance with examples as disclosed herein. In some examples, aspects of the operations of 1515 may be performed by a communications manager communications manager 1020 as described with reference to FIG. 12.

At 1520, the method may include transmitting a command for the UE to transmit a random access message on the SCell using the TCI state. The operations of 1520 may be performed in accordance with examples as disclosed herein. In some examples, aspects of the operations of 1520 may be performed by a communications manager communications manager 1020 as described with reference to FIG. 12.

The following provides an overview of some aspects of the present disclosure:

Aspect 1: An apparatus for wireless communication at a UE, including: a first interface configured to: obtain configuration signaling associated with configuring the UE with a set of one or more SCells; and obtain a message to activate an SCell of the set of one or more SCells for UCI associated with the set of one or more SCells; and the first interface or a second interface configured to: output signaling associated with activating the SCell for the UCI.

Aspect 2: The apparatus of aspect 1, where the first interface or the second interface is further configured to: obtain an indication of a set of PRACH resources associated with at least one serving cell, each PRACH resource of the set of PRACH resources associated with a respective reference signal, where outputting the signaling associated with activating the SCell for the UCI includes outputting a random access message over a PRACH resource of the set of PRACH resources associated with the respective reference signal of a serving cell of the at least one serving cell.

Aspect 3: The apparatus of aspect 2, where outputting the random access message is associated with obtaining the message to activate the SCell for the UCI or obtaining a command to output the random access message.

Aspect 4: The apparatus of any of aspects 1-3, where the signaling associated with activating the SCell for the UCI is output in accordance with an uplink time alignment associated with the set of one or more SCells.

Aspect 5: The apparatus of any of aspects 1-4, where the signaling associated with activating the SCell for the UCI is output on the SCell in accordance with a TA value signaled by a network entity or in accordance with a default TA value.

Aspect 6: The apparatus of any of aspects 1-5, where the signaling associated with activating the SCell for the UCI is output over a serving cell different than the SCell.

Aspect 7: The apparatus of aspect 6, further including a processing system, where the processing system is configured to: disable the output of the signaling associated with activating the SCell for the UCI on the serving cell different than the SCell, where the disabling is associated with obtaining the message to activate the SCell for the UCI or an expiration of a timer.

Aspect 8: The apparatus of any of aspects 1-7, where the first interface or the second interface is further configured to: obtain an indication of a BFR configuration, where outputting the signaling associated with activating the SCell for the UCI includes outputting a report indicating one or more candidate reference signals for at least one SCell of the set of one or more SCells.

Aspect 9: The apparatus of aspect 8, where outputting the report is associated with obtaining the message to activate the SCell for the UCI, or obtaining a command to transmit the report, or detecting that a quality of the one or more candidate reference signals is below a quality threshold, or a periodic transmission schedule for the report.

Aspect 10: The apparatus of aspect 9, where the first interface or the second interface is further configured to: output an indication of a trigger associated with the outputting of the report, where the trigger includes one of obtaining the message to activate the SCell for the UCI or detecting that a quality of the one or more candidate reference signals is below the quality threshold.

Aspect 11: The apparatus of any of aspects 8-10, where the first interface or the second interface is further configured to: output, on a serving cell different than an SCell of the set of one or more SCells that is associated with a beam failure, signaling associated with a scheduling request for the report.

Aspect 12: The apparatus of any of aspects 1-11, where the first interface or the second interface is further configured to: obtain, on a serving cell associated with a different PUCCH group than a PUCCH group that the SCell is associated with, a request for CSI, where outputting the signaling associated with activating the SCell for the UCI includes outputting the CSI on the serving cell in accordance with the request for the CSI.

Aspect 13: The apparatus of any of aspects 1-12, where the first interface or the second interface is further configured to: obtain, on a serving cell associated with a different PUCCH group than a PUCCH group that the SCell is associated with, a command to output a random access message on at least one SCell of the set of one or more SCells, where outputting the signaling associated with activating the SCell for the UCI includes outputting the random access message on the at least one SCell.

Aspect 14: The apparatus of any of aspects 1-13, where the first interface or the second interface is further configured to: obtain a TCI state modification command indicating a TCI state for the SCell, where the TCI state is associated with the signaling associated with activating the SCell for the UCI.

Aspect 15: The apparatus of aspect 14, where the first interface or the second interface is further configured to: obtain, on the SCell and in accordance with the TCI state, a command to output a random access message: output the random access message on at least one SCell, where outputting the random access message is associated with obtaining the command to output the random access message: obtain a random access response on an available cell as a result of outputting the random access message; and output the UCI on the SCell in accordance with a TA value derived from outputting the random access message and obtaining the random access response.

Aspect 16: The apparatus of any of aspects 1-15, where the configuration signaling is associated with configuring the set of one or more SCells in a TA group.

Aspect 17: The apparatus of any of aspects 1-16, where the message to activate the SCell for the UCI is associated with activating the SCell as a PUCCH SCell.

Aspect 18: An apparatus for wireless communication at a network entity, including: a first interface configured to: output configuration signaling associated with configuring a UE with a set of one or more SCells; and output a message to activate an SCell of the set of one or more SCells for UCI associated with the set of one or more SCells; and the first interface or a second interface configured to: obtain signaling associated with activating the SCell for the UCI.

Aspect 19: The apparatus of aspect 18, where the first interface or the second interface is further configured to: output an indication of a set of PRACH resources associated with at least one serving cell, each PRACH resource of the set of PRACH resources associated with a respective reference signal, where obtaining the signaling associated with activating the SCell for the UCI includes obtaining a random access message over a PRACH resource of the set of PRACH resources associated with the respective reference signal of a serving cell of the at least one serving cell.

Aspect 20: The apparatus of aspect 19, where obtaining the random access message is associated with outputting the message to activate the SCell for the UCI or the network entity outputting a command for the UE to output the random access message.

Aspect 21: The apparatus of any of aspects 18-20, where the message to activate the SCell for the UCI is associated with the UE outputting the signaling associated with activating the SCell for the UCI in accordance with an uplink time alignment associated with the set of one or more SCells.

Aspect 22: The apparatus of any of aspects 18-21, where the message to activate the SCell for the UCI is associated with the UE outputting the signaling associated with activating the SCell for the UCI on the SCell in accordance with a TA value signaled by the network entity or in accordance with a default TA value.

Aspect 23: The apparatus of any of aspects 18-22, where the signaling associated with activating the SCell for the UCI is obtained over a serving cell different than the SCell.

Aspect 24: The apparatus of any of aspects 18-23, where the first interface or the second interface is further configured to: output an indication of a BFR configuration, where obtaining the signaling associated with activating the SCell for the UCI includes obtaining a report indicating one or more candidate reference signals for at least one SCell of the set of one or more SCells.

Aspect 25: The apparatus of aspect 24, where obtaining the report is associated with outputting the message to activate the SCell for the UCI, or the network entity outputting a command to the UE to output the report, or a quality of the one or more candidate reference signals being below a quality threshold, or a periodic output schedule for the report.

Aspect 26: The apparatus of aspect 25, where the first interface or the second interface is further configured to: obtain an indication of a trigger associated with the obtaining of the report, where the trigger includes one of outputting the message to activate the SCell for the UCI or a quality of the one or more candidate reference signals being below the quality threshold.

Aspect 27: The apparatus of any of aspects 24-26, where the first interface or the second interface is further configured to: obtain, on a serving cell different than an SCell of the set of one or more SCells that is associated with a beam failure, signaling associated with a scheduling request for the report.

Aspect 28: The apparatus of any of aspects 18-27, where the first interface or the second interface is further configured to: output, on a serving cell associated with a different PUCCH group than that the SCell is associated with, a request for CSI, where obtaining the signaling associated with activating the SCell for the UCI includes obtaining the CSI on the serving cell in accordance with the request for the CSI.

Aspect 29: The apparatus of any of aspects 18-28, where the first interface or the second interface is further configured to: output, on a serving cell associated with a different PUCCH group than that the SCell is associated with, a command for the UE to output a random access message on at least one SCell of the set of one or more SCells, where obtaining the signaling associated with activating the SCell for the UCI includes obtaining the random access message on the at least one SCell.

Aspect 30: The apparatus of any of aspects 18-29, where the first interface or the second interface is further configured to: output a TCI state modification command indicating a TCI state for the SCell, where the TCI state is associated with the signaling associated with activating the SCell for the UCI.

Aspect 31: The apparatus of aspect 30, where the first interface or the second interface is further configured to: output, on the SCell in accordance with the TCI state, a command for the UE to output a random access message: obtain the random access message on at least one SCell, where obtaining the random access message is associated with outputting the command to output the random access message: output a random access response on an available cell as a result of obtaining the random access message; and obtain the UCI on the SCell in accordance with a TA value derived by the UE from the output of the random access message and obtaining of the random access response.

Aspect 32: An apparatus for wireless communication at a network entity, including: a first interface configured to: output configuration signaling associated with configuring a UE with a set of one or more SCells; and output a message to activate an SCell of the set of one or more SCells for UCI associated with the set of one or more SCells; and a processing system configured to: select a TCI state for the SCell; and the first interface configured to: output a command for the UE to output a random access message on the SCell using the TCI state.

Aspect 33: The apparatus of aspect 32, where the command to output the random access message includes an indication of one or more PRACH resources, and the processing system is further configured to: monitor for the random access message over the one or more PRACH resources on the SCell.

Aspect 34: The apparatus of aspect 33, further including the first interface or a second interface configured to: obtain the random access message as a result of monitoring over the one or more PRACH resources on the SCell: output a random access response, where outputting the random access response is associated with obtaining the random access message; and obtain the UCI on the SCell as a result of outputting the message to activate the SCell for the UCI and outputting the random access response on the SCell.

Aspect 35: The apparatus of aspect 33, where: the processing system is further configured to: select a second TCI state for the SCell as a result of failing to obtain the random access message within a configured duration; and the first interface or a second interface is further configured to: output a second command for the UE to output the random access message on the SCell.

Aspect 36: A method for wireless communication at a UE, including: receiving configuration signaling associated with configuring the UE with a set of one or more SCells; receiving a message to activate an SCell of the set of one or more SCells for UCI associated with the set of one or more SCells; and transmitting signaling associated with activating the SCell for the UCI.

Aspect 37: The method of aspect 36, further including: receiving an indication of a set of PRACH resources associated with at least one serving cell, each PRACH resource of the set of PRACH resources associated with a respective reference signal, where transmitting the signaling associated with activating the SCell for the UCI includes transmitting a random access message over a PRACH resource of the set of PRACH resources associated with the respective reference signal of a serving cell of the at least one serving cell.

Aspect 38: The method of aspect 37, where transmitting the random access message is associated with receiving the message to activate the SCell for the UCI or receiving a command to transmit the random access message.

Aspect 39: The method of any of aspects 36-38, where the signaling associated with activating the SCell for the UCI is transmitted in accordance with an uplink time alignment associated with the set of one or more SCells.

Aspect 40: The method of any of aspects 36-39, where the signaling associated with activating the SCell for the UCI is transmitted on the SCell in accordance with a TA value signaled by a network entity or in accordance with a default TA value.

Aspect 41: The method of any of aspects 36-40, where the signaling associated with activating the SCell for the UCI is transmitted over a serving cell different than the SCell.

Aspect 42: The method of aspect 41, further including: disabling the transmitting of the signaling associated with activating the SCell for the UCI on the serving cell different than the SCell, where the disabling is associated with receiving the message to activate the SCell for the UCI or an expiration of a timer.

Aspect 43: The method of any of aspects 36-42, further including: receiving an indication of a BFR configuration, where transmitting the signaling associated with activating the SCell for the UCI includes transmitting a report indicating one or more candidate reference signals for at least one SCell of the set of one or more SCells.

Aspect 44: The method of aspect 43, where transmitting the report is associated with receiving the message to activate the SCell for the UCI, or receiving a command to transmit the report, or detecting that a quality of the one or more candidate reference signals being below a quality threshold, or a periodic transmission schedule for the report.

Aspect 45: The method of aspect 44, further including: transmitting an indication of a trigger associated with the transmitting of the report, where the trigger includes one of receiving the message to activate the SCell for the UCI or detecting that a quality of the one or more candidate reference signals is below the quality threshold.

Aspect 46: The method of any of aspects 43-45, further including: transmitting, on a serving cell different than an SCell of the set of one or more SCells that is associated with a beam failure, signaling associated with a scheduling request for the report.

Aspect 47: The method of any of aspects 36-46, further including: receiving, on a serving cell associated with a different PUCCH group than a PUCCH group that the SCell is associated with, a request for CSI, where transmitting the signaling associated with activating the SCell for the UCI includes transmitting the CSI on the serving cell in accordance with the request for the CSI.

Aspect 48: The method of any of aspects 36-47, further including: receiving, on a serving cell associated with a different PUCCH group than a PUCCH group that the SCell is associated with, a command to output a random access message on at least one SCell of the set of one or more SCells, where transmitting the signaling associated with activating the SCell for the UCI includes transmitting the random access message on the at least one SCell.

Aspect 49: The method of any of aspects 36-48, further including: receiving a TCI state modification command indicating a TCI state for the SCell, where the TCI state is associated with the signaling associated with activating the SCell for the UCI.

Aspect 50: The method of aspect 49, further including: receiving, on the SCell and in accordance with the TCI state, a command to transmit a random access message: transmitting the random access message on at least one SCell, where transmitting the random access message is associated with receiving the command to transmit the random access message: receiving a random access response on an available cell as a result of transmitting the random access message; and transmitting the UCI on the SCell in accordance with a TA value derived from transmitting the random access message and receiving the random access response.

Aspect 51: The method of any of aspects 36-50, where the configuration signaling is associated with configuring the set of one or more SCells in a TA group.

Aspect 52: The method of any of aspects 36-51, where the message to activate the SCell for the UCI is associated with activating the SCell as a PUCCH SCell.

Aspect 53: A method for wireless communication at a network entity, including: transmitting configuration signaling associated with configuring a UE with a set of one or more SCells: transmitting a message to activate an SCell of the set of one or more SCells for UCI associated with the set of one or more SCells; and receiving signaling associated with activating the SCell for the UCI.

Aspect 54: The method of aspect 53, further including: transmitting an indication of a set of PRACH resources associated with at least one serving cell, each PRACH resource of the set of PRACH resources associated with a respective reference signal, where receiving the signaling associated with activating the SCell for the UCI includes receiving a random access message over a PRACH resource of the set of PRACH resources associated with the respective reference signal of a serving cell of the at least one serving cell.

Aspect 55: The method of aspect 54, where receiving the random access message is associated with transmitting the message to activate the SCell for the UCI or the network entity transmitting a command for the UE to transmit the random access message.

Aspect 56: The method of any of aspects 53-55, where the message to activate the SCell for the UCI is associated with the UE transmitting the signaling associated with activating the SCell for the UCI in accordance with an uplink time alignment associated with the set of one or more SCells.

Aspect 57: The method of any of aspects 53-56, where the message to activate the SCell for the UCI is associated with the UE transmitting the signaling associated with activating the SCell for the UCI on the SCell in accordance with a TA value signaled by the network entity or in accordance with a default TA value.

Aspect 58: The method of any of aspects 53-57, where the signaling associated with activating the SCell for the UCI is received over a serving cell different than the SCell.

Aspect 59: The method of any of aspects 53-58, further including: transmitting an indication of a BFR configuration, where receiving the signaling associated with activating the SCell for the UCI includes receiving a report indicating one or more candidate reference signals for at least one SCell of the set of one or more SCells.

Aspect 60: The method of aspect 59, where receiving the report is associated with transmitting the message to activate the SCell for the UCI, or the network entity transmitting a command to the UE to transmit the report, or a quality of the one or more candidate reference signals being below a quality threshold, or a periodic transmission schedule for the report.

Aspect 61: The method of aspect 60, further including: receiving an indication of a trigger associated with the receiving of the report, where the trigger includes one of transmitting the message to activate the SCell for the UCI or a quality of the one or more candidate reference signals being below the quality threshold.

Aspect 62: The method of any of aspects 59-61, further including: receiving, on a serving cell different than an SCell of the set of one or more SCells that is associated with a beam failure, signaling associated with a scheduling request for the report.

Aspect 63: The method of any of aspects 53-62, further including: transmitting, on a serving cell associated with a different PUCCH group than a PUCCH group that the SCell is associated with, a request for CSI, where receiving the signaling associated with activating the SCell for the UCI includes receiving the CSI on the serving cell in accordance with the request for the CSI.

Aspect 64: The method of any of aspects 53-63, further including: transmitting, on a serving cell associated with a different PUCCH group than a PUCCH group that the SCell is associated with, a command for the UE to output a random access message on at least one SCell of the set of one or more SCells, where receiving the signaling associated with activating the SCell for the UCI includes receiving the random access message on the at least one SCell.

Aspect 65: The method of any of aspects 53-64, further including: transmitting a TCI state modification command indicating a TCI state for the SCell, where the TCI state is associated with the signaling associated with activating the SCell for the UCI.

Aspect 66: The method of aspect 65, further including: transmitting, on the SCell in accordance with the TCI state, a command for the UE to transmit a random access message: receiving the random access message on at least one SCell, where receiving the random access message is associated with transmitting the command to transmit the random access message: transmitting a random access response on an available cell as a result of receiving the random access message; and receiving the UCI on the SCell in accordance with a TA value derived by the UE from the transmission of the random access message and reception of the random access response.

Aspect 67: A method for wireless communication at a network entity, including: transmitting configuration signaling associated with configuring a UE with a set of one or more SCells: transmitting a message to activate an SCell of the set of one or more SCells for UCI associated with the set of one or more SCells: selecting a TCI state for the SCell; and transmitting a command for the UE to transmit a random access message on the SCell using the TCI state.

Aspect 68: The method of aspect 67, where the command to transmit the random access message includes an indication of one or more PRACH resources, the method further including: monitoring for the random access message over the one or more PRACH resources on the SCell.

Aspect 69: The method of aspect 68, further including: receiving the random access message as a result of monitoring over the one or more PRACH resources on the SCell: transmitting a random access response, where transmitting the random access response is associated with receiving the random access message; and receiving the UCI on the SCell as a result of transmitting the message to activate the SCell for the UCI and transmitting the random access response on the SCell.

Aspect 70: The method of aspect 68, further including: selecting a second TCI state for the SCell as a result of failing to receive the random access message within a configured duration; and transmitting a second command for the UE to transmit the random access message on the SCell.

Aspect 71: An apparatus for wireless communication at a UE, including: a processor: memory coupled with the processor; and instructions stored in the memory and executable by the processor to cause the apparatus to: receive configuration signaling associated with configuring the UE with a set of one or more SCells: receive a message to activate an SCell of the set of one or more SCells for UCI associated with the set of one or more SCells; and transmit signaling associated with activating the SCell for the UCI.

Aspect 72: The apparatus of aspect 71, where the instructions are further executable by the processor to cause the apparatus to: receive an indication of a set of PRACH resources associated with at least one serving cell, each PRACH resource of the set of PRACH resources associated with a respective reference signal, where transmitting the signaling associated with activating the SCell for the UCI includes transmitting a random access message over a PRACH resource of the set of PRACH resources associated with the respective reference signal of a serving cell of the at least one serving cell.

Aspect 73: The apparatus of aspect 72, where transmitting the random access message is associated with receiving the message to activate the SCell for the UCI or receiving a command to transmit the random access message.

Aspect 74: The apparatus of any of aspects 71-73, where the signaling associated with activating the SCell for the UCI is transmitted in accordance with an uplink time alignment associated with the set of one or more SCells.

Aspect 75: The apparatus of any of aspects 71-74, where the signaling associated with activating the SCell for the UCI is transmitted on the SCell in accordance with a TA value signaled by a network entity or in accordance with a default TA value.

Aspect 76: The apparatus of any of aspects 71-75, where the signaling associated with activating the SCell for the UCI is transmitted over a serving cell different than the SCell.

Aspect 77: The apparatus of aspect 76, where the instructions are further executable by the processor to cause the apparatus to: disable the transmitting of the signaling associated with activating the SCell for the UCI on the serving cell different than the SCell, where the disabling is associated with receiving the message to activate the SCell for the UCI or an expiration of a timer.

Aspect 78: The apparatus of any of aspects 71-77, where the instructions are further executable by the processor to cause the apparatus to: receive an indication of a BFR configuration, where transmitting the signaling associated with activating the SCell for the UCI includes transmitting a report indicating one or more candidate reference signals for at least one SCell of the set of one or more SCells.

Aspect 79: The apparatus of aspect 78, where transmitting the report is associated with receiving the message to activate the SCell for the UCI, or receiving a command to transmit the report, or detecting that a quality of the one or more candidate reference signals being below a quality threshold, or a periodic transmission schedule for the report.

Aspect 80: The apparatus of aspect 79, where the instructions are further executable by the processor to cause the apparatus to: transmit an indication of a trigger associated with the transmitting of the report, where the trigger includes one of receiving the message to activate the SCell for the UCI or detecting that a quality of the one or more candidate reference signals is below the quality threshold.

Aspect 81: The apparatus of any of aspects 78-80, where the instructions are further executable by the processor to cause the apparatus to: transmit, on a serving cell different than an SCell of the set of one or more SCells that is associated with a beam failure, signaling associated with a scheduling request for the report.

Aspect 82: The apparatus of any of aspects 71-81, where the instructions are further executable by the processor to cause the apparatus to: receive, on a serving cell associated with a different PUCCH group than a PUCCH group that the SCell is associated with, a request for CSI, where transmitting the signaling associated with activating the SCell for the UCI includes transmitting the CSI on the serving cell in accordance with the request for the CSI.

Aspect 83: The apparatus of any of aspects 71-82, where the instructions are further executable by the processor to cause the apparatus to: receive, on a serving cell associated with a different PUCCH group than a PUCCH group that the SCell is associated with, a command to output a random access message on at least one SCell of the set of one or more SCells, where transmitting the signaling associated with activating the SCell for the UCI includes transmitting the random access message on the at least one SCell.

Aspect 84: The apparatus of any of aspects 71-83, where the instructions are further executable by the processor to cause the apparatus to: receive a TCI state modification command indicating a TCI state for the SCell, where the TCI state is associated with the signaling associated with activating the SCell for the UCI.

Aspect 85: The apparatus of aspect 84, where the instructions are further executable by the processor to cause the apparatus to: receive, on the SCell and in accordance with the TCI state, a command to transmit a random access message: transmit the random access message on at least one SCell, where transmitting the random access message is associated with receiving the command to transmit the random access message: receive a random access response on an available cell as a result of transmitting the random access message; and transmit the UCI on the SCell in accordance with a TA value derived from transmitting the random access message and receiving the random access response.

Aspect 86: The apparatus of any of aspects 71-85, where the configuration signaling is associated with configuring the set of one or more SCells in a TA group.

Aspect 87: The apparatus of any of aspects 71-86, where the message to activate the SCell for the UCI is associated with activating the SCell as a PUCCH SCell.

Aspect 88: An apparatus for wireless communication at a network entity, including: a processor: memory coupled with the processor; and instructions stored in the memory and executable by the processor to cause the apparatus to: transmit configuration signaling associated with configuring a UE with a set of one or more SCells: transmit a message to activate an SCell of the set of one or more SCells for UCI associated with the set of one or more SCells; and receive signaling associated with activating the SCell for the UCI.

Aspect 89: The apparatus of aspect 88, where the instructions are further executable by the processor to cause the apparatus to: transmit an indication of a set of PRACH resources associated with at least one serving cell, each PRACH resource of the set of PRACH resources associated with a respective reference signal, where receiving the signaling associated with activating the SCell for the UCI includes receiving a random access message over a PRACH resource of the set of PRACH resources associated with the respective reference signal of a serving cell of the at least one serving cell.

Aspect 90: The apparatus of aspect 89, where receiving the random access message is associated with transmitting the message to activate the SCell for the UCI or the network entity transmitting a command for the UE to transmit the random access message.

Aspect 91: The apparatus of any of aspects 88-90, where the message to activate the SCell for the UCI is associated with the UE transmitting the signaling associated with activating the SCell for the UCI in accordance with an uplink time alignment associated with the set of one or more SCells.

Aspect 92: The apparatus of any of aspects 88-91, where the message to activate the SCell for the UCI is associated with the UE transmitting the signaling associated with activating the SCell for the UCI on the SCell in accordance with a TA value signaled by the network entity or in accordance with a default TA value.

Aspect 93: The apparatus of any of aspects 88-92, where the signaling associated with activating the SCell for the UCI is received over a serving cell different than the SCell.

Aspect 94: The apparatus of any of aspects 88-93, where the instructions are further executable by the processor to cause the apparatus to: transmit an indication of a BFR configuration, where receiving the signaling associated with activating the SCell for the UCI includes receiving a report indicating one or more candidate reference signals for at least one SCell of the set of one or more SCells.

Aspect 95: The apparatus of aspect 94, where receiving the report is associated with transmitting the message to activate the SCell for the UCI, or the network entity transmitting a command to the UE to transmit the report, or a quality of the one or more candidate reference signals being below a quality threshold, or a periodic transmission schedule for the report.

Aspect 96: The apparatus of aspect 95, where the instructions are further executable by the processor to cause the apparatus to: receive an indication of a trigger associated with the receiving of the report, where the trigger includes one of transmitting the message to activate the SCell for the UCI or a quality of the one or more candidate reference signals being below the quality threshold.

Aspect 97: The apparatus of any of aspects 94-96, where the instructions are further executable by the processor to cause the apparatus to: receive, on a serving cell different than an SCell of the set of one or more SCells that is associated with a beam failure, signaling associated with a scheduling request for the report.

Aspect 98: The apparatus of any of aspects 88-97, where the instructions are further executable by the processor to cause the apparatus to: transmit, on a serving cell associated with a different PUCCH group than a PUCCH group that the SCell is associated with, a request for CSI, where receiving the signaling associated with activating the SCell for the UCI includes receiving the CSI on the serving cell in accordance with the request for the CSI.

Aspect 99: The apparatus of any of aspects 88-98, where the instructions are further executable by the processor to cause the apparatus to: transmit, on a serving cell associated with a different PUCCH group than a PUCCH group that the SCell is associated with, a command for the UE to output a random access message on at least one SCell of the set of one or more SCells, where receiving the signaling associated with activating the SCell for the UCI includes receiving the random access message on the at least one SCell.

Aspect 100: The apparatus of any of aspects 88-99, where the instructions are further executable by the processor to cause the apparatus to: transmit a TCI state modification command indicating a TCI state for the SCell, where the TCI state is associated with the signaling associated with activating the SCell for the UCI.

Aspect 101: The apparatus of aspect 100, where the instructions are further executable by the processor to cause the apparatus to: transmit, on the SCell in accordance with the TCI state, a command for the UE to transmit a random access message: receive the random access message on at least one SCell, where receiving the random access message is associated with transmitting the command to transmit the random access message: transmit a random access response on an available cell as a result of receiving the random access message; and receive the UCI on the SCell in accordance with a TA value derived by the UE from the transmission of the random access message and reception of the random access response.

Aspect 102: An apparatus for wireless communication at a network entity, including: a processor: memory coupled with the processor; and instructions stored in the memory and executable by the processor to cause the apparatus to: transmit configuration signaling associated with configuring a UE with a set of one or more SCells: transmit a message to activate an SCell of the set of one or more SCells for UCI associated with the set of one or more SCells: select a TCI state for the SCell; and transmit a command for the UE to transmit a random access message on the SCell using the TCI state.

Aspect 103: The apparatus of aspect 102, where the command to transmit the random access message includes an indication of one or more PRACH resources, and the instructions are further executable by the processor to cause the apparatus to: monitor for the random access message over the one or more PRACH resources on the SCell.

Aspect 104: The apparatus of aspect 103, where the instructions are further executable by the processor to cause the apparatus to: receive the random access message as a result of monitoring over the one or more PRACH resources on the SCell: transmit a random access response, where transmitting the random access response is associated with receiving the random access message; and receive the UCI on the SCell as a result of transmitting the message to activate the SCell for the UCI and transmitting the random access response on the SCell.

Aspect 105: The apparatus of aspect 103, where the instructions are further executable by the processor to cause the apparatus to: select a second TCI state for the SCell as a result of failing to receive the random access message within a configured duration; and transmit a second command for the UE to transmit the random access message on the SCell.

Aspect 106: An apparatus for wireless communication at a UE, including: means for receiving configuration signaling associated with configuring the UE with a set of one or more SCells: means for receiving a message to activate an SCell of the set of one or more SCells for UCI associated with the set of one or more SCells; and means for transmitting signaling associated with activating the SCell for the UCI.

Aspect 107: The apparatus of aspect 106, further including: means for receiving an indication of a set of PRACH resources associated with at least one serving cell, each PRACH resource of the set of PRACH resources associated with a respective reference signal, where transmitting the signaling associated with activating the SCell for the UCI includes transmitting a random access message over a PRACH resource of the set of PRACH resources associated with the respective reference signal of a serving cell of the at least one serving cell.

Aspect 108: The apparatus of aspect 107, where transmitting the random access message is associated with receiving the message to activate the SCell for the UCI or receiving a command to transmit the random access message.

Aspect 109: The apparatus of any of aspects 106-108, where the signaling associated with activating the SCell for the UCI is transmitted in accordance with an uplink time alignment associated with the set of one or more SCells.

Aspect 110: The apparatus of any of aspects 106-109, where the signaling associated with activating the SCell for the UCI is transmitted on the SCell in accordance with a TA value signaled by a network entity or in accordance with a default TA value.

Aspect 111: The apparatus of any of aspects 106-110, where the signaling associated with activating the SCell for the UCI is transmitted over a serving cell different than the SCell.

Aspect 112: The apparatus of aspect 111, further including: means for disabling the transmitting of the signaling associated with activating the SCell for the UCI on the serving cell different than the SCell, where the disabling is associated with receiving the message to activate the SCell for the UCI or an expiration of a timer.

Aspect 113: The apparatus of any of aspects 106-112, further including: means for receiving an indication of a BFR configuration, where transmitting the signaling associated with activating the SCell for the UCI includes transmitting a report indicating one or more candidate reference signals for at least one SCell of the set of one or more SCells.

Aspect 114: The apparatus of aspect 113, where transmitting the report is associated with receiving the message to activate the SCell for the UCI, or receiving a command to transmit the report, or detecting that a quality of the one or more candidate reference signals being below a quality threshold, or a periodic transmission schedule for the report.

Aspect 115: The apparatus of aspect 114, further including: means for transmitting an indication of a trigger associated with the transmitting of the report, where the trigger includes one of receiving the message to activate the SCell for the UCI or detecting that a quality of the one or more candidate reference signals is below the quality threshold.

Aspect 116: The apparatus of any of aspects 113-115, further including: means for transmitting, on a serving cell different than an SCell of the set of one or more SCells that is associated with a beam failure, signaling associated with a scheduling request for the report.

Aspect 117: The apparatus of any of aspects 106-116, further including: means for receiving, on a serving cell associated with a different PUCCH group than a PUCCH group that the SCell is associated with, a request for CSI, where transmitting the signaling associated with activating the SCell for the UCI includes transmitting the CSI on the serving cell in accordance with the request for the CSI.

Aspect 118: The apparatus of any of aspects 106-117, further including: means for receiving, on a serving cell associated with a different PUCCH group than a PUCCH group that the SCell is associated with, a command to output a random access message on at least one SCell of the set of one or more SCells, where transmitting the signaling associated with activating the SCell for the UCI includes transmitting the random access message on the at least one SCell.

Aspect 119: The apparatus of any of aspects 106-118, further including: means for receiving a TCI state modification command indicating a TCI state for the SCell, where the TCI state is associated with the signaling associated with activating the SCell for the UCI.

Aspect 120: The apparatus of aspect 119, further including: means for receiving, on the SCell and in accordance with the TCI state, a command to transmit a random access message: means for transmitting the random access message on at least one SCell, where transmitting the random access message is associated with receiving the command to transmit the random access message: means for receiving a random access response on an available cell as a result of transmitting the random access message; and means for transmitting the UCI on the SCell in accordance with a TA value derived from transmitting the random access message and receiving the random access response.

Aspect 121: The apparatus of any of aspects 106-120, where the configuration signaling is associated with configuring the set of one or more SCells in a TA group.

Aspect 122: The apparatus of any of aspects 106-121, where the message to activate the SCell for the UCI is associated with activating the SCell as a PUCCH SCell.

Aspect 123: An apparatus for wireless communication at a network entity, including: means for transmitting configuration signaling associated with configuring a UE with a set of one or more SCells: means for transmitting a message to activate an SCell of the set of one or more SCells for UCI associated with the set of one or more SCells; and means for receiving signaling associated with activating the SCell for the UCI.

Aspect 124: The apparatus of aspect 123, further including: means for transmitting an indication of a set of PRACH resources associated with at least one serving cell, each PRACH resource of the set of PRACH resources associated with a respective reference signal, where receiving the signaling associated with activating the SCell for the UCI includes receiving a random access message over a PRACH resource of the set of PRACH resources associated with the respective reference signal of a serving cell of the at least one serving cell.

Aspect 125: The apparatus of aspect 124, where receiving the random access message is associated with transmitting the message to activate the SCell for the UCI or the network entity transmitting a command for the UE to transmit the random access message.

Aspect 126: The apparatus of any of aspects 123-125, where the message to activate the SCell for the UCI is associated with the UE transmitting the signaling associated with activating the SCell for the UCI in accordance with an uplink time alignment associated with the set of one or more SCells.

Aspect 127: The apparatus of any of aspects 123-126, where the message to activate the SCell for the UCI is associated with the UE transmitting the signaling associated with activating the SCell for the UCI on the SCell in accordance with a TA value signaled by the network entity or in accordance with a default TA value.

Aspect 128: The apparatus of any of aspects 123-127, where the signaling associated with activating the SCell for the UCI is received over a serving cell different than the SCell.

Aspect 129: The apparatus of any of aspects 123-128, further including: means for transmitting an indication of a BFR configuration, where receiving the signaling associated with activating the SCell for the UCI includes receiving a report indicating one or more candidate reference signals for at least one SCell of the set of one or more SCells.

Aspect 130: The apparatus of aspect 129, where receiving the report is associated with transmitting the message to activate the SCell for the UCI, or the network entity transmitting a command to the UE to transmit the report, or a quality of the one or more candidate reference signals being below a quality threshold, or a periodic transmission schedule for the report.

Aspect 131: The apparatus of aspect 130, further including: means for receiving an indication of a trigger associated with the receiving of the report, where the trigger includes one of transmitting the message to activate the SCell for the UCI or a quality of the one or more candidate reference signals being below the quality threshold.

Aspect 132: The apparatus of any of aspects 129-131, further including: means for receiving, on a serving cell different than an SCell of the set of one or more SCells that is associated with a beam failure, signaling associated with a scheduling request for the report.

Aspect 133: The apparatus of any of aspects 123-132, further including: means for transmitting, on a serving cell associated with a different PUCCH group than a PUCCH group that the SCell is associated with, a request for CSI, where receiving the signaling associated with activating the SCell for the UCI includes receiving the CSI on the serving cell in accordance with the request for the CSI.

Aspect 134: The apparatus of any of aspects 123-133, further including: means for transmitting, on a serving cell associated with a different PUCCH group than a PUCCH group that the SCell is associated with, a command for the UE to output a random access message on at least one SCell of the set of one or more SCells, where receiving the signaling associated with activating the SCell for the UCI includes receiving the random access message on the at least one SCell.

Aspect 135: The apparatus of any of aspects 123-134, further including: means for transmitting a TCI state modification command indicating a TCI state for the SCell, where the TCI state is associated with the signaling associated with activating the SCell for the UCI.

Aspect 136: The apparatus of aspect 135, further including: means for transmitting, on the SCell in accordance with the TCI state, a command for the UE to transmit a random access message: means for receiving the random access message on at least one SCell, where receiving the random access message is associated with transmitting the command to transmit the random access message: means for transmitting a random access response on an available cell as a result of receiving the random access message; and means for receiving the UCI on the SCell in accordance with a TA value derived by the UE from the transmission of the random access message and reception of the random access response.

Aspect 137: An apparatus for wireless communication at a network entity, including: means for transmitting configuration signaling associated with configuring a UE with a set of one or more SCells: means for transmitting a message to activate an SCell of the set of one or more SCells for UCI associated with the set of one or more SCells: means for selecting a TCI state for the SCell; and means for transmitting a command for the UE to transmit a random access message on the SCell using the TCI state.

Aspect 138: The apparatus of aspect 137, where the command to transmit the random access message includes an indication of one or more PRACH resources, the apparatus further including: means for monitoring for the random access message over the one or more PRACH resources on the SCell.

Aspect 139: The apparatus of aspect 138, further including: means for receiving the random access message as a result of monitoring over the one or more PRACH resources on the SCell; means for transmitting a random access response, where transmitting the random access response is associated with receiving the random access message; and means for receiving the UCI on the SCell as a result of transmitting the message to activate the SCell for the UCI and transmitting the random access response on the SCell.

Aspect 140: The apparatus of aspect 138, further including: means for selecting a second TCI state for the SCell as a result of failing to receive the random access message within a configured duration; and means for transmitting a second command for the UE to transmit the random access message on the SCell.

Aspect 141: A non-transitory computer-readable medium storing code for wireless communication at a UE, the code including instructions executable by a processor to: receive configuration signaling associated with configuring the UE with a set of one or more SCells; receive a message to activate an SCell of the set of one or more SCells for UCI associated with the set of one or more SCells; and transmit signaling associated with activating the SCell for the UCI.

Aspect 142: The non-transitory computer-readable medium of aspect 141, where the instructions are further executable by the processor to: receive an indication of a set of PRACH resources associated with at least one serving cell, each PRACH resource of the set of PRACH resources associated with a respective reference signal, where transmitting the signaling associated with activating the SCell for the UCI includes transmitting a random access message over a PRACH resource of the set of PRACH resources associated with the respective reference signal of a serving cell of the at least one serving cell.

Aspect 143: The non-transitory computer-readable medium of aspect 142, where transmitting the random access message is associated with receiving the message to activate the SCell for the UCI or receiving a command to transmit the random access message.

Aspect 144: The non-transitory computer-readable medium of any of aspects 141-143, where the signaling associated with activating the SCell for the UCI is transmitted in accordance with an uplink time alignment associated with the set of one or more SCells.

Aspect 145: The non-transitory computer-readable medium of any of aspects 141-144, where the signaling associated with activating the SCell for the UCI is transmitted on the SCell in accordance with a TA value signaled by a network entity or in accordance with a default TA value.

Aspect 146: The non-transitory computer-readable medium of any of aspects 141-145, where the signaling associated with activating the SCell for the UCI is transmitted over a serving cell different than the SCell.

Aspect 147: The non-transitory computer-readable medium of aspect 146, where the instructions are further executable by the processor to: disable the transmitting of the signaling associated with activating the SCell for the UCI on the serving cell different than the SCell, where the disabling is associated with receiving the message to activate the SCell for the UCI or an expiration of a timer.

Aspect 148: The non-transitory computer-readable medium of any of aspects 141-147, where the instructions are further executable by the processor to: receive an indication of a BFR configuration, where transmitting the signaling associated with activating the SCell for the UCI includes transmitting a report indicating one or more candidate reference signals for at least one SCell of the set of one or more SCells.

Aspect 149: The non-transitory computer-readable medium of aspect 148, where transmitting the report is associated with receiving the message to activate the SCell for the UCI, or receiving a command to transmit the report, or detecting that a quality of the one or more candidate reference signals being below a quality threshold, or a periodic transmission schedule for the report.

Aspect 150: The non-transitory computer-readable medium of aspect 149, where the instructions are further executable by the processor to: transmit an indication of a trigger associated with the transmitting of the report, where the trigger includes one of receiving the message to activate the SCell for the UCI or detecting that a quality of the one or more candidate reference signals is below the quality threshold.

Aspect 151: The non-transitory computer-readable medium of any of aspects 148-150, where the instructions are further executable by the processor to: transmit, on a serving cell different than an SCell of the set of one or more SCells that is associated with a beam failure, signaling associated with a scheduling request for the report.

Aspect 152: The non-transitory computer-readable medium of any of aspects 141-151, where the instructions are further executable by the processor to: receive, on a serving cell associated with a different PUCCH group than a PUCCH group that the SCell is associated with, a request for CSI, where transmitting the signaling associated with activating the SCell for the UCI includes transmitting the CSI on the serving cell in accordance with the request for the CSI.

Aspect 153: The non-transitory computer-readable medium of any of aspects 141-152, where the instructions are further executable by the processor to: receive, on a serving cell associated with a different PUCCH group than a PUCCH group that the SCell is associated with, a command to output a random access message on at least one SCell of the set of one or more SCells, where transmitting the signaling associated with activating the SCell for the UCI includes transmitting the random access message on the at least one SCell.

Aspect 154: The non-transitory computer-readable medium of any of aspects 141-153, where the instructions are further executable by the processor to: receive a TCI state modification command indicating a TCI state for the SCell, where the TCI state is associated with the signaling associated with activating the SCell for the UCI.

Aspect 155: The non-transitory computer-readable medium of aspect 154, where the instructions are further executable by the processor to: receive, on the SCell and in accordance with the TCI state, a command to transmit a random access message: transmit the random access message on at least one SCell, where transmitting the random access message is associated with receiving the command to transmit the random access message: receive a random access response on an available cell as a result of transmitting the random access message; and transmit the UCI on the SCell in accordance with a TA value derived from transmitting the random access message and receiving the random access response.

Aspect 156: The non-transitory computer-readable medium of any of aspects 141-155, where the configuration signaling is associated with configuring the set of one or more SCells in a TA group.

Aspect 157: The non-transitory computer-readable medium of any of aspects 141-156, where the message to activate the SCell for the UCI is associated with activating the SCell as a PUCCH SCell.

Aspect 158: A non-transitory computer-readable medium storing code for wireless communication at a network entity, the code including instructions executable by a processor to: transmit configuration signaling associated with configuring a UE with a set of one or more SCells: transmit a message to activate an SCell of the set of one or more SCells for UCI associated with the set of one or more SCells; and receive signaling associated with activating the SCell for the UCI.

Aspect 159: The non-transitory computer-readable medium of aspect 158, where the instructions are further executable by the processor to: transmit an indication of a set of PRACH resources associated with at least one serving cell, each PRACH resource of the set of PRACH resources associated with a respective reference signal, where receiving the signaling associated with activating the SCell for the UCI includes receiving a random access message over a PRACH resource of the set of PRACH resources associated with the respective reference signal of a serving cell of the at least one serving cell.

Aspect 160: The non-transitory computer-readable medium of aspect 159, where receiving the random access message is associated with transmitting the message to activate the SCell for the UCI or the network entity transmitting a command for the UE to transmit the random access message.

Aspect 161: The non-transitory computer-readable medium of any of aspects 158-160, where the message to activate the SCell for the UCI is associated with the UE transmitting the signaling associated with activating the SCell for the UCI in accordance with an uplink time alignment associated with the set of one or more SCells.

Aspect 162: The non-transitory computer-readable medium of any of aspects 158-161, where the message to activate the SCell for the UCI is associated with the UE transmitting the signaling associated with activating the SCell for the UCI on the SCell in accordance with a TA value signaled by the network entity or in accordance with a default TA value.

Aspect 163: The non-transitory computer-readable medium of any of aspects 158-162, where the signaling associated with activating the SCell for the UCI is received over a serving cell different than the SCell.

Aspect 164: The non-transitory computer-readable medium of any of aspects 158-163, where the instructions are further executable by the processor to: transmit an indication of a BFR configuration, where receiving the signaling associated with activating the SCell for the UCI includes receiving a report indicating one or more candidate reference signals for at least one SCell of the set of one or more SCells.

Aspect 165: The non-transitory computer-readable medium of aspect 164, where receiving the report is associated with transmitting the message to activate the SCell for the UCI, or the network entity transmitting a command to the UE to transmit the report, or a quality of the one or more candidate reference signals being below a quality threshold, or a periodic transmission schedule for the report.

Aspect 166: The non-transitory computer-readable medium of aspect 165, where the instructions are further executable by the processor to: receive an indication of a trigger associated with the receiving of the report, where the trigger includes one of transmitting the message to activate the SCell for the UCI or a quality of the one or more candidate reference signals being below the quality threshold.

Aspect 167: The non-transitory computer-readable medium of any of aspects 164-166, where the instructions are further executable by the processor to: receive, on a serving cell different than an SCell of the set of one or more SCells that is associated with a beam failure, signaling associated with a scheduling request for the report.

Aspect 168: The non-transitory computer-readable medium of any of aspects 158-167, where the instructions are further executable by the processor to: transmit, on a serving cell associated with a different PUCCH group than a PUCCH group that the SCell is associated with, a request for CSI, where receiving the signaling associated with activating the SCell for the UCI includes receiving the CSI on the serving cell in accordance with the request for the CSI.

Aspect 169: The non-transitory computer-readable medium of any of aspects 158-168, where the instructions are further executable by the processor to: transmit, on a serving cell associated with a different PUCCH group than a PUCCH group that the SCell is associated with, a command for the UE to output a random access message on at least one SCell of the set of one or more SCells, where receiving the signaling associated with activating the SCell for the UCI includes receiving the random access message on the at least one SCell.

Aspect 170: The non-transitory computer-readable medium of any of aspects 158-169, where the instructions are further executable by the processor to: transmit a TCI state modification command indicating a TCI state for the SCell, where the TCI state is associated with the signaling associated with activating the SCell for the UCI.

Aspect 171: The non-transitory computer-readable medium of aspect 170, where the instructions are further executable by the processor to: transmit, on the SCell in accordance with the TCI state, a command for the UE to transmit a random access message; receive the random access message on at least one SCell, where receiving the random access message is associated with transmitting the command to transmit the random access message; transmit a random access response on an available cell as a result of receiving the random access message; and receive the UCI on the SCell in accordance with a TA value derived by the UE from the transmission of the random access message and reception of the random access response.

Aspect 172: A non-transitory computer-readable medium storing code for wireless communication at a network entity, the code including instructions executable by a processor to: transmit configuration signaling associated with configuring a UE with a set of one or more SCells: transmit a message to activate an SCell of the set of one or more SCells for UCI associated with the set of one or more SCells: select a TCI state for the SCell; and transmit a command for the UE to transmit a random access message on the SCell using the TCI state.

Aspect 173: The non-transitory computer-readable medium of aspect 172, where the command to transmit the random access message includes an indication of one or more PRACH resources, and the instructions are further executable by the processor to: monitor for the random access message over the one or more PRACH resources on the SCell.

Aspect 174: The non-transitory computer-readable medium of aspect 173, where the instructions are further executable by the processor to: receive the random access message as a result of monitoring over the one or more PRACH resources on the SCell: transmit a random access response, where transmitting the random access response is associated with receiving the random access message; and receive the UCI on the SCell as a result of transmitting the message to activate the SCell for the UCI and transmitting the random access response on the SCell.

Aspect 175: The non-transitory computer-readable medium of aspect 173, where the instructions are further executable by the processor to: select a second TCI state for the SCell as a result of failing to receive the random access message within a configured duration; and transmit a second command for the UE to transmit the random access message on the SCell.

As used herein, the term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Some features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A user equipment (UE), comprising:
a processing system that includes one or more processors and one or more memories coupled with the one or more processors, the processing system configured to cause the UE to:
obtain configuration signaling associated with configuring the UE with a set of one or more secondary cells (SCells) of a first physical uplink control channel (PUCCH) group;
output an indication of a capability of the UE to report, via an available cell of a second PUCCH group, beam measurement information associated with the first PUCCH group;
obtain a message to activate a first SCell of the set of one or more SCells of the first PUCCH group for uplink control information associated with the set of one or more SCells of the first PUCCH group; and
output, via the available cell of the second PUCCH group and in accordance with obtaining the message to activate the first SCell of the set of one or more SCells of the first PUCCH group, signaling associated with activating the first SCell for the uplink control information associated with the set of one or more SCells of the first PUCCH group, wherein the signaling includes first beam measurement information associated with the first SCell in accordance with the capability of the UE to report, via the available cell of the second PUCCH group, the beam measurement information associated with the first PUCCH group.

2. The UE of claim 1, wherein the processing system is configured to cause the UE to:
obtain an indication of a set of physical random access channel (PRACH) resources associated with at least one serving cell, each PRACH resource of the set of PRACH resources associated with a respective reference signal, wherein outputting the signaling associated with activating the first SCell for the uplink control information comprises outputting a random access message over a PRACH resource of the set of PRACH resources associated with the respective reference signal of a serving cell of the at least one serving cell.

3. The UE of claim 2, wherein outputting the random access message is associated with obtaining the message to activate the first SCell for the uplink control information or obtaining a command to output the random access message.

4. The UE of claim 1, wherein the signaling associated with activating the first SCell for the uplink control information is output in accordance with an uplink time alignment associated with the set of one or more SCells of the first PUCCH group.

5. The UE of claim 1, wherein the signaling associated with activating the first SCell for the uplink control information is output on the first SCell in accordance with a timing advance value signaled by a network entity or in accordance with a default timing advance value.

6. The UE of claim 1, wherein the processing system is configured to cause the UE to:
disable the output of the signaling associated with activating the first SCell for the uplink control information via the available cell of the second PUCCH group, wherein the disabling is associated with an expiration of a timer.

7. The UE of claim 1, wherein the processing system is configured to cause the UE to:
obtain an indication of a beam failure recovery configuration, wherein outputting the signaling associated with activating the first SCell for the uplink control information comprises outputting a report indicating one or more candidate reference signals for at least one SCell of the set of one or more SCells of the first PUCCH group.

8. The UE of claim 7, wherein outputting the report is associated with obtaining the message to activate the first SCell for the uplink control information, or obtaining a command to transmit the report, or detecting that a quality of the one or more candidate reference signals is below a quality threshold, or a periodic transmission schedule for the report.

9. The UE of claim 8, wherein the processing system is configured to cause the UE to:
output an indication of a trigger associated with the outputting of the report, wherein the trigger comprises one of obtaining the message to activate the first SCell for the uplink control information or detecting that a quality of the one or more candidate reference signals is below the quality threshold.

10. The UE of claim 7, wherein the processing system is configured to cause the UE to:
output, on a serving cell different than an SCell of the set of one or more SCells of the first PUCCH group that is associated with a beam failure, signaling associated with a scheduling request for the report.

11. The UE of claim 1, wherein the processing system is configured to cause the UE to:
obtain, via the available cell of the second PUCCH group, a request for channel state information (CSI), wherein outputting the signaling associated with activating the first SCell for the uplink control information comprises outputting the CSI via the available cell in accordance with the request for the CSI, and wherein the first beam measurement information includes the CSI.

12. The UE of claim 1, wherein the processing system is configured to cause the UE to:
obtain, via the available cell of the second PUCCH group, a command to output a random access message via at least one SCell of the set of one or more SCells of the first PUCCH group, wherein outputting the signaling associated with activating the first SCell for the uplink control information comprises outputting the random access message on the at least one SCell.

13. The UE of claim 1, wherein the processing system is configured to cause the UE to:
obtain a transmission configuration indicator (TCI) state modification command indicating a TCI state for the first SCell, wherein the TCI state is associated with the signaling associated with activating the first SCell for the uplink control information.

14. The UE of claim 13, wherein the processing system is configured to cause the UE to:
obtain, via the first SCell and in accordance with the TCI state, a command to output a random access message;
output the random access message via at least one SCell, wherein outputting the random access message is associated with obtaining the command to output the random access message;
obtain a random access response via the available cell as a result of outputting the random access message; and
output the uplink control information via the first SCell in accordance with a timing advance value derived from outputting the random access message and obtaining the random access response.

15. The UE of claim 1, wherein the configuration signaling is associated with configuring the set of one or more SCells in a timing advance group.

16. The UE of claim 1, wherein the message to activate the first SCell for the uplink control information is associated with activating the first SCell as a PUCCH SCell.

17. A network entity, comprising:
a processing system that includes one or more processors and one or more memories coupled with the one or more processors, the processing system configured to cause the network entity to:
output configuration signaling associated with configuring a user equipment (UE) with a set of one or more secondary cells (SCells) of a first physical uplink control channel (PUCCH) group;
obtain an indication of a capability of the UE to report, via an available cell of a second PUCCH group, beam measurement information associated with the first PUCCH group;
output a message to activate a first SCell of the set of one or more SCells of the first PUCCH group for uplink control information associated with the set of one or more SCells of the first PUCCH group; and
obtain, via the available cell of the second PUCCH group and in accordance with outputting the message to activate the first SCell of the set of one or more SCells of the first PUCCH group, signaling associated with activating the first SCell for the uplink control information associated with the set of one or more SCells of the first PUCCH group, wherein the signaling includes first beam measurement information associated with the first SCell in accordance with the capability of the UE to report, via the available cell of the second PUCCH group, the beam measurement information associated with the first PUCCH group.

18. The network entity of claim 17, wherein the processing system is configured to cause the network entity to:
output an indication of a set of physical random access channel (PRACH) resources associated with at least one serving cell, each PRACH resource of the set of PRACH resources associated with a respective reference signal, wherein obtaining the signaling associated with activating the first SCell for the uplink control information comprises obtaining a random access message over a PRACH resource of the set of PRACH resources associated with the respective reference signal of a serving cell of the at least one serving cell.

19. The network entity of claim 17, wherein the message to activate the first SCell for the uplink control information is associated with the UE outputting the signaling associated with activating the first SCell for the uplink control information in accordance with an uplink time alignment associated with the set of one or more SCells of the first PUCCH group.

20. The network entity of claim 17, wherein the message to activate the first SCell for the uplink control information is associated with the UE outputting the signaling associated with activating the first SCell for the uplink control information via the first SCell in accordance with a timing advance value signaled by the network entity or in accordance with a default timing advance value.

21. The network entity of claim 17, wherein the processing system is configured to cause the network entity to:
output an indication of a beam failure recovery configuration, wherein obtaining the signaling associated with activating the first SCell for the uplink control information comprises obtaining a report indicating one or more candidate reference signals for at least one SCell of the set of one or more SCells of the first PUCCH group.

22. A method for wireless communication at a network entity, comprising:
transmitting configuration signaling associated with configuring a user equipment (UE) with a set of one or more secondary cells (SCells) of a first physical uplink control channel (PUCCH) group;
receiving an indication of a capability of the UE to report, via an available cell of a second PUCCH group, beam measurement information associated with the first PUCCH group;
transmitting a message to activate a first SCell of the set of one or more SCells of the first PUCCH group for uplink control information associated with the set of one or more SCells of the first PUCCH group; and
receiving, via the available cell of the second PUCCH group and in accordance with transmitting the message to activate the first SCell of the set of one or more SCells of the first PUCCH group, signaling associated with activating the first SCell for the uplink control information associated with the set of one or more SCells of the first PUCCH group, wherein the signaling includes first beam measurement information associated with the first SCell in accordance with the capability of the UE to report, via the available cell of the second PUCCH group, the beam measurement information associated with the first PUCCH group.

23. The method of claim 22, further comprising:
selecting a transmission configuration indicator (TCI) state for the first SCell in accordance with the first beam measurement information;
transmitting a command for the UE to transmit a random access message via the first SCell using the TCI state, wherein the command to transmit the random access message comprises an indication of one or more physical random access channel (PRACH) resources; and monitoring for the random access message over the one or more PRACH resources on the first SCell.

24. The method of claim 23, further comprising:

receiving the random access message as a result of monitoring over the one or more PRACH resources on the first SCell;

transmitting a random access response, wherein transmitting the random access response is associated with receiving the random access message; and receiving the uplink control information via the first SCell as a result of transmitting the message to activate the first SCell for the uplink control information and transmitting the random access response via the first SCell.

25. The method of claim 23, further comprising:

selecting a second TCI state for the first SCell as a result of failing to receive the random access message within a configured duration; and transmitting a second command for the UE to transmit the random access message via the SCell using the second TCI state.

26. A method for wireless communication at a user equipment (UE), comprising:

receiving configuration signaling associated with configuring the UE with a set of one or more secondary cells (SCells) of a first physical uplink control channel (PUCCH) group;

transmitting an indication of a capability of the UE to report, via an available cell of a second PUCCH group, beam measurement information associated with the first PUCCH group;

receiving a message to activate a first SCell of the set of one or more SCells of the first PUCCH group for uplink control information associated with the set of one or more SCells of the first PUCCH group; and transmitting, via the available cell of the second PUCCH group and in accordance with receiving the message to activate the first SCell of the set of one or more SCells of the first PUCCH group, signaling associated with activating the first SCell for the uplink control information associated with the set of one or more SCells of the first PUCCH group, wherein the signaling includes first beam measurement information associated with the first SCell in accordance with the capability of the UE to report, via the available cell of the second PUCCH group, the beam measurement information associated with the first PUCCH group.

27. The method of claim 26, further comprising:

receiving an indication of a set of physical random access channel (PRACH) resources associated with at least one serving cell, each PRACH resource of the set of PRACH resources associated with a respective reference signal, wherein transmitting the signaling associated with activating the first SCell for the uplink control information comprises transmitting a random access message over a PRACH resource of the set of PRACH resources associated with the respective reference signal of a serving cell of the at least one serving cell.

28. The method of claim 26, wherein the signaling associated with activating the first SCell for the uplink control information is transmitted in accordance with an uplink time alignment associated with the set of one or more SCells of the first PUCCH group.

* * * * *